United States Patent
Suzuki

(10) Patent No.: US 8,416,183 B2
(45) Date of Patent: Apr. 9, 2013

(54) SURFACE LIGHT SOURCE DEVICE AND DISPLAY DEVICE

(75) Inventor: Hiromasa Suzuki, Tokyo (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 12/997,268

(22) PCT Filed: Jun. 17, 2009

(86) PCT No.: PCT/JP2009/060994
§ 371 (c)(1),
(2), (4) Date: Dec. 10, 2010

(87) PCT Pub. No.: WO2009/157351
PCT Pub. Date: Dec. 30, 2009

(65) Prior Publication Data
US 2011/0187636 A1    Aug. 4, 2011

(30) Foreign Application Priority Data
Jun. 23, 2008    (JP) ................................. 2008-163848

(51) Int. Cl.
*G09G 3/36*    (2006.01)
(52) U.S. Cl.
USPC .......................................... 345/102; 362/607
(58) Field of Classification Search .................. 345/102; 362/607, 613
See application file for complete search history.

(56) References Cited

U.S. PATENT DOCUMENTS

| 6,870,525 B2 * | 3/2005 | Kawabata et al. ............ 345/102 |
| 2005/0184952 A1 | 8/2005 | Konno et al. |
| 2006/0077688 A1 * | 4/2006 | Uehara et al. .................. 362/613 |
| 2006/0083023 A1 * | 4/2006 | Ayabe et al. .................. 362/607 |

FOREIGN PATENT DOCUMENTS

| JP | 2005-258403 | 9/2005 |
| JP | 2007-206398 | 8/2007 |

OTHER PUBLICATIONS

International Search Report corresponding to PCT/JP09/060994 dated Sep. 8, 2009.

* cited by examiner

*Primary Examiner* — Kevin M Nguyen
(74) *Attorney, Agent, or Firm* — Sheridan Ross P.C.

(57) ABSTRACT

There is provided a surface light source device capable of making appearance of a boundary between partial lighting areas more natural than related art. In each of unit light-source sections 10 capable of mutually independent lighting, uneven light-emission intensity distributions that are mutually independent are to be formed within a light emission surface. Thus, in the light emission surface of each of the unit light-source sections 10, an arbitrary light-emission intensity distribution is able to be formed. Therefore, by adjusting a light-emission intensity distribution of each of the unit light-source sections 10, the appearance in the boundary between the partial lighting areas becomes more natural than related art.

19 Claims, 82 Drawing Sheets

- - - UNEVEN LIGHT-EMISSION INTENSITY DISTRIBUTION FORMED LIGHT SOURCE ON LEFT SIDE
- · - · UNEVEN LIGHT-EMISSION INTENSITY DISTRIBUTION FORMED LIGHT SOURCE ON RIGHT SIDE
——— UNIFORM LIGHT-EMISSION INTENSITY DISTRIBUTION FORMED BY COMBINATION OF LIGHT-EMISSION INTENSITIES OF BOTH LIGHT SOURCES

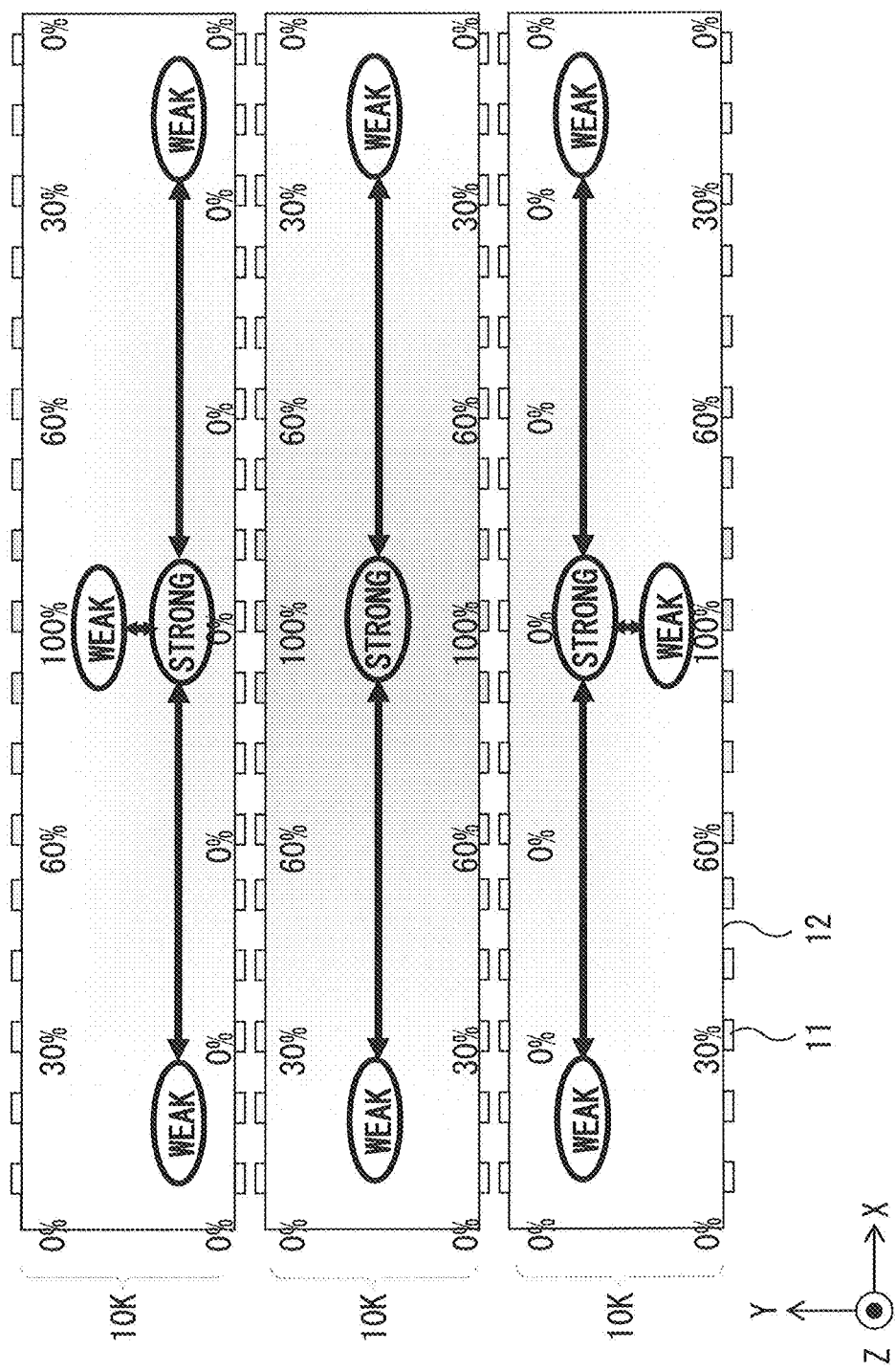
F I G. 69

SURFACE LIGHT SOURCE DEVICE AND DISPLAY DEVICE

TECHNICAL FIELD

The present invention relates to a surface light source device that performs surface light emission with use of light guiding plate and a display device having such a surface light source device.

This application is based upon and claims the benefit of priority of the prior Japanese Patent Application No. 2008-163848, filed on Jun. 23, 2008 in Japan, the contents of which are cited herein by reference.

BACKGROUND ART

In the past, various devices have been proposed and commercialized as a surface light source device such as a backlight source applied to, for example, a liquid crystal display.

For example, in Patent Literature 1, there is proposed a surface light source device in which plural light guiding plates are arranged. In this surface light source device, plural light sources are arranged on sides of each of the light guiding plates.

CITATION LIST

Patent Literature

Patent Literature 1: Japanese Unexamined Patent Application Publication No.

SUMMARY OF INVENTION

Here, in the above-described surface light source device of Patent Literature 1, a light-emission surface of each of the light guiding plates functions as a single partial lighting area, thereby realizing partial driving (local dimming) in which an in-plane light-emission intensity distribution in the surface light source device as a whole partially changes.

However, in this surface light source device, in each of the light guiding plates, a light-emission intensity distribution within the light-emission surface is uniform and therefore, a light-emission intensity changes abruptly at a joint between the light guiding plates. Consequently, a boundary between the partial lighting areas appears unnatural and thus, there has been such an issue that in, for example, use as a backlight source of a liquid crystal display, display image quality deteriorates.

The present invention has been made in view of the foregoing issues and its object is to provide a surface light source device and a display device which are capable of making a boundary between partial lighting areas look more natural than related art.

A surface light source device of the present invention includes: plural unit light-source sections that are each configured to include a light guiding plate forming a light-emission surface and a light source disposed on plural sides of this light guiding plate, the plural unit light-source sections being capable of mutually independent illumination. Here, in these unit light-source sections, by light emissions of respective light sources on the respective sides, uneven light-emission intensity distributions that are mutually independent within the light-emission surface are formed.

A display device of the present invention includes: the above-described surface light source device that performs surface light emission; and a display section that performs image display by modulating light from this surface light source device based on an image signal.

In the surface light source device and the display device of the present invention, in each of the plurality of unit light-source sections being capable of mutually independent illumination, by the light emissions of the respective light sources on the respective sides, the uneven light-emission intensity distributions that are mutually independent are formed within the light-emission surface and therefore, it is possible to form an arbitrary light-emission intensity distribution on the light-emission surface of each of the unit light-source sections.

According to the surface light source device or the display device of the present invention, in each of the plurality of unit light-source sections being capable of mutually independent illumination, the uneven light-emission intensity distributions that are mutually independent are formed within the light-emission surface and thus, it is possible to form an arbitrary light-emission intensity distribution on the light-emission surface of each of the unit light-source sections. Therefore, by adjusting the light-emission intensity of each of the unit light-source sections, it is possible to make the appearance of a boundary between partial lighting areas more natural than related art. Further, in a display device having such a surface light source device, it is possible to improve display image quality further than related art.

BRIEF DESCRIPTION OF DRAWINGS

FIG. 69 is a diagram for explaining another example of the light-emission mode of the unit light-source section according to the third embodiment.

DESCRIPTION OF EMBODIMENTS

In the following, embodiments of the present invention will be described in detail with reference to the drawings.

First Embodiment

Figure 1:
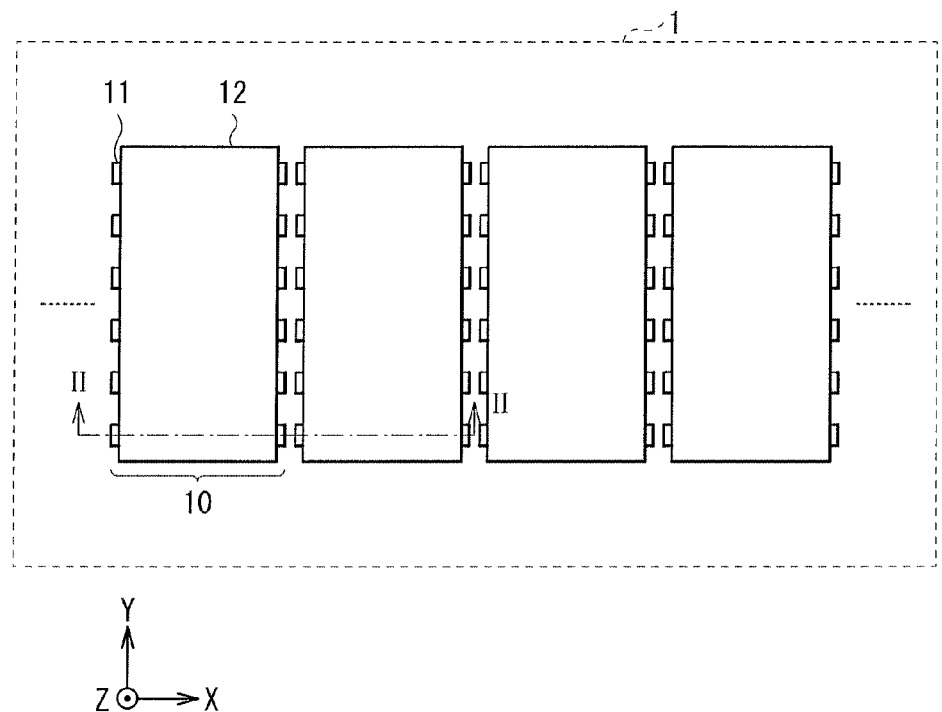
FIG. 1 is a plan view that illustrates a main structure of a surface light source device according to a first embodiment of the present invention.
Figure 2:
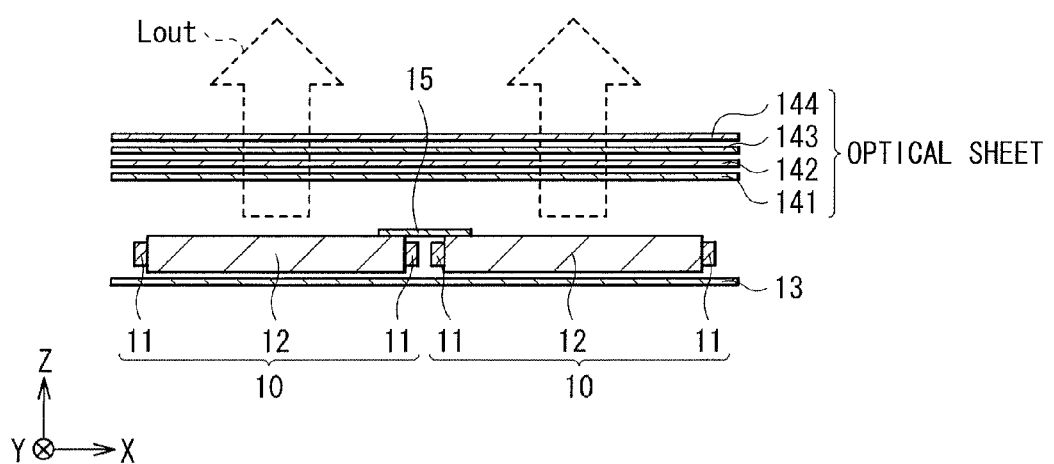
FIG. 2 is a diagram that illustrates an example of a cross-sectional structure of the surface light source device 1 illustrated in FIG. 1.
Figure 3:
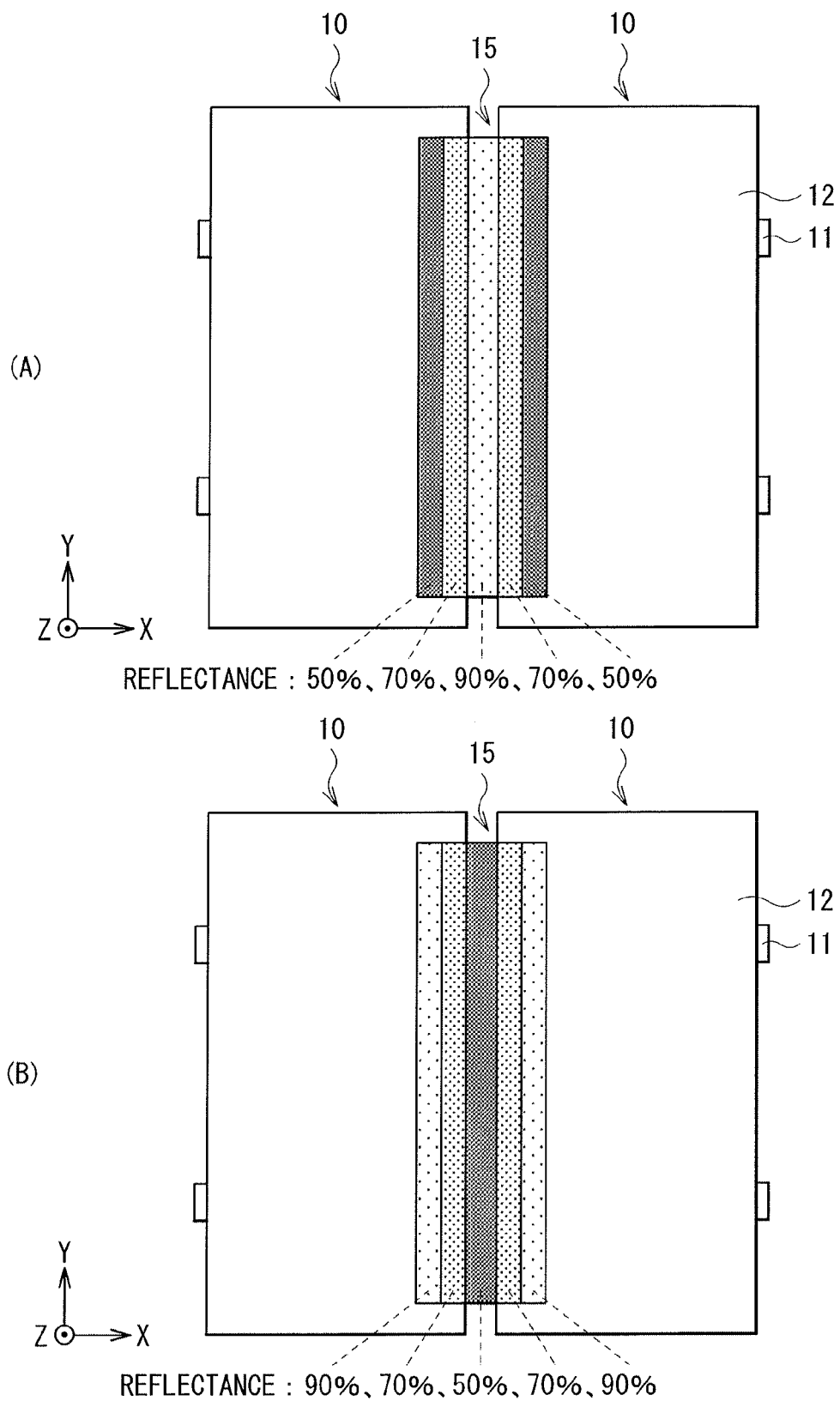
FIG. 3 is a plan view that illustrates examples of a detailed structure of an optical member illustrated in FIG. 2.
Figure 4:
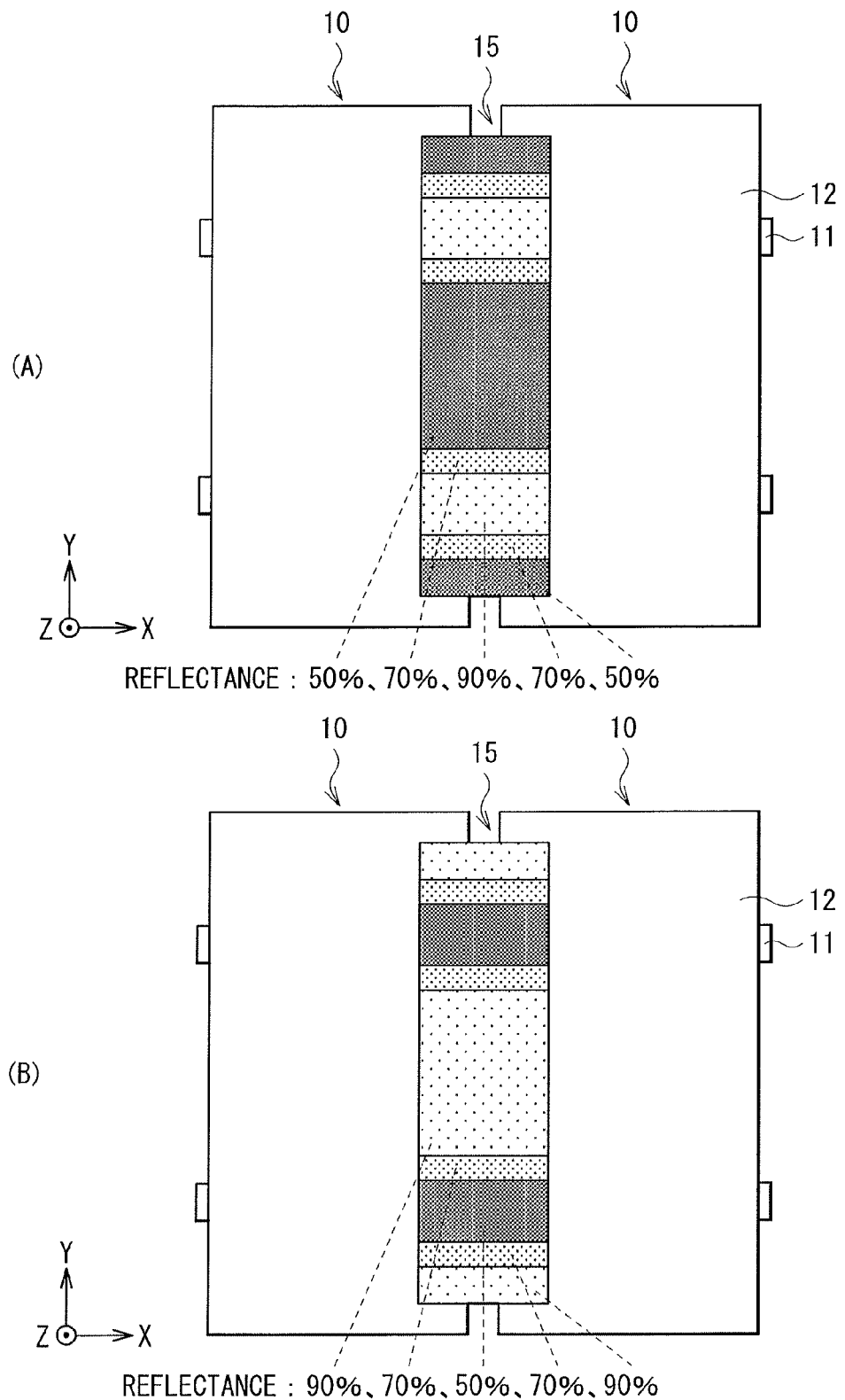
FIG. 4 is a plan view that illustrates another example of the detailed structure of the optical member illustrated in FIG. 2.
Figure 5:
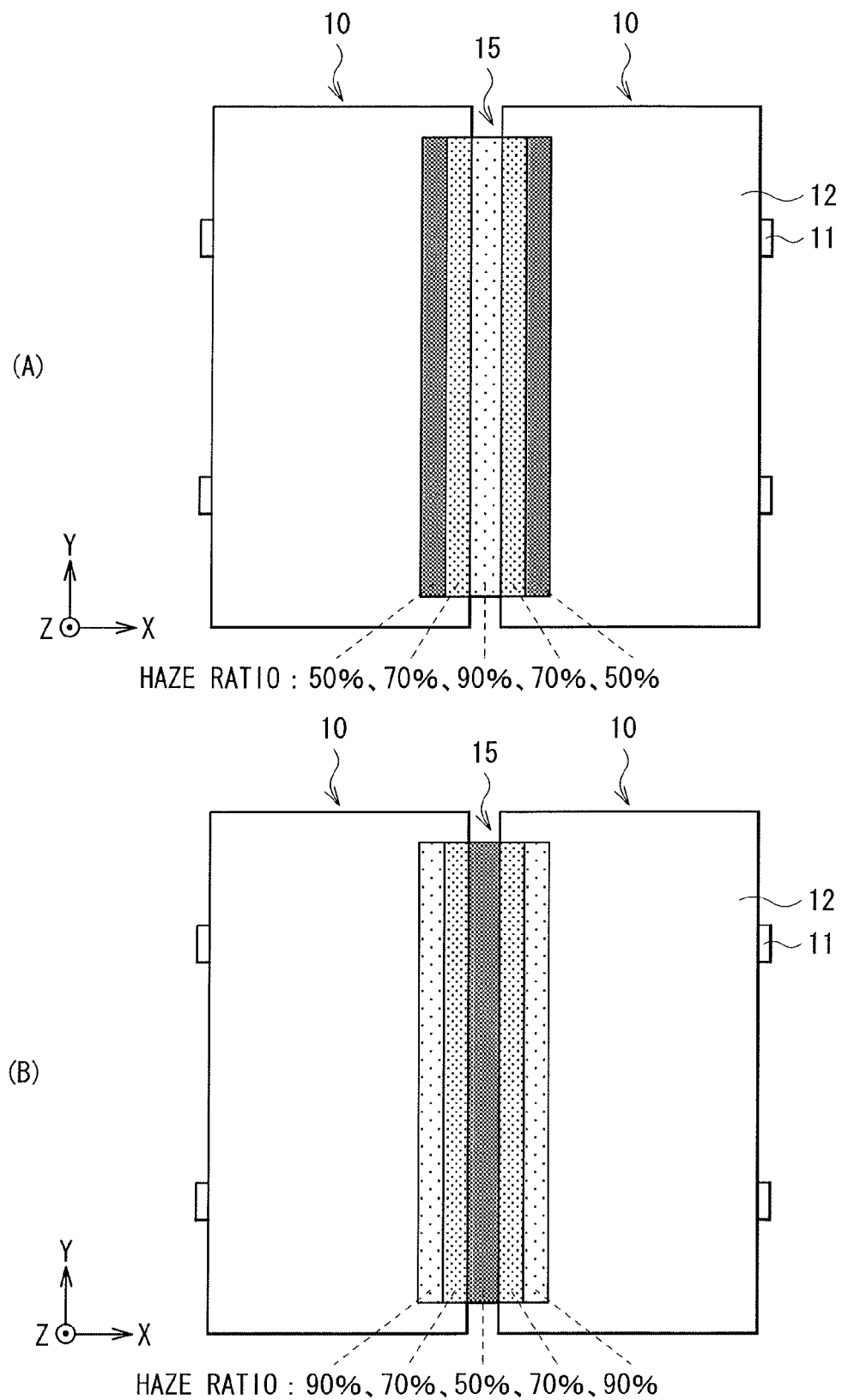
FIG. 5 is a plan view that illustrates another example of the detailed structure of the optical member illustrated in FIG. 2.
Figure 6:
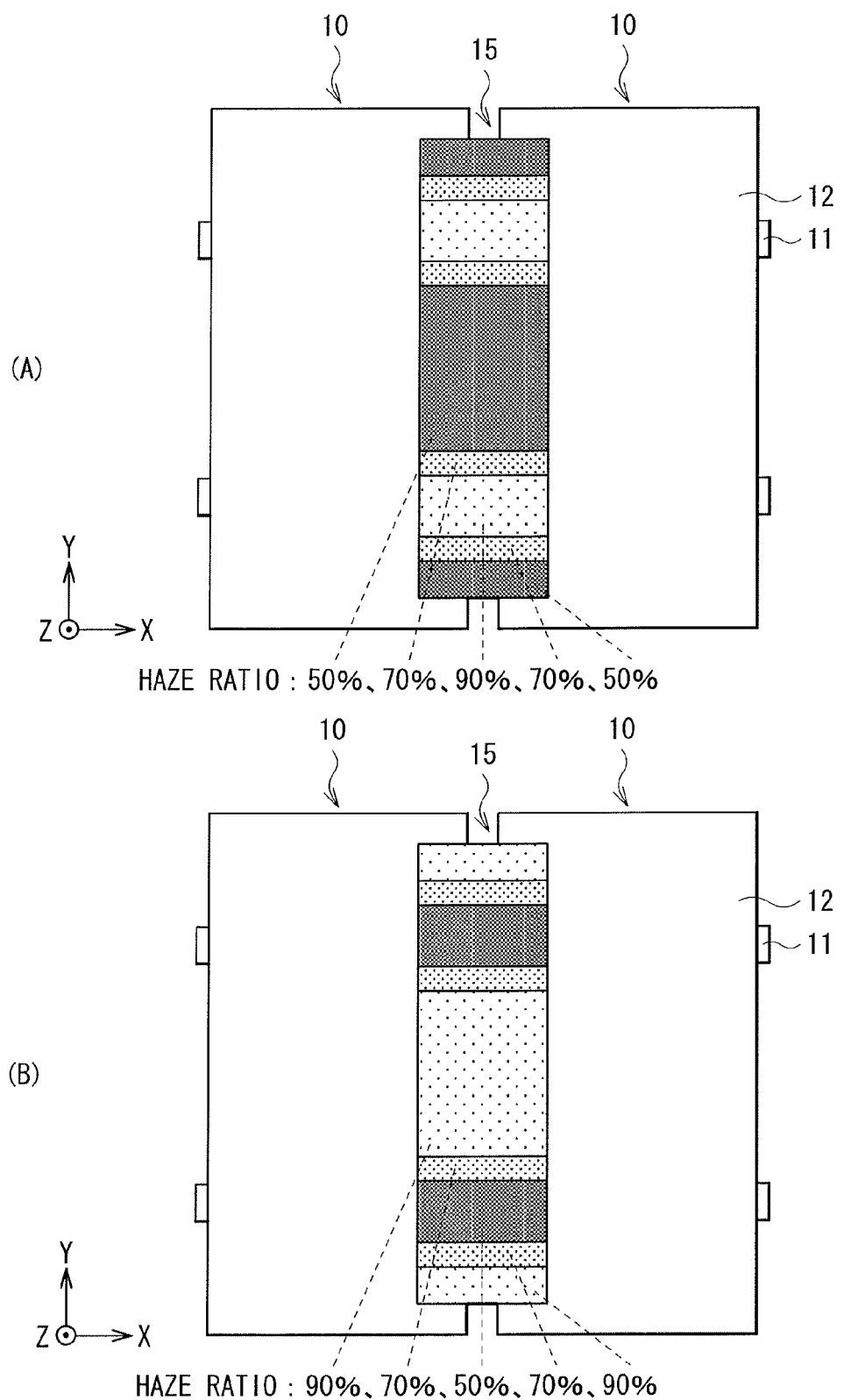
FIG. 6 is a plan view that illustrates another example of the detailed structure of the optical member illustrated in FIG. 2.
Figure 7:
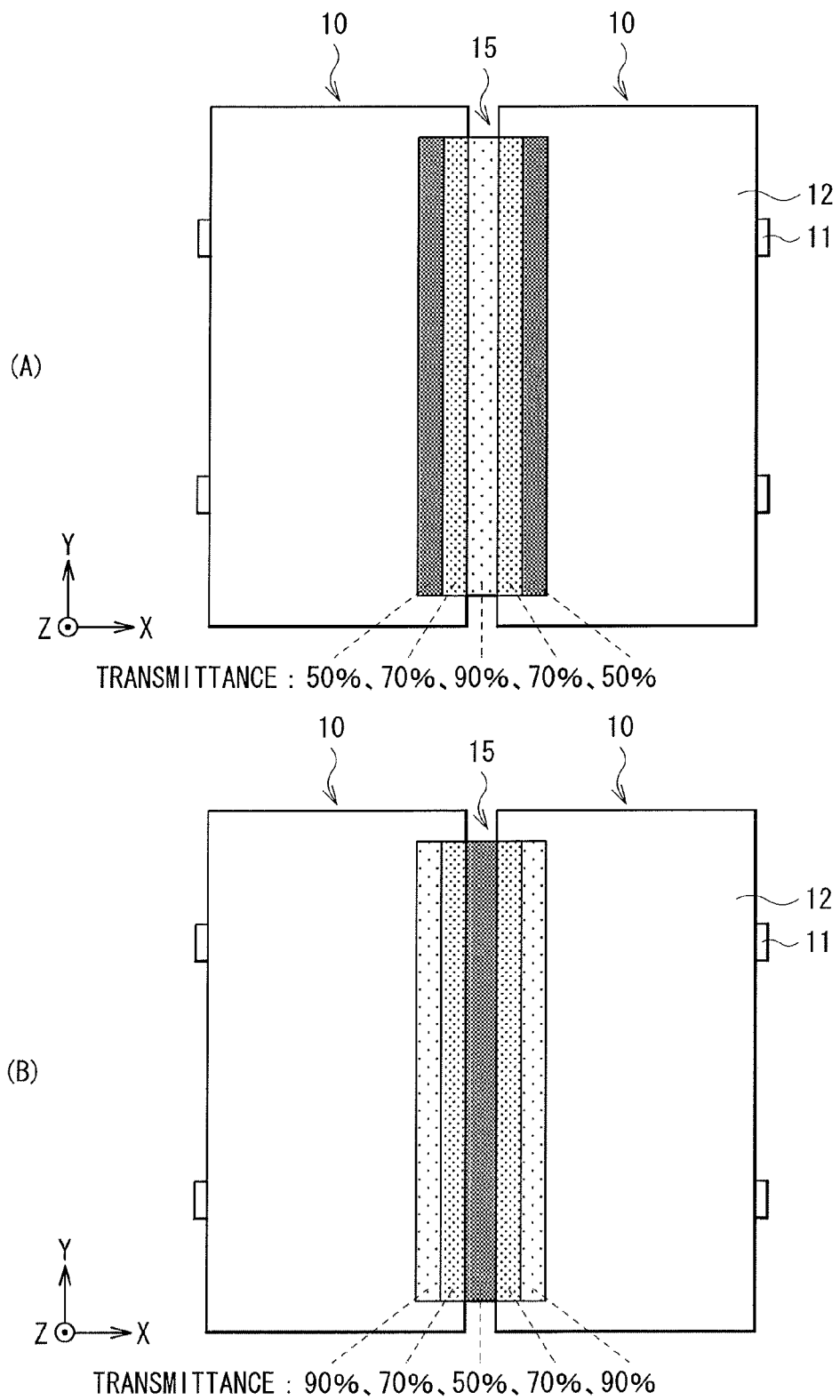
FIG. 7 is a plan view that illustrates another example of the detailed structure of the optical member illustrated in FIG. 2.
Figure 8:
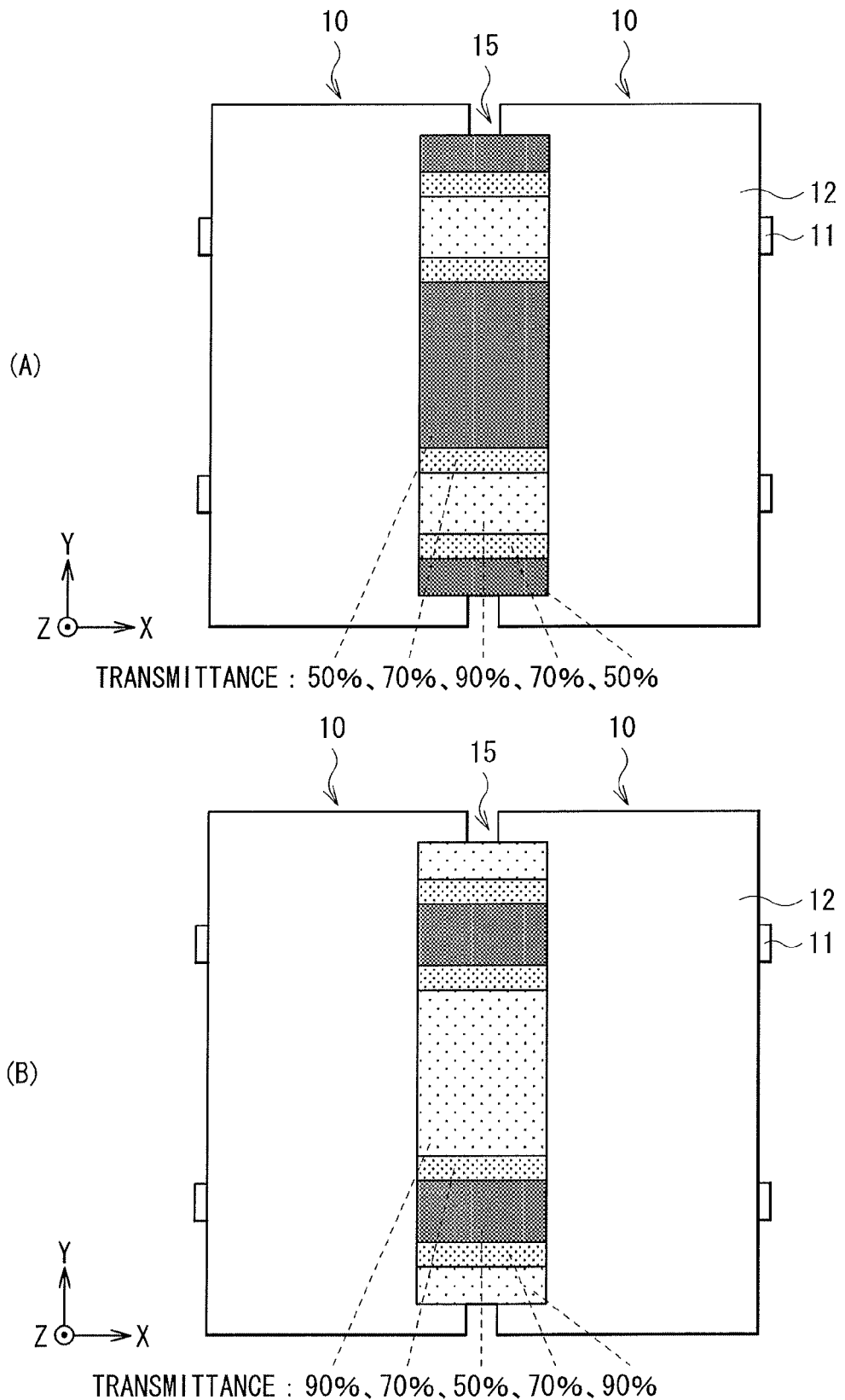
FIG. 8 is a plan view that illustrates another example of the detailed structure of the optical member illustrated in FIG. 2.

FIG. 1 illustrates a main structure of a surface light source device (a surface light source device 1) according to a first embodiment of the present invention in a plan view (X-Y plan view). Further, FIG. 2 illustrates a cross-sectional structure of the surface light source device 1 (a cross-sectional structure viewed along an arrow part II-II in FIG. 1) in a Z-X cross section. This surface light source device 1 is used, for example, as a backlight source for a display device such as a liquid crystal display, and is a light source that performs surface light emission with an X-Y plane serving as a light-emission surface. Further, in this light-emission surface, there are arranged plural unit light-source sections 10 capable of illuminating independently of one other (in FIG. 1, the plural unit light-source sections 10 are arranged along an X-axis direction).

Each of the unit light-source sections 10 is a light source section that emits emission light Lout in the normal direction of a Z-axis, and is configured by: a light guiding plate 12 constitutes the light-emission surface; and plural light sources 11 arranged on plural sides of this light guiding plate 12. In this unit light-source section 10, although details will be provided later, by light emissions of the respective light sources 11 on the respective sides, uneven light-emission intensity distributions independent of each other within a light-emission surface are formed. Incidentally, a reflecting sheet 13 is disposed on an undersurface side of each of the unit light-source sections 10, and plural optical sheets 141 through 144 are disposed on a light-emission surface side (a top-surface side). Furthermore, these reflecting sheet 13, optical sheets 141 through 144 and an optical member 15 are for emitting the emission light Lout efficiently.

The light guiding plate 12 is an optical member for transmitting and thereby guiding light from each of the light sources 11 toward the light-emission surface (top-surface side) side or the undersurface side, and is made of, for example, a glass material or the like. However, this light guiding plate 12 may be made of other material as long as the material transmits the light from the light sources 11. Further, the light guiding plate 12 may not be a highly transparent material that causes the light from the light sources 11 to proceed straight, but may be a light scattering material or a light diffusing material in which light-scattering minute particles are dispersed. Even with such a material having the light-scattering minute particles, as long as an optical property desired for the light-emission surface is obtained, it is possible to use any material. Furthermore, the top surface and the undersurface of the light guiding plate 12 may be mirrors, and may have been subjected to texturing, dot processing, prism processing or the like to change propagation way of light from the light source 11 and emission way to the light-emission surface. Furthermore, the shape, size, reflective index, density, density distribution and the like of the light guiding plate 12 may be freely adjusted to obtain desired properties. Moreover, the direction in which the light guiding plates 12 are arranged and the length of the light guiding plate may be freely adjusted.

On each of a pair of opposed sides of the light guiding plate 12, plural (here, six) light sources 11 are arranged. This light source 11 is configured by, for example, an LED (LightEmitting Diode: light-emitting diode). Incidentally, the light sources 11 may be spaced uniformly or spaced at irregular intervals. Further, the number of light sources 11 for each of the light guiding plates 12 may be adjusted to match with, for example, the length of the light guiding plate 12.

The reflecting sheet 13 is formed by a white PET sheet, a diffuse reflecting sheet, a silver sheet, an ESR film or the like. This reflecting sheet 13 is for reflecting the emission light, which is emitted from each of the unit light-source sections 10 toward a side opposite to the light-emission surface side, toward the light-emission surface side.

Each of the optical sheets 141 through 144 is formed by a diffusion sheet, a diffuser, a prism sheet, a lens sheet, a luminance increasing film, a polarizing plate or the like.

The optical member 15 is formed by a material such as an optical sheet, a reflecting member, a diffusion member or the like. This optical member 15 is for improving an optical property and appearance of a boundary of the unit light-source sections 10, and is arbitrarily disposed. Incidentally, in order to further improve these optical property and appearance of the boundary of the unit light-source sections 10, for example, as illustrated in FIG. 3 through FIG. 8, the optical property of the optical member 15 may be changed depending on the location without being made uniform on the entire surface. Specifically, as illustrated in, for example, FIG. 3(A) and (B) as well as FIG. 4(A) and (B), reflectance properties (reflectance) of the optical member 15 may vary according to location; as illustrated in, for example, FIG. 5(A) and (B) as well as FIG. 6(A) and (B), diffusion properties (haze ratios) of the optical member 15 may vary according to location; or as illustrated in, for example, FIG. 7(A) and (B) as well as FIG. 8(A) and (B), transmission properties of the optical member 15 may vary according to location.

Figure 11:
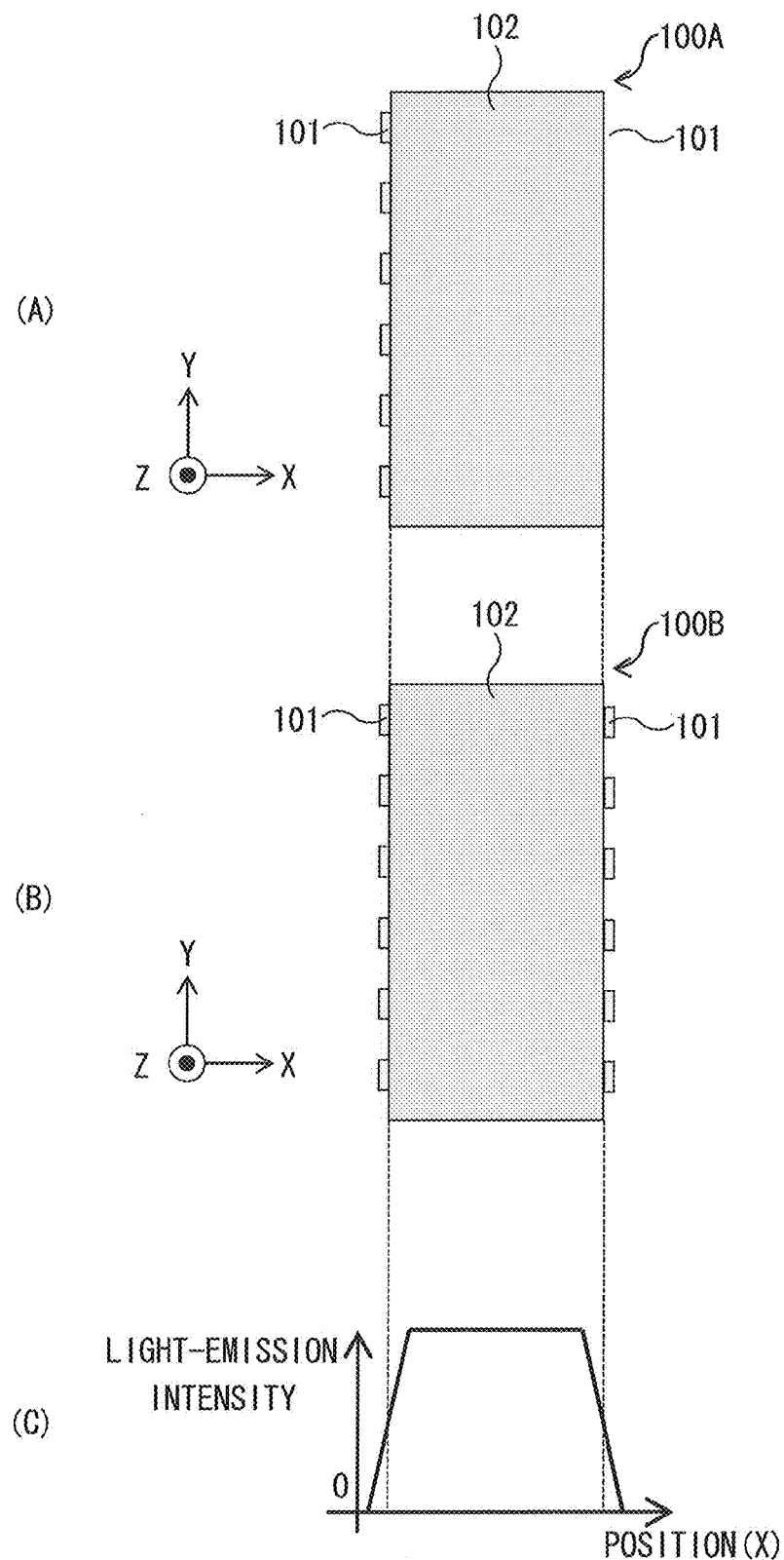
FIG. 11 is a diagram for explaining a light-emission mode of a unit light-source section of related art according to a comparative example.
Figure 12:
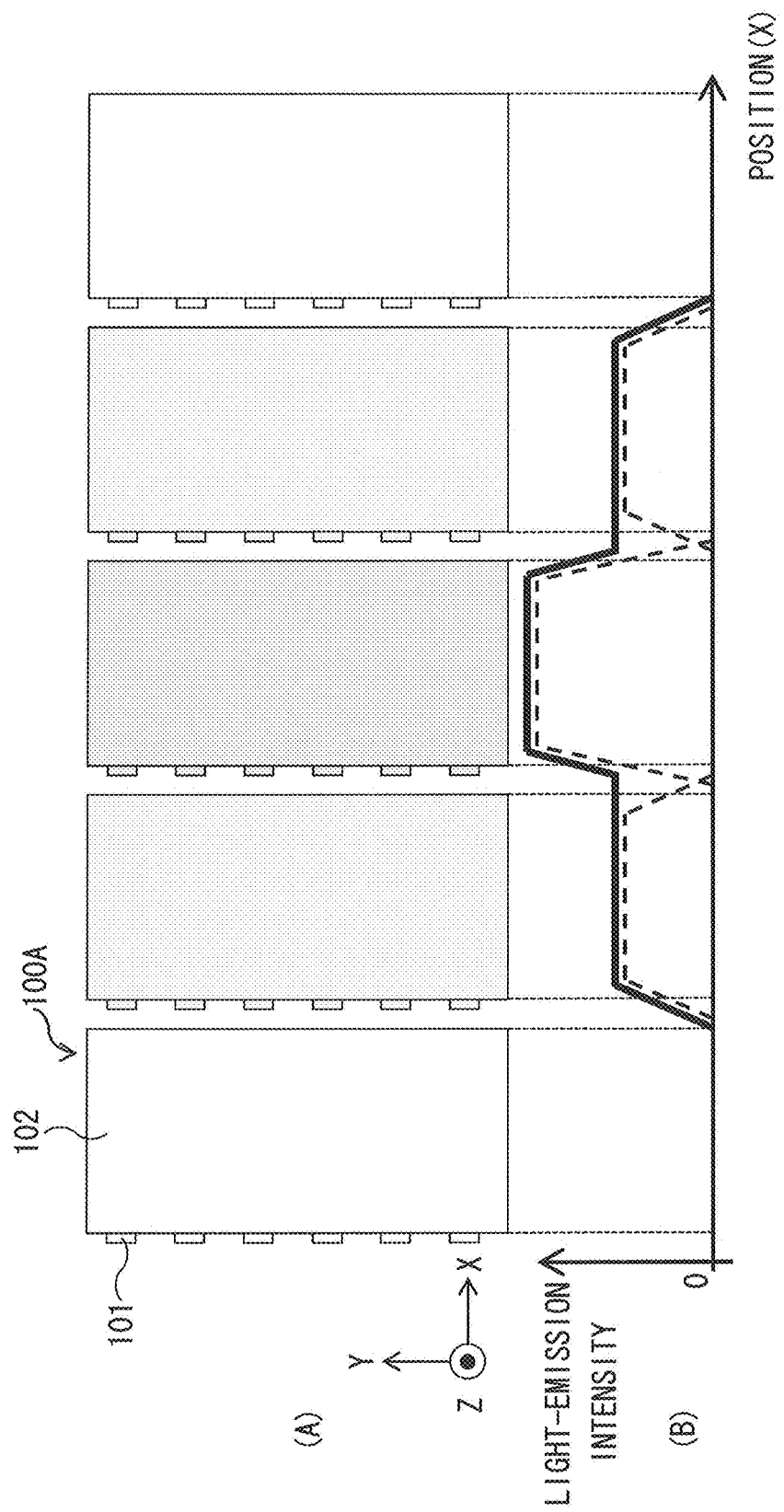
FIG. 12 is a diagram that illustrates an example of a light-emission intensity distribution of a 1 surface light source device of related art according to the comparative example.
Figure 13:
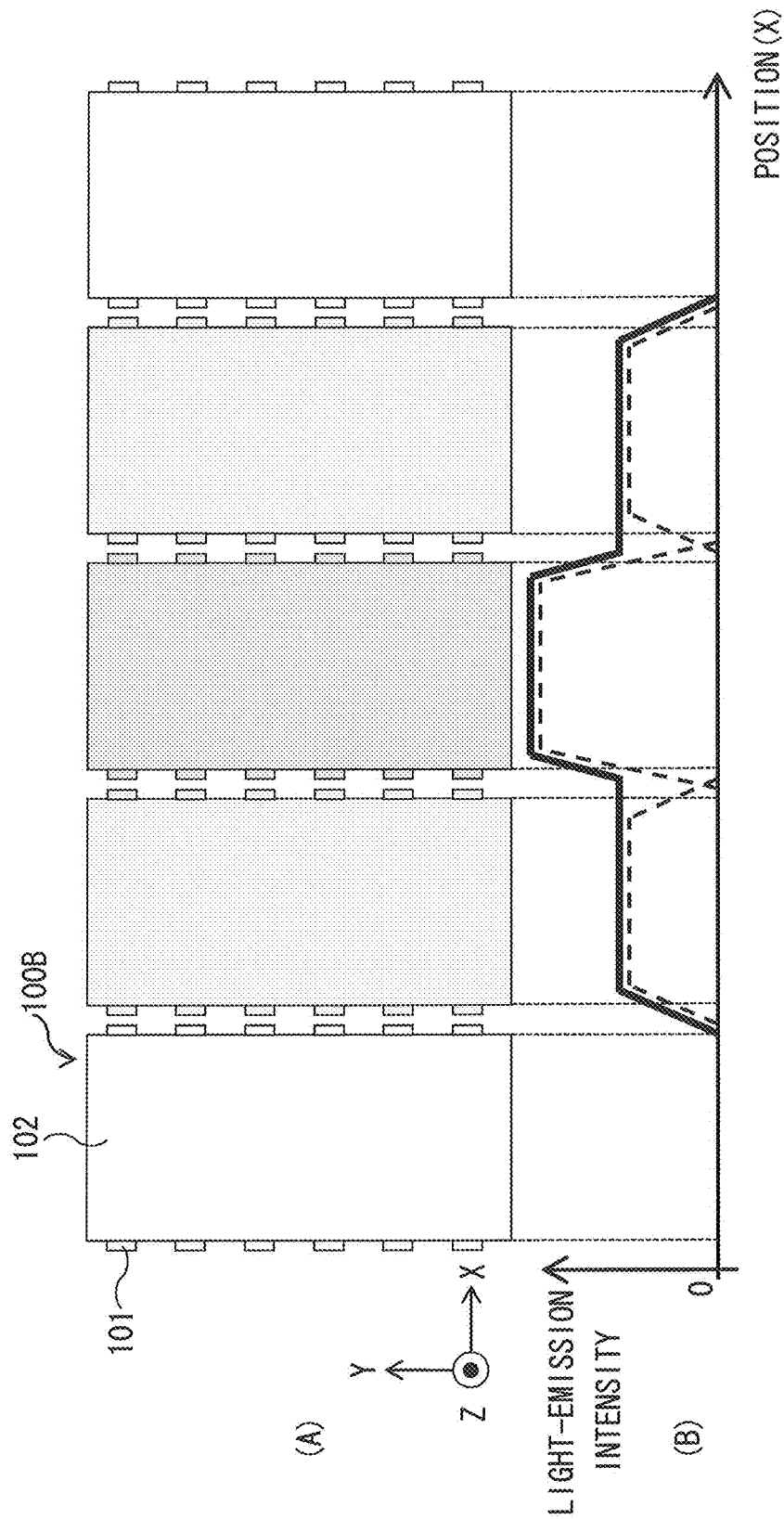
FIG. 13 is a diagram that illustrates other example of the light-emission intensity distribution of the conventional surface light source device according to the comparative example.

Next, with reference to FIG. 9 through FIG. 21, operation and effects of the entire surface light source device 1 according to the present embodiment will be described in detail in comparison with a comparative example. Here, FIG. 11 illustrates structures and light-emission intensity distributions of unit light-source sections 100A and 100B in a surface light source device of related art according to the comparative example. Further, each of FIG. 12 and FIG. 13 illustrates the light-emission intensity distributions in the surface light source device according to the comparative example.

In the surface light source device 1 according to the present embodiment, in each of the unit light-source sections 10, the light from the light source 11 transmits within the light guiding plate 12 and is guided toward the top-surface side or the undersurface side. Subsequently, the emission light toward the undersurface is reflected by the reflecting sheet 13 toward the top-surface side, and this reflected light is emitted as the emission light Lout via the optical sheets 141 through 144 together with the emission light toward the top-surface side, and thereby the surface light emission is performed.

At the time, in each of the unit light-source sections 10, by the light emissions of the respective light sources 11 on the respective sides, the uneven light-emission intensity distributions independent of each other within the light-emission surface are formed. Specifically, as illustrated in, for example, FIG. 9(A) and (B), by the light emissions of the light sources 11 on one of the pair of sides on which the light sources 11 are arranged (see a diagram on the left side of FIG. 9) and the light emissions of the light sources 11 on the other of this pair of sides (see a diagram in the middle of FIG. 9), the uneven light-emission intensity distributions independent of each other within the light-emission surface are formed. Further, in the present embodiment, as illustrated on the left side and in the middle of FIG. 9(B), within the light-emission surface of each of the unit light-source sections 10, from the side of the emitting light source 11 to the opposite side, the light-emission intensity of the light emission of this light source 11 gradually decreases. Incidentally, "100%" in FIG. 9(A) represents the light-emission intensity of that side, which will represent likewise in the following.

Figure 9:
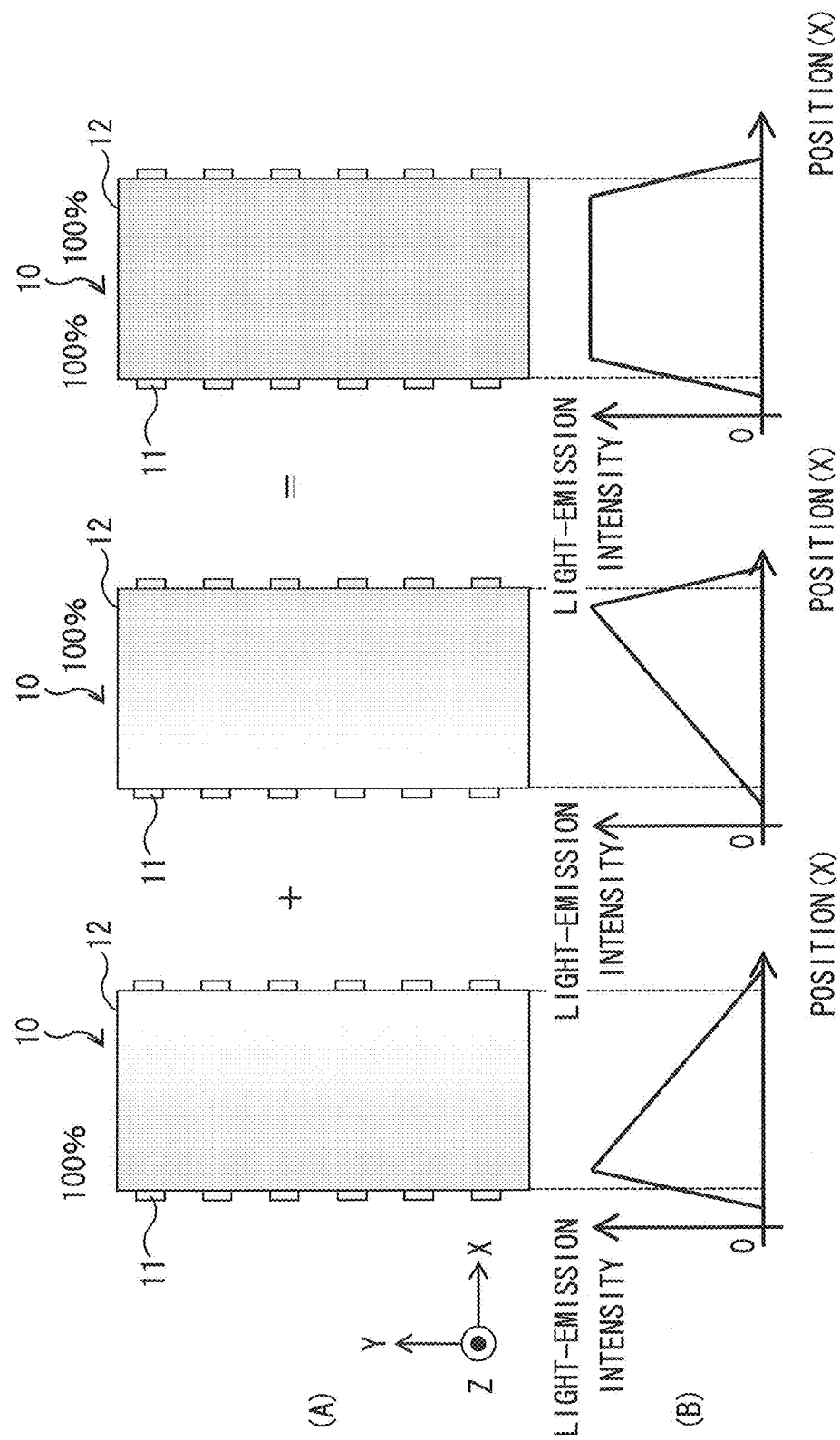
FIG. 9 is a diagram for explaining an example of a light-emission mode of a unit light-source section illustrated in FIG. 1.

Therefore, the uneven light-emission intensity distribution by the light emission of the light source 11 on the one side (the uneven light-emission intensity distribution on the left side of FIG. 9(B)) and the uneven light-emission intensity distribution by the light emission of the light source 11 on the other side (the uneven light-emission intensity distribution in the middle of FIG. 9(B)) are superimposed, and thereby it is possible to form a uniform light-emission intensity distribution within the light-emission surface of each of the unit light-source sections 10 (see a diagram on the right side of FIG. 9). Further, as illustrated in, for example, FIG. 10(A) and (B), the uneven light-emission intensity distribution by the light emission of the light source 11 on the one side (the uneven light-emission intensity distribution on the left side of FIG. 10(B)) and the uneven light-emission intensity distribution by the light emission of the light source 11 on the other side (the uneven light-emission intensity distribution in the middle of FIG. 10(B)) are superimposed, and thereby it is also possible to form an uneven light-emission intensity distribution within the light-emission surface of each of the unit light-source sections 10 (see a diagram on the right side of FIG. 10).

On the other hand, in the surface light source device according to the comparative example, like, for example, the unit light-source section 100A illustrated in FIG. 11(A) or the unit light-source section 100B illustrated in FIG. 11(B), in each of light guiding plates 102, a light-emission intensity distribution within a light-emission surface by light from light source 101 is uniform (see FIG. 11(C)). Thus, the light-emission surface of each of the light guiding plates 102 functions as a single partial lighting area, and as illustrated in, for example, FIG. 12 and FIG. 13, there is realized partial driving in which an in-plane light-emission intensity distribution of the entire surface light source device partially changes.

However, in these surface light source devices according to the comparative examples, in each of the light guiding plates 102 as described above, the light-emission intensity distribution within the light-emission surface by the light from the light source 101 is uniform and thus, as apparent from FIG. 12(B) and FIG. 13(B), the light-emission intensity distribution abruptly changes at a joint of the unit light-source sections 100A and 100B. Therefore, appearance of a boundary between the partial lighting areas is unnatural and thus, when in use as, for example, a backlight source of a liquid crystal display, display image quality deteriorates.

Figure 10:
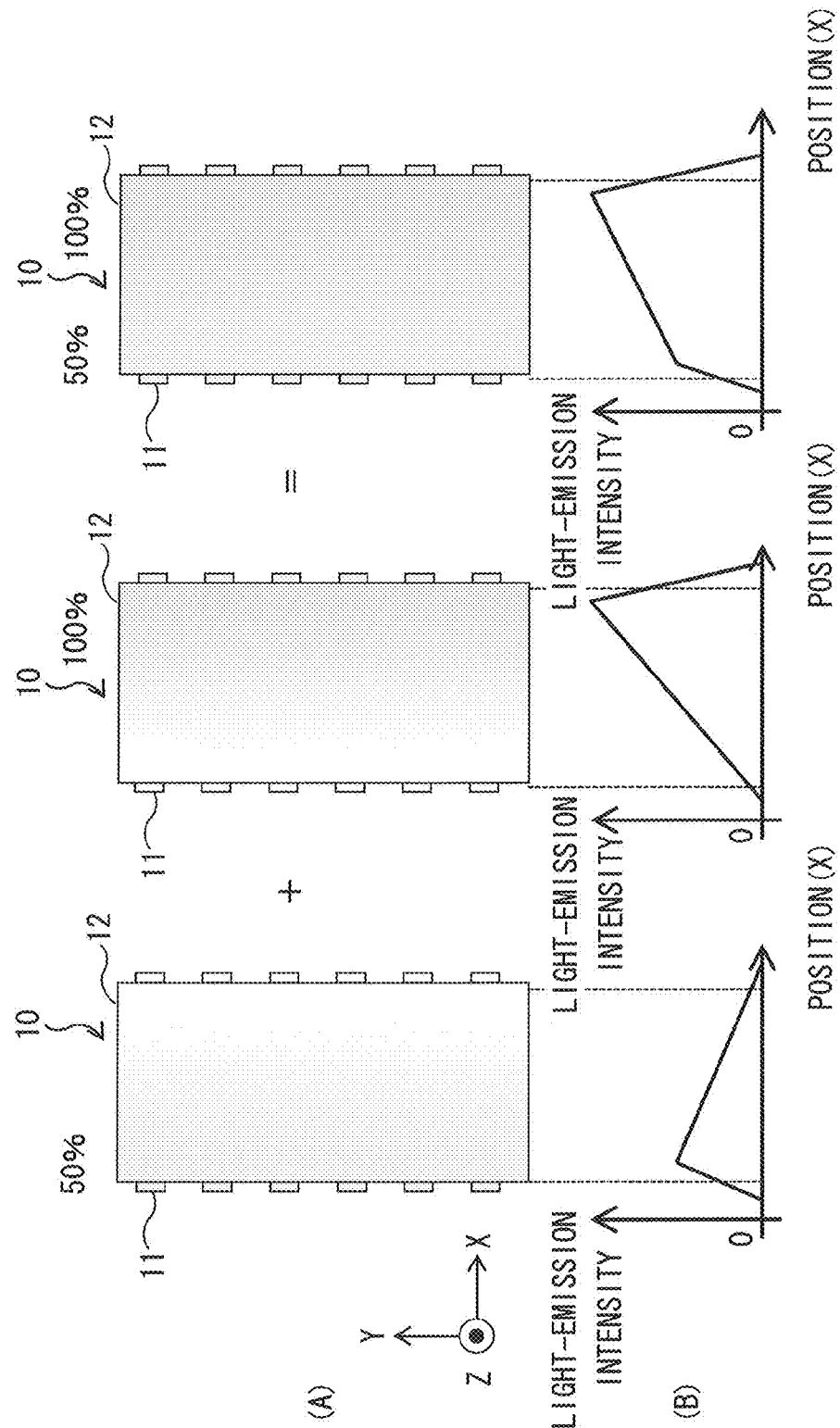
FIG. 10 is a diagram for explaining another example of the light-emission mode of the unit light-source section illustrated in FIG. 1.

In contrast, in the surface light source device 1 according to the present embodiment, as illustrated in FIG. 9 and FIG. 10, in each of the unit light-source sections 10 capable of lighting independently of one another, by the light emissions of the light sources 11 on the respective sides, the uneven light-emission intensity distributions independent of each other within the light-emission surface are formed. Further, these uneven light-emission intensity distributions are superimposed, and thereby it is possible to form an arbitrary light-emission intensity distribution on the light-emission surface of each of the unit light-source sections 10.

Therefore, in the entire surface light source device in which two or more such unit light-source sections 10 are arranged, as illustrated in, for example, FIG. 14(A) and (B), by adjusting and inclining the light-emission intensities of the light sources 11 on the sides of each of the unit light-source sections 10, a moderate change of the light-emission intensity is obtained at the joint of the unit light-source sections 10.

Incidentally, by adjusting a balance in the light-emission intensity of the light sources 11 on the sides of each of the unit light-source sections 10, as illustrated in, for example, FIG. 15(A) and (B), it is possible to change a range of the light-emission intensity distribution and further, as illustrated in, for example, FIG. 16(A) and (B), it is possible to change inclination of the light-emission intensity distribution.

As described above, in the present embodiment, in each of the unit light-source sections 10 capable of lighting independently of each other, the uneven light-emission intensity distributions independent of each other within the light-emission surface are formed and thus, it is possible to form an arbitrary light-emission intensity distribution on the light-emission surface of each of the unit light-source sections 10. Therefore, by adjusting the light-emission intensity distribution of each of the unit light-source sections 10, it is possible to make the appearance of the boundaries between the partial lighting areas more natural than related art.

Figure 14:
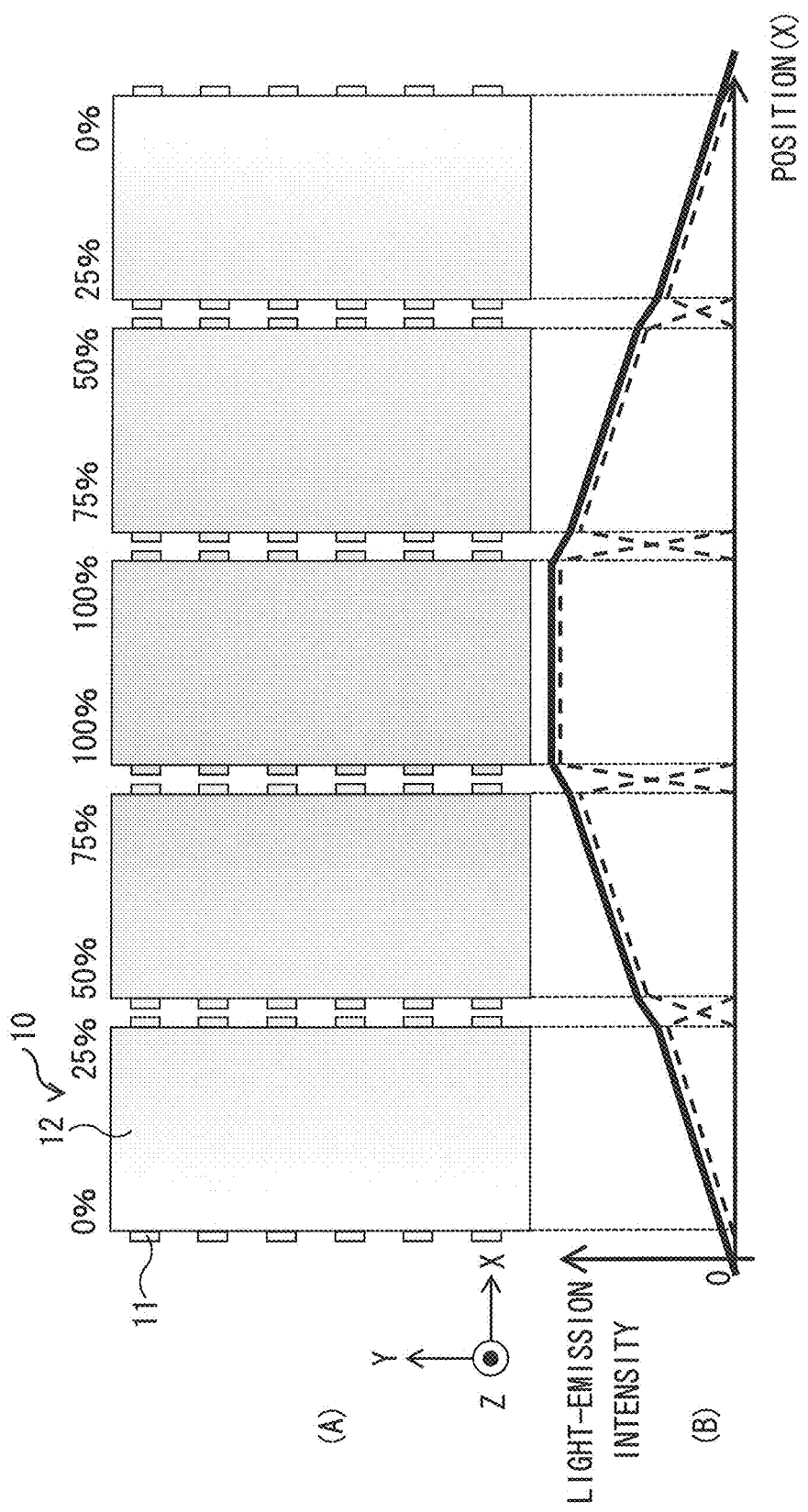
FIG. 14 is a diagram that illustrates an example of a light-emission intensity distribution of the surface light source device according to the first embodiment.
Figure 15:
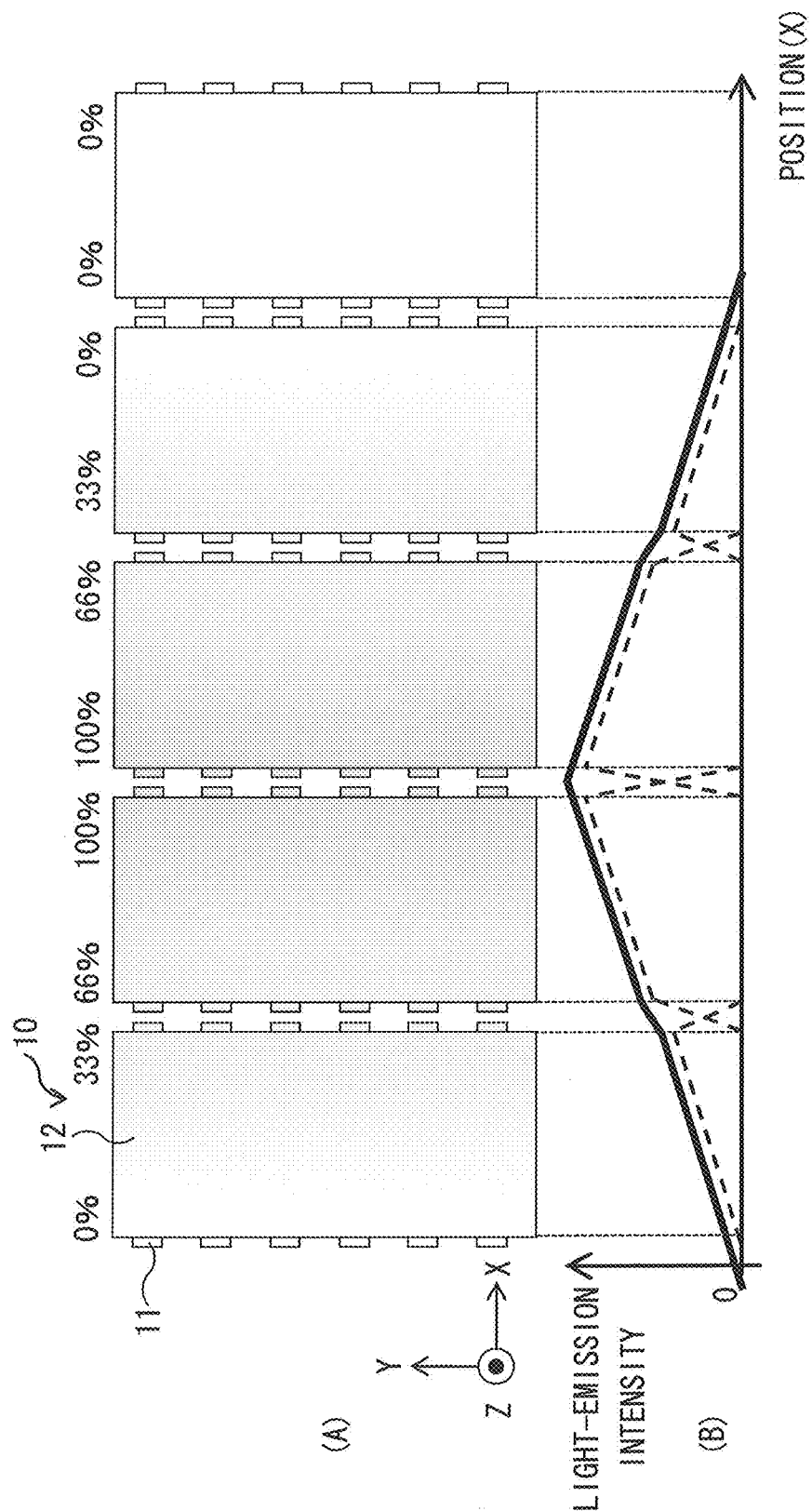
FIG. 15 is a diagram that illustrates another example of the light-emission intensity distribution of the surface light source device according to the first embodiment.
Figure 16:
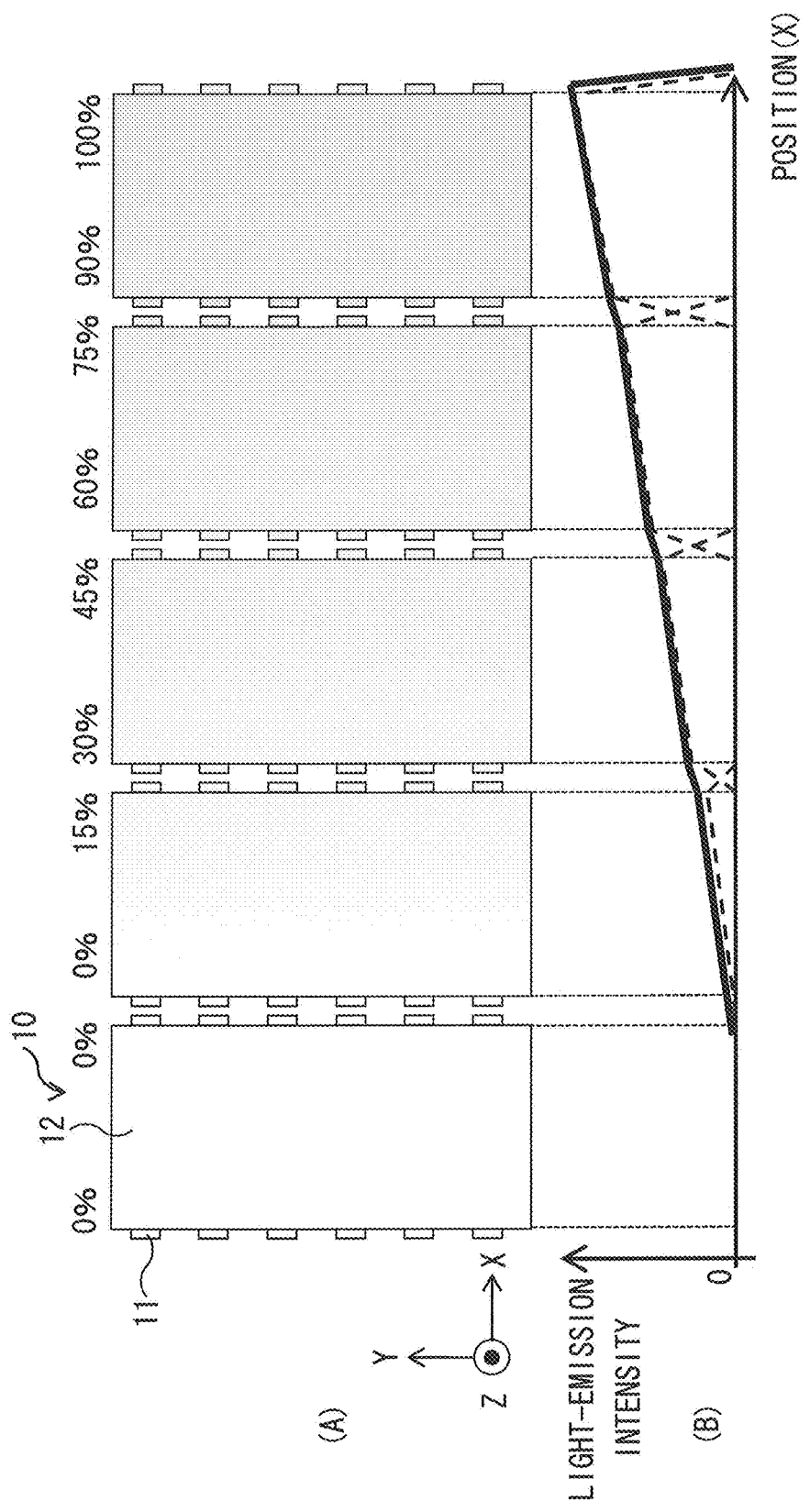
FIG. 16 is a diagram that illustrates another example of the light-emission intensity distribution of the surface light source device according to the first embodiment.
Figure 17:
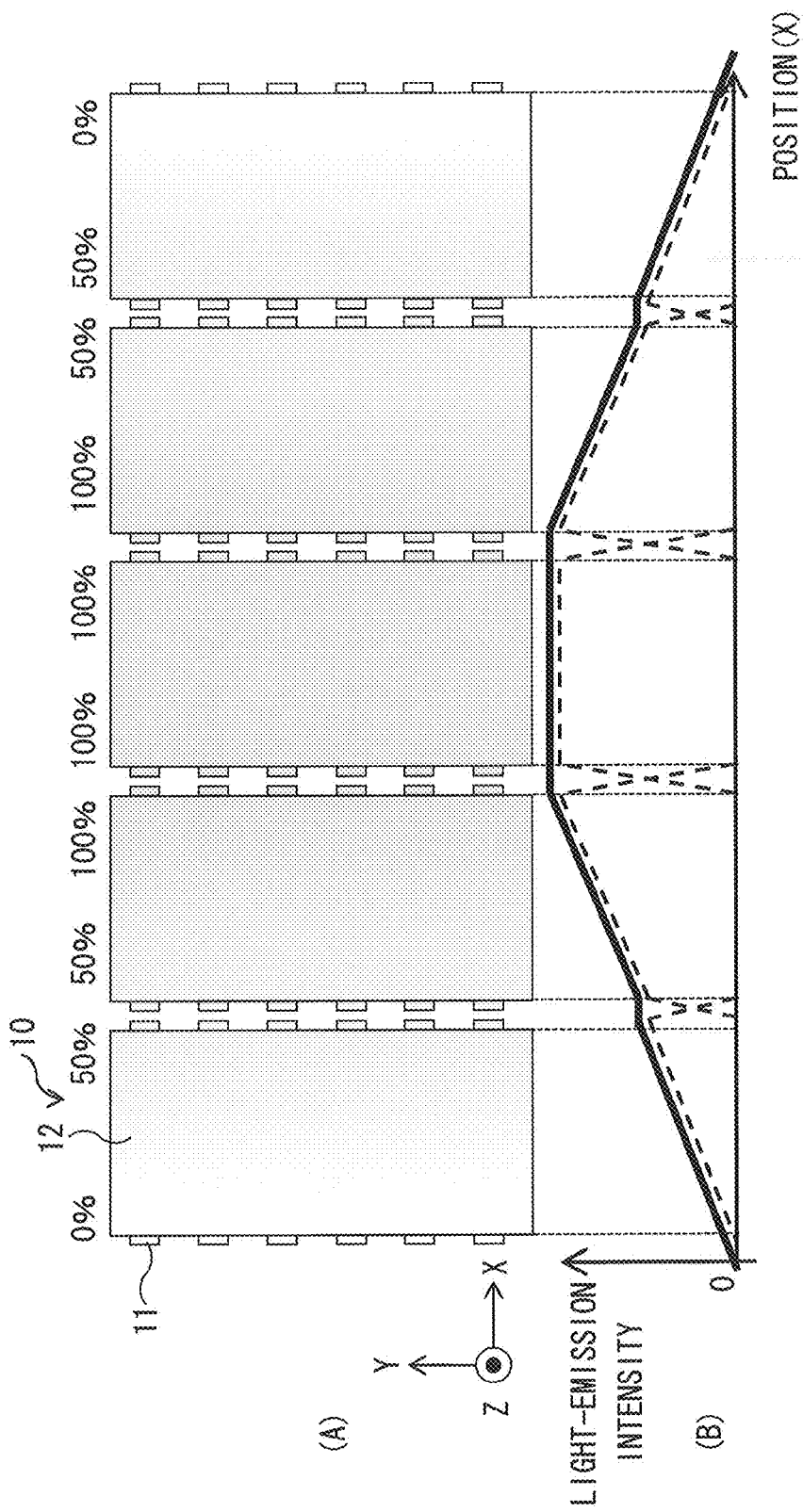
FIG. 17 is a diagram that illustrates another example of the light-emission intensity distribution of the surface light source device according to the first embodiment.
Figure 18:
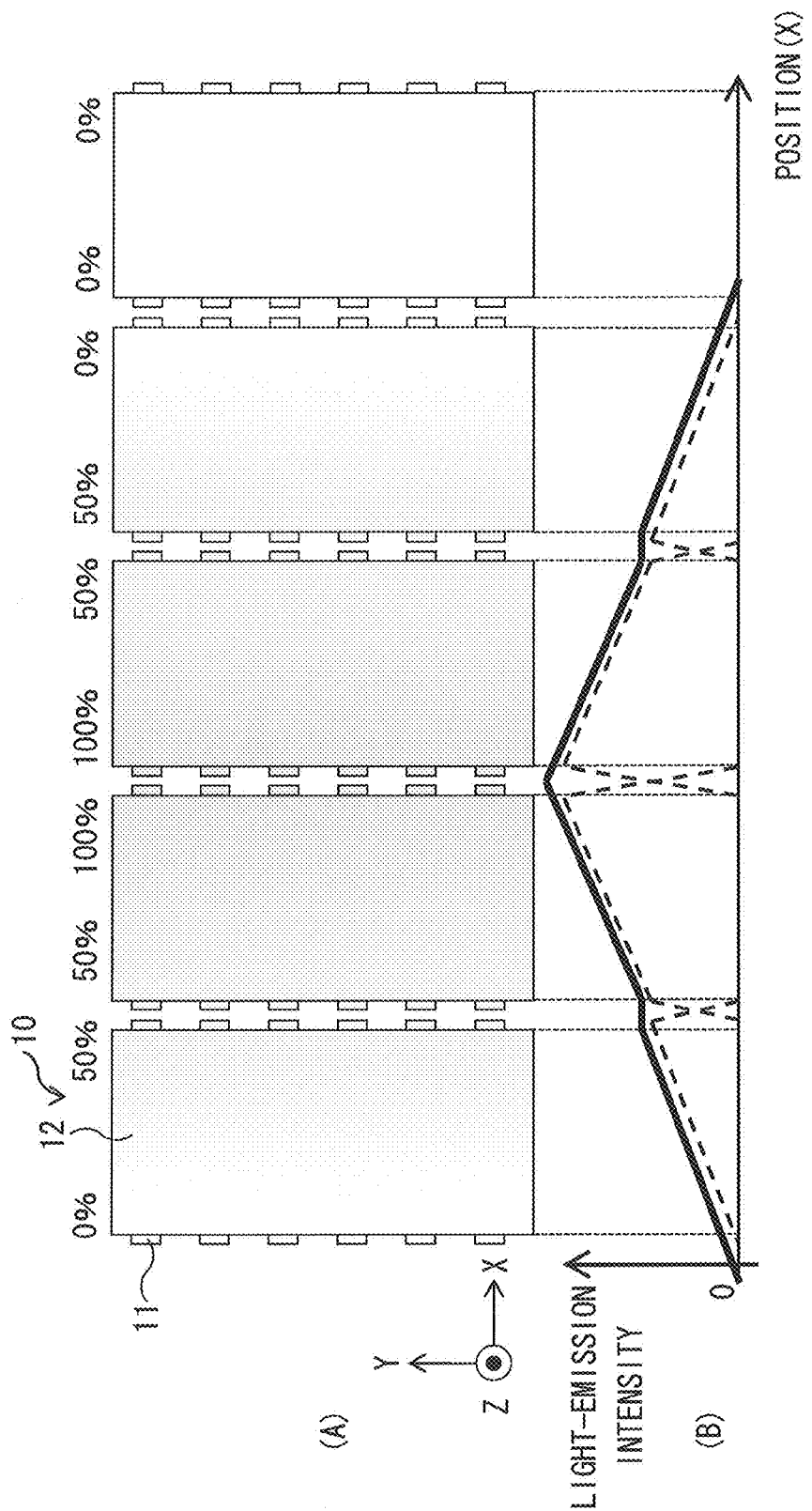
FIG. 18 is a diagram that illustrates another example of the light-emission intensity distribution of the surface light source device according to the first embodiment.
Figure 19:
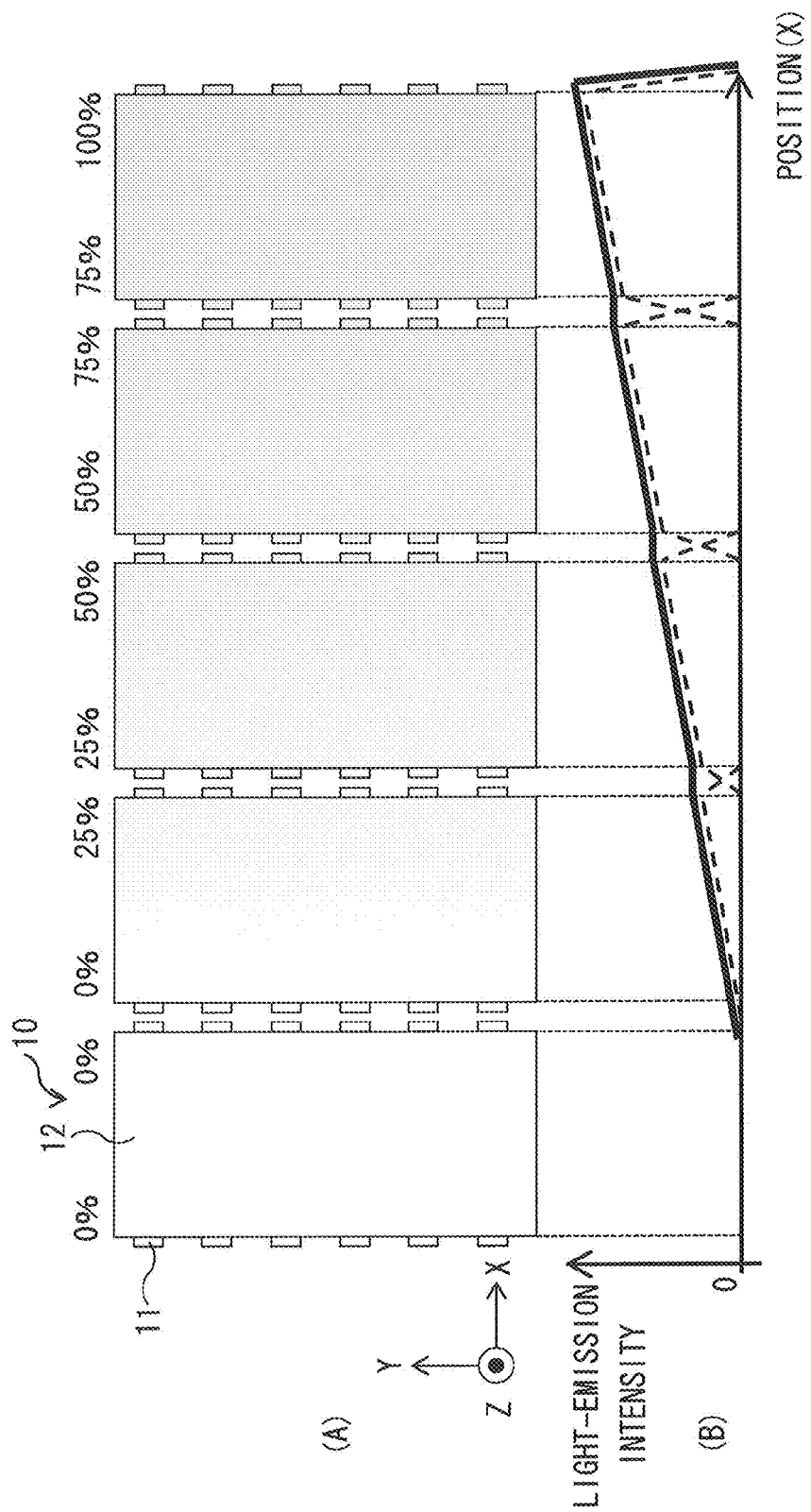
FIG. 19 is a diagram that illustrates another example of the light-emission intensity distribution of the surface light source device according to the first embodiment.
Figure 20:
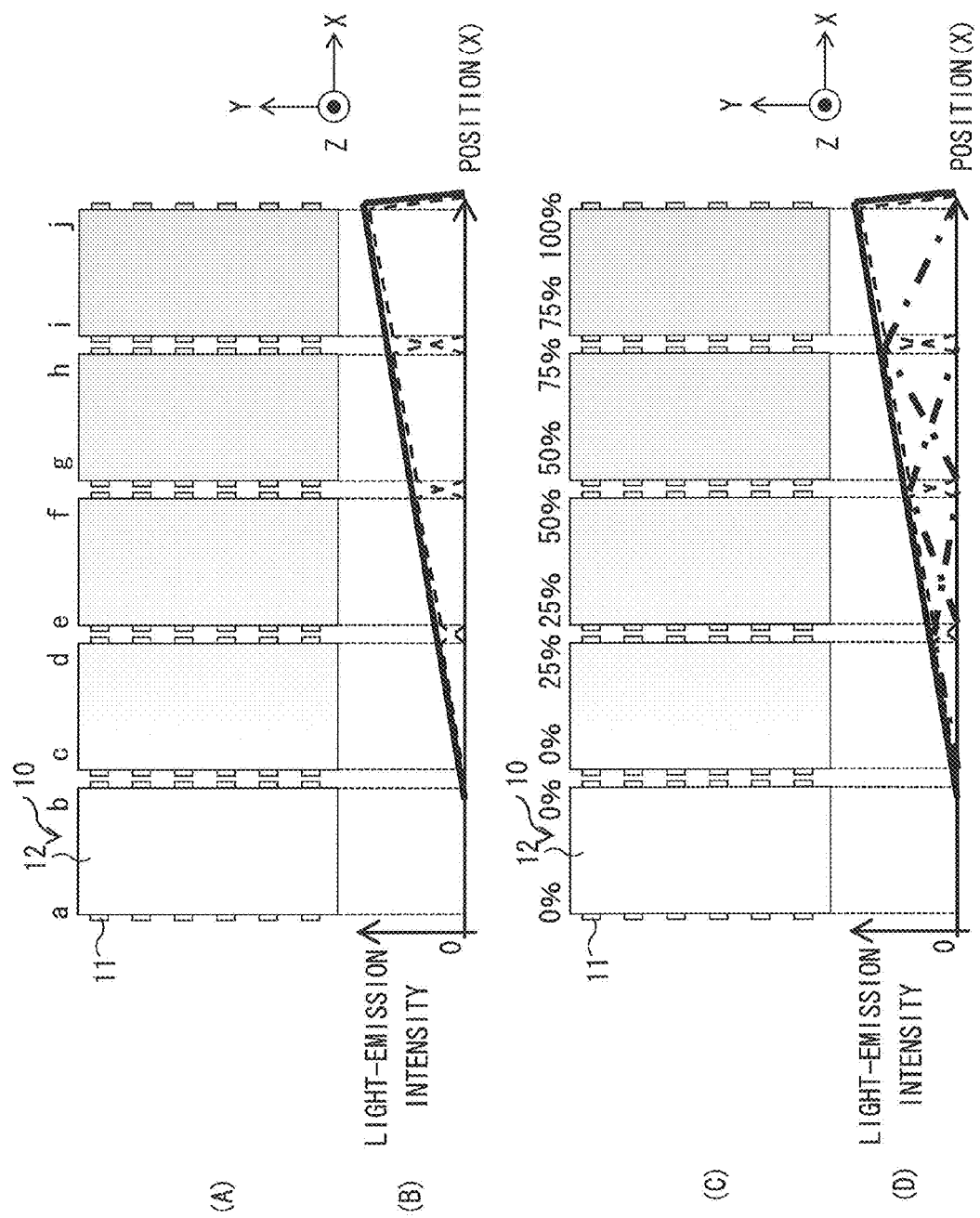
FIG. 20 is a diagram that illustrates another example of the light-emission intensity distribution of the surface light source device according to the first embodiment.

Here, as illustrated in, for example, FIG. 14 through FIG. 16, when the light-emission intensity distribution gradually changes between the unit light-source sections 10 adjacent to each other, in these unit light-source sections 10 adjacent to each other, the light-emission intensities of the light sources 11 on the adjacent sides are desired to be, mutually, values of approximately the same tendency as the changing light-emission intensity distribution. Alternatively, as illustrated in, for example, FIG. 17 through FIG. 19, the light-emission intensities of the light sources 11 on the adjacent sides are desired to be values equal to each other. This is because it is possible to make the appearance of the boundaries between the partial lighting areas more natural. This will be described in detail by using FIG. 20(A) through FIG. 20 (D).

Figure 21:
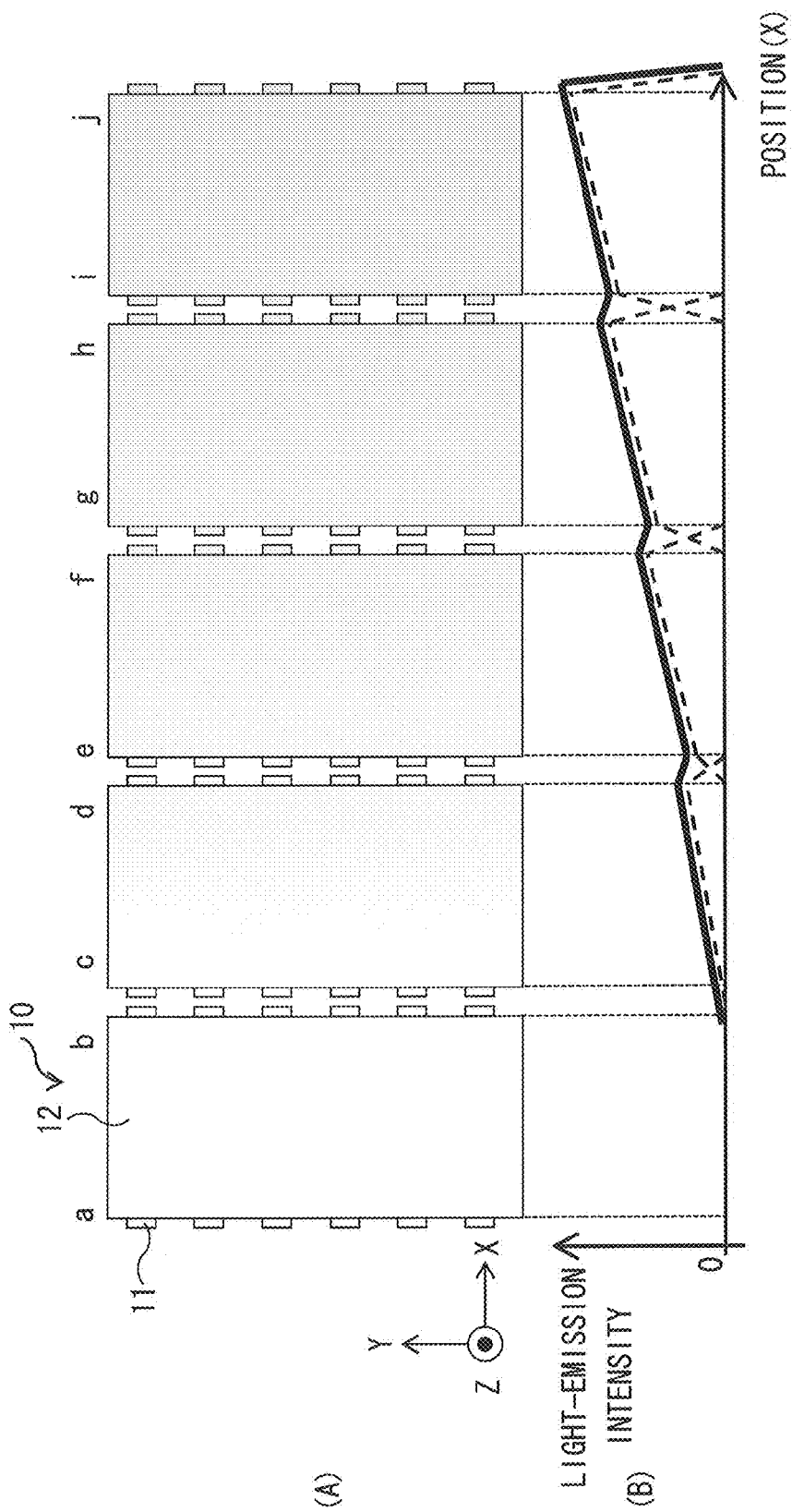
FIG. 21 is a diagram that illustrates another example of the light-emission intensity distribution of the surface light source device according to the first embodiment.

In FIG. 20(A) and FIG. 20(B), among five mutually adjacent unit light-source sections 10, from left to right (along a positive direction of an X-axis), light-emission intensity distributions in which the light-emission intensities by the light sources 11 become gradually higher are formed. In this case, between the adjacent unit light-source sections 10, between the light sources 11 arranged on the adjacent sides, the light-emission intensity of the light source 11 on the right side is desired to be greater than or equal to the light-emission intensity of the light source 11 on the left side. In other words, in this case, it is desirable that the following expressions (1) through (4) be satisfied. When these expressions (1) through (4) are satisfied, as indicated by, for example, alternate long and short dashed lines in FIG. 20(D), a single uniform and moderate light-emission intensity distribution is formed by a set of the light sources 11 arranged on the adjacent sides. Further, the light-emission intensity distributions of the respective sets are superimposed and thereby, as indicated with, for example, a solid line in FIG. 20(D), a moderate light-emission intensity distribution as a whole is formed. Therefore, the appearance of the boundaries between the partial lighting areas becomes more natural. Furthermore, on the contrary, when the above-mentioned expressions (1) through (4) are not satisfied between the light sources 11 arranged on the adjacent sides, in other words, when the following expressions (5) through (8) are satisfied, as illustrated in FIG. 21, a moderate light-emission intensity distribution is not formed. From this viewpoint as well, it is desirable that the following expressions (1) through (4) be satisfied.

$$\text{Light-emission intensity of light source on side } b \leq \text{Light-emission intensity of light source on side } c \quad (1)$$

$$\text{Light-emission intensity of light source on side } d \leq \text{Light-emission intensity of light source on side } e \quad (2)$$

$$\text{Light-emission intensity of light source on side } f \leq \text{Light-emission intensity of light source on side } g \quad (3)$$

$$\text{Light-emission intensity of light source on side } h \leq \text{Light-emission intensity of light source on side } i \quad (4)$$

$$\text{Light-emission intensity of light source on side } b > \text{Light-emission intensity of light source on side } c \quad (5)$$

$$\text{Light-emission intensity of light source on side } d > \text{Light-emission intensity of light source on side } e \quad (6)$$

$$\text{Light-emission intensity of light source on side } f > \text{Light-emission intensity of light source on side } g \quad (7)$$

$$\text{Light-emission intensity of light source on side } h > \text{Light-emission intensity of light source on side } i \quad (8)$$

Figure 22:
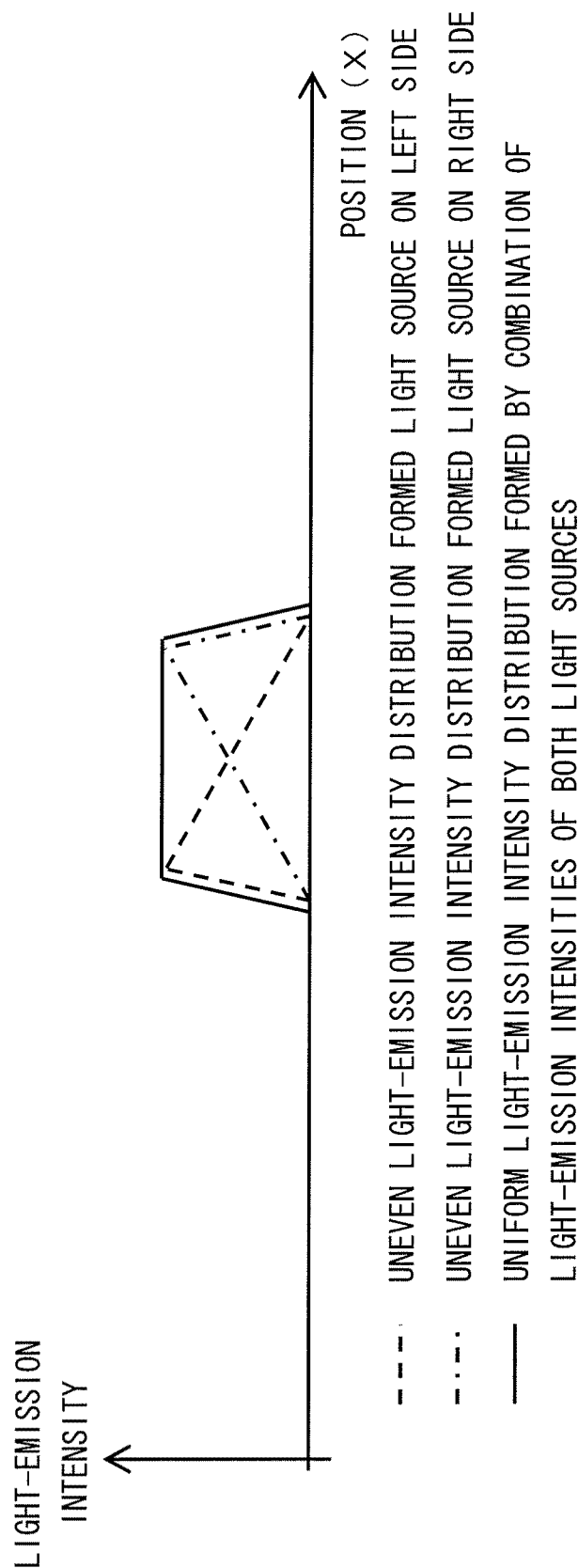
FIG. 22 is a diagram that illustrates another example of the light-emission intensity distribution of the surface light source device according to the first embodiment.
Figure 23:
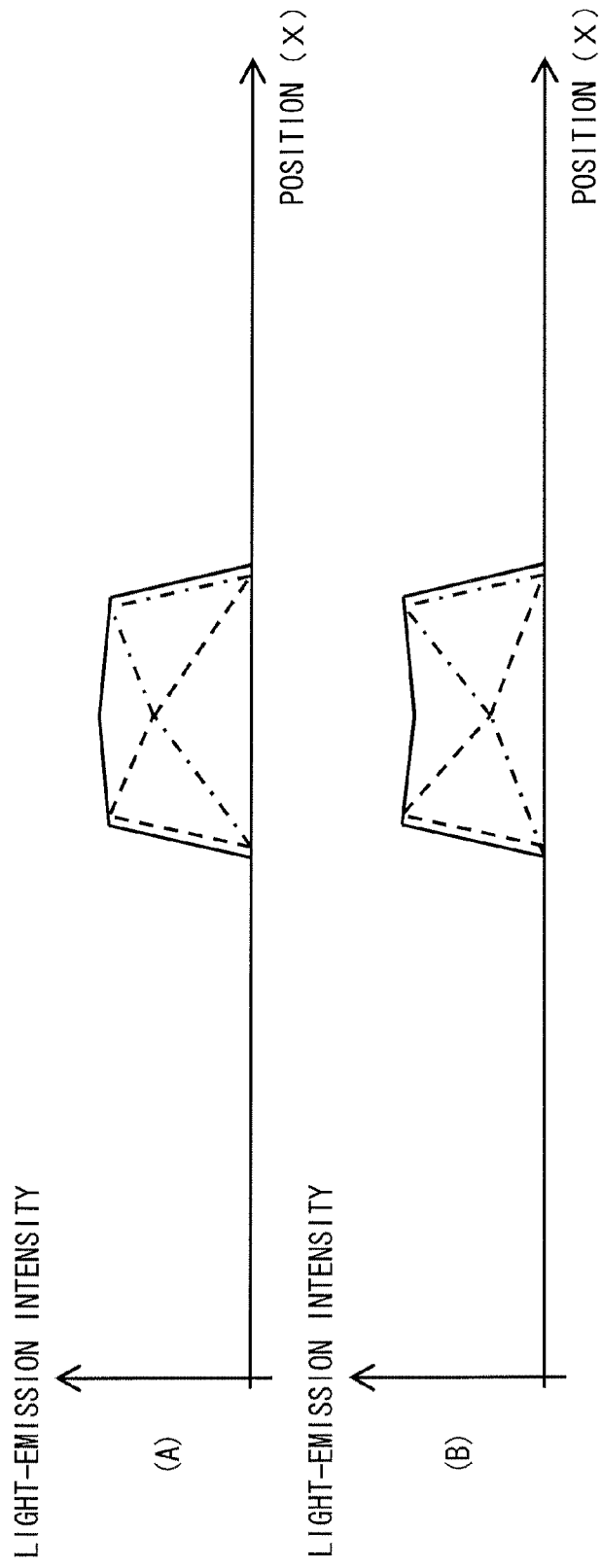
FIG. 23 is a diagram that illustrates another examples of the light-emission intensity distribution of the surface light source device according to the first embodiment.
Figure 24:
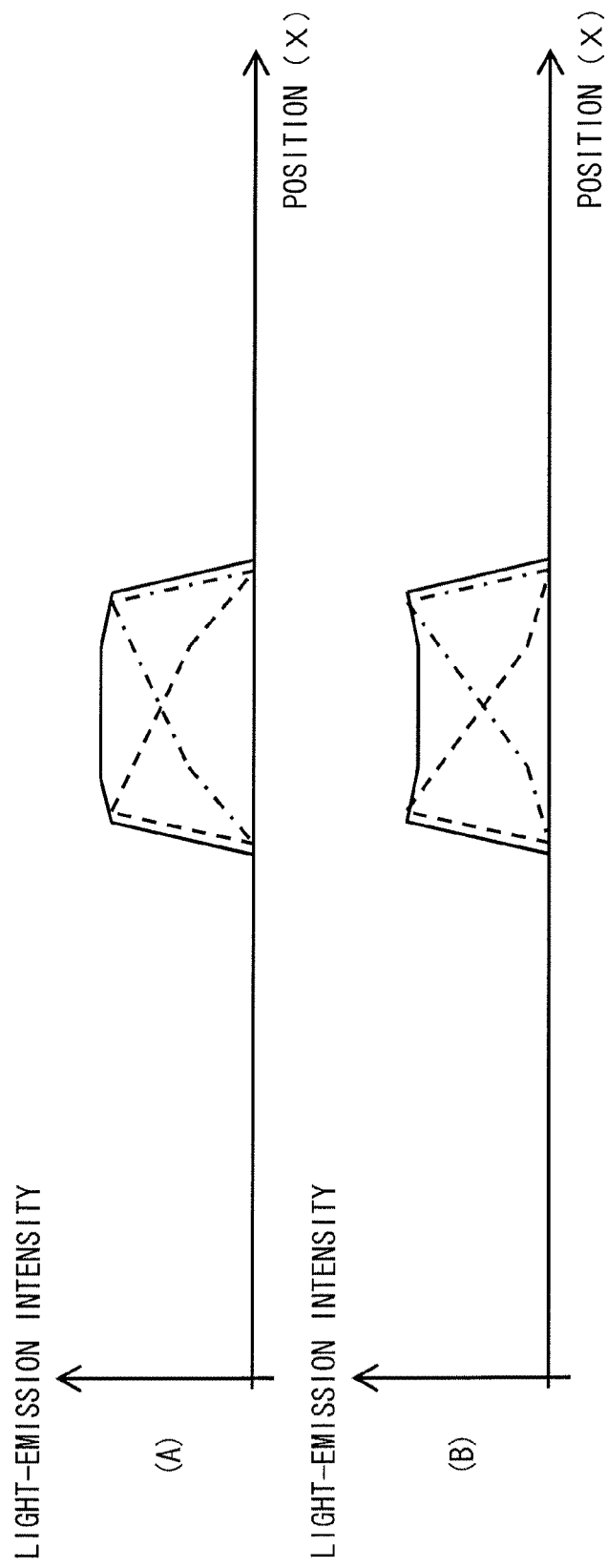
FIG. 24 is a diagram that illustrates another example of the light-emission intensity distribution of the surface light source device according to the first embodiment.
Figure 25:
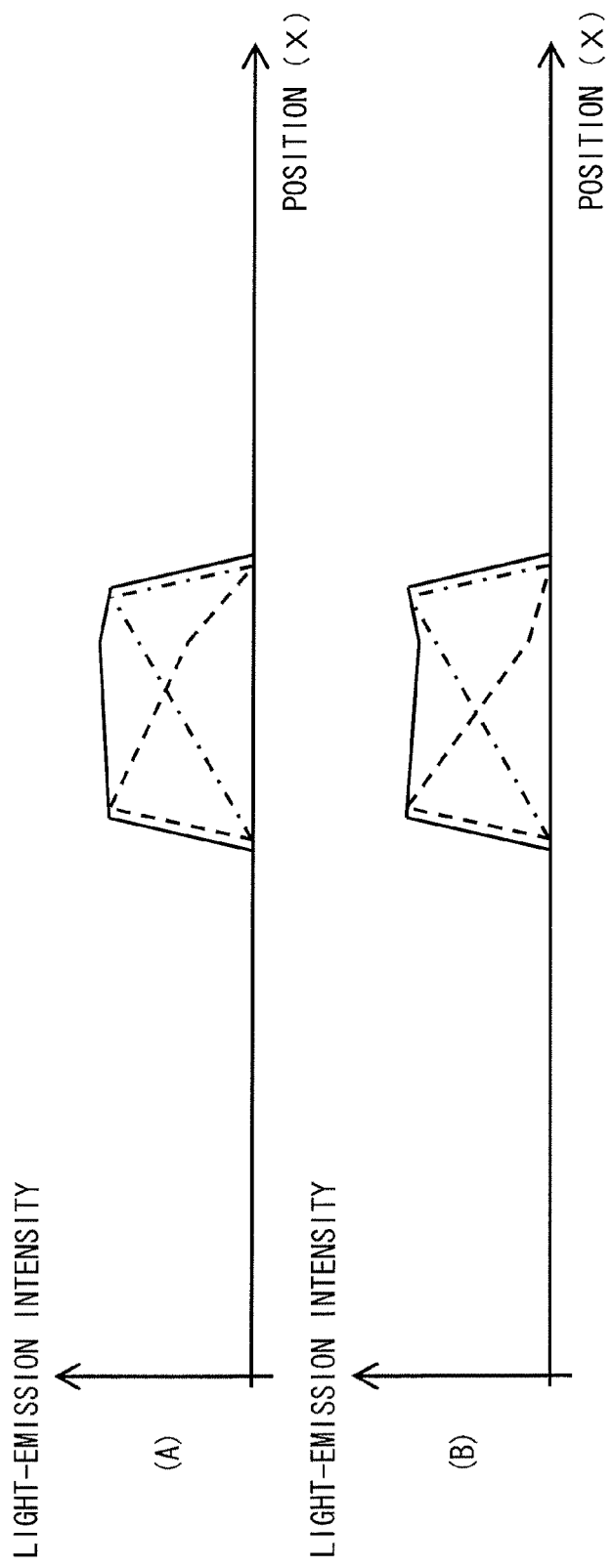
FIG. 25 is a diagram that illustrates another example of the light-emission intensity distribution of the surface light source device according to the first embodiment.
Figure 26:
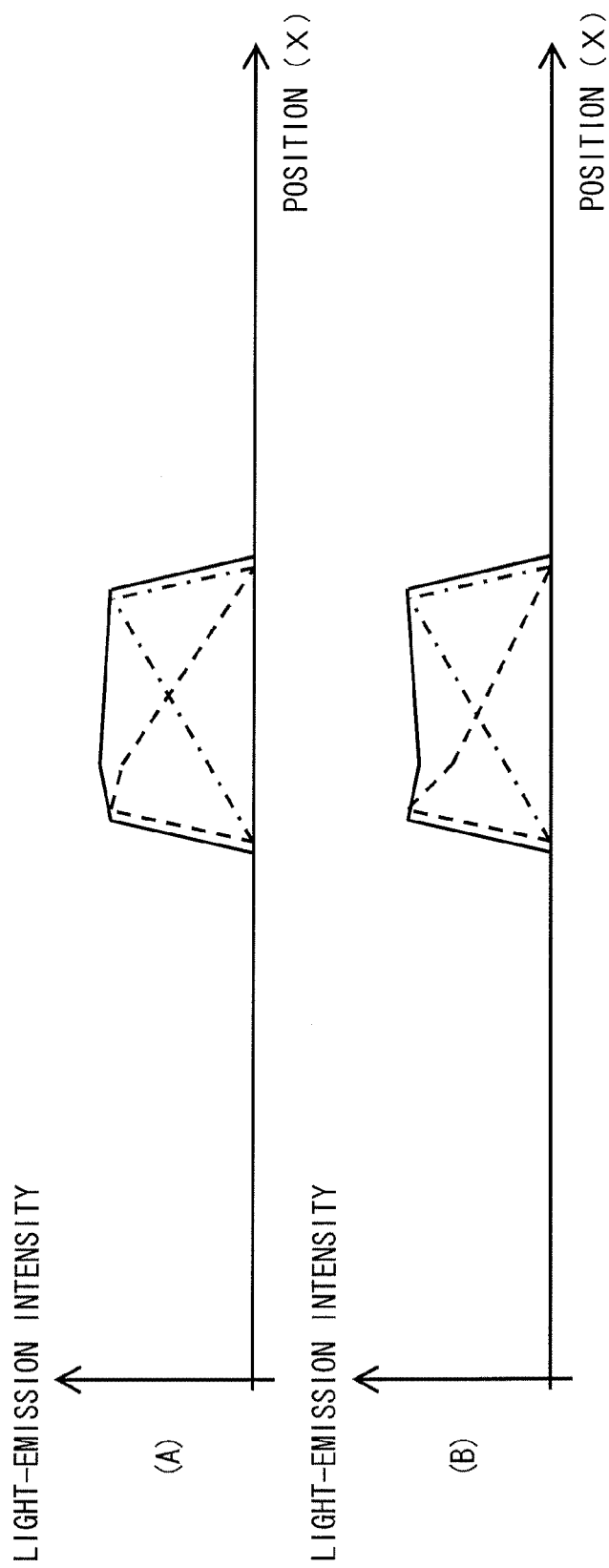
FIG. 26 is a diagram that illustrates another example of the light-emission intensity distribution of the surface light source device according to the first embodiment.

However, the above relations have been described strictly on the assumption that in each of the unit light-source sections, the intensity distribution formed by the one light source and the intensity distribution formed by the other light source are ideal intensity distributions as illustrated in, for example, FIG. 22. Nevertheless, actually, instead of the ideal intensity distribution as illustrated in FIG. 22, a case of an intensity distribution deviated from the ideal intensity distribution as illustrated in FIG. 23 through FIG. 26 may occur. In this case, the above-mentioned expressions (1) through (4) are not always desirable, and there is a case in which the above-mentioned expressions (5) through (8) are rather desirable. The reason will be described as follows.

Figure 27:
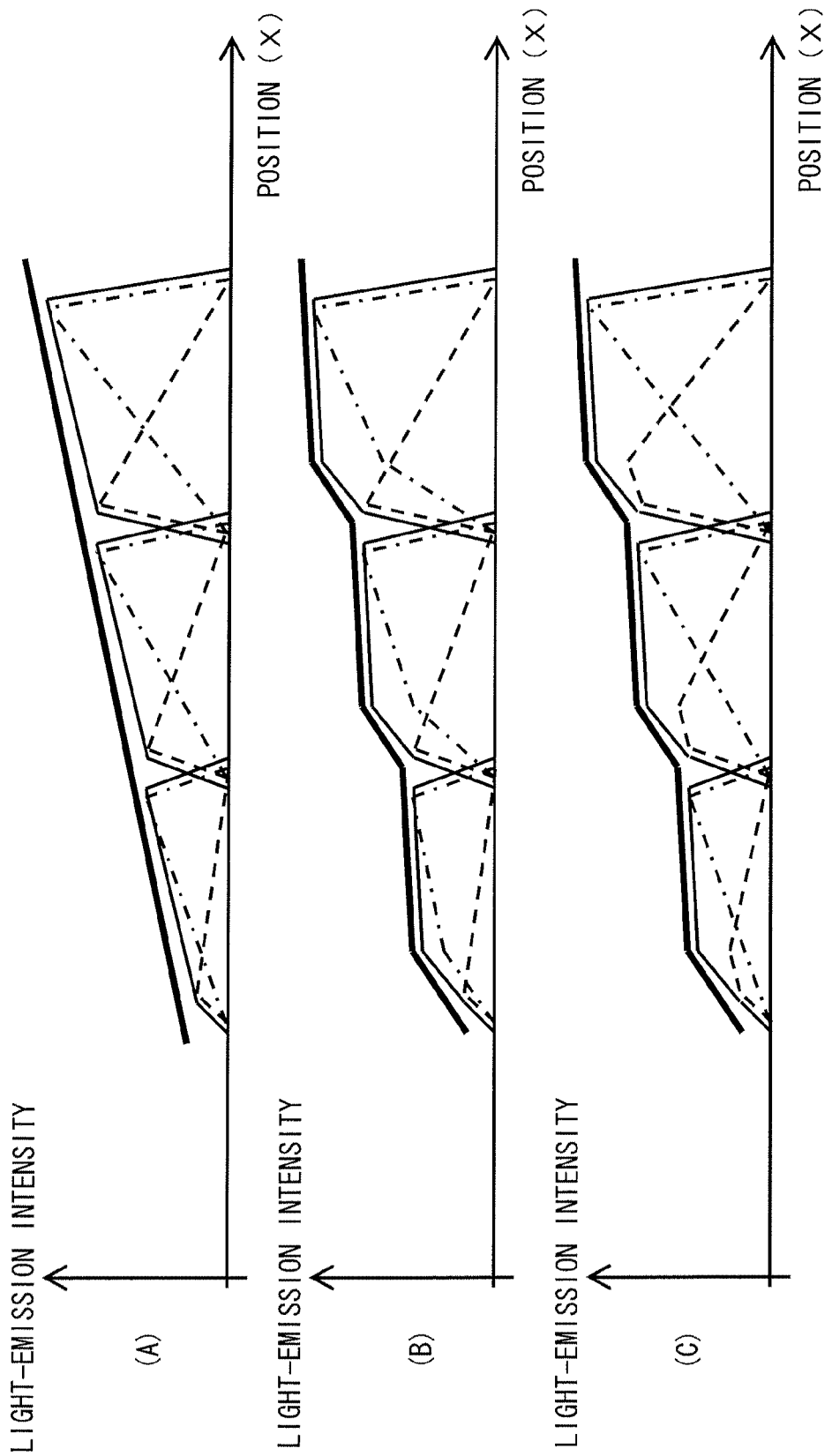
FIG. 27 is a diagram that illustrates another example of the light-emission intensity distribution of the surface light source device according to the first embodiment.

As illustrated in, for example, FIG. 27(A), when the unit light-source sections in which the ideal intensity distributions are formed are aligned, it is possible to form a moderate light-emission intensity distribution in the surface light source device. On the other hand, as illustrated in FIG. 27(B) and (C), when the unit light-source sections in which intensity distributions deviated from the ideal intensity distributions are formed are aligned, it is impossible to form a moderate light-emission intensity distribution in the surface light source device.

Figure 28:
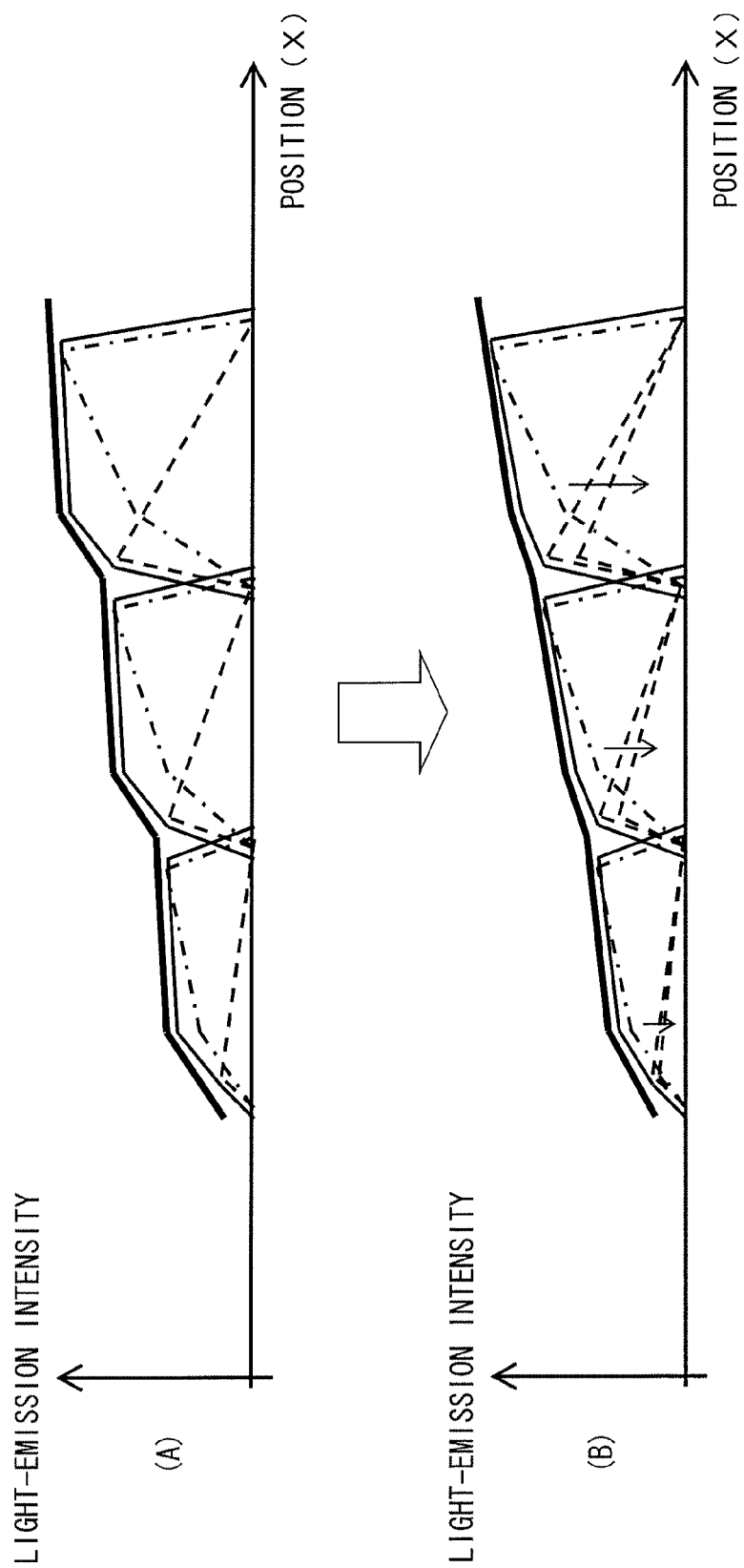
FIG. 28 is a diagram that illustrates another example of the light-emission intensity distribution of the surface light source device according to the first embodiment.
Figure 29:
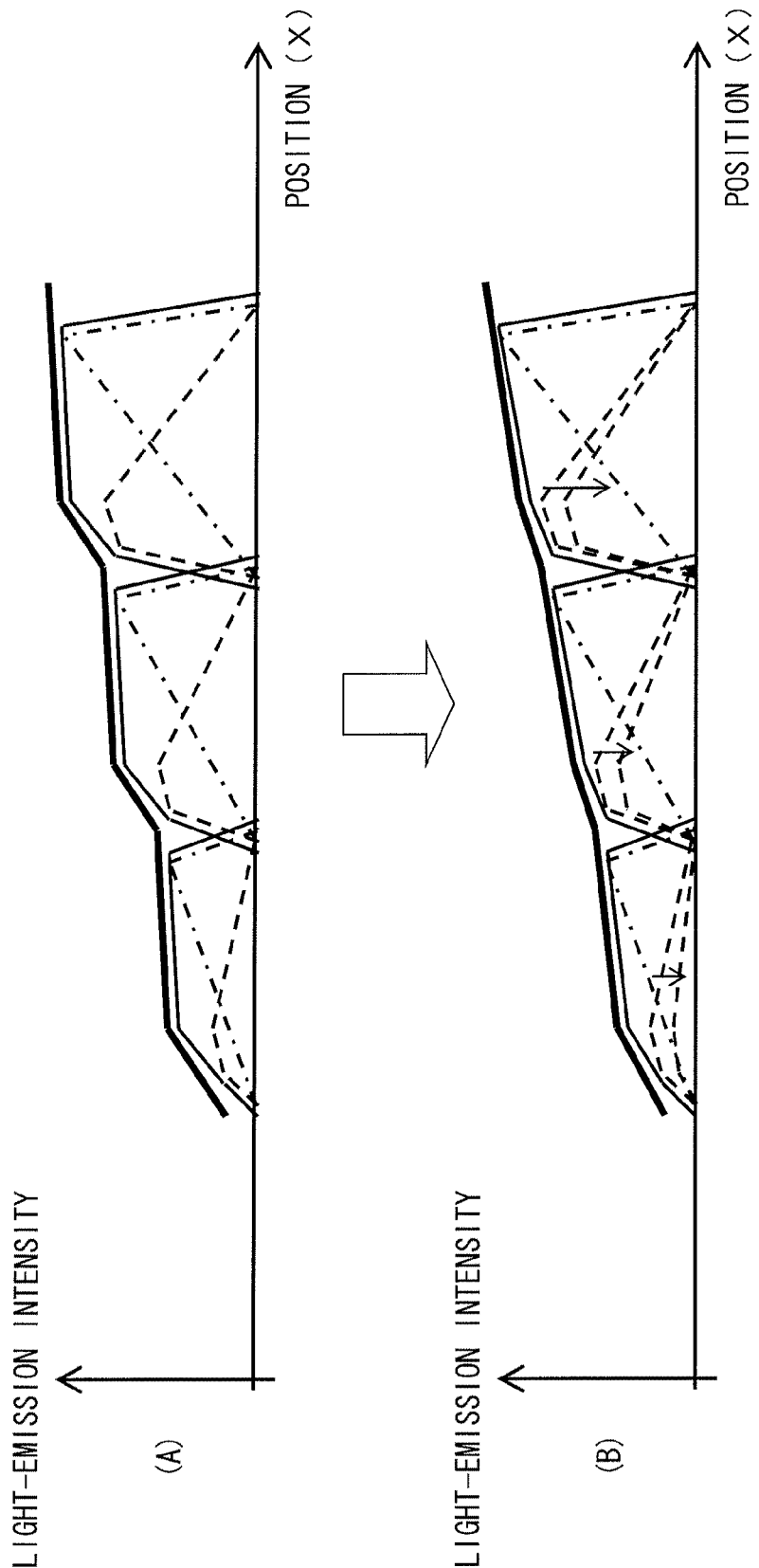
FIG. 29 is a diagram that illustrates another example of the light-emission intensity distribution of the surface light source device according to the first embodiment.
Figure 30:
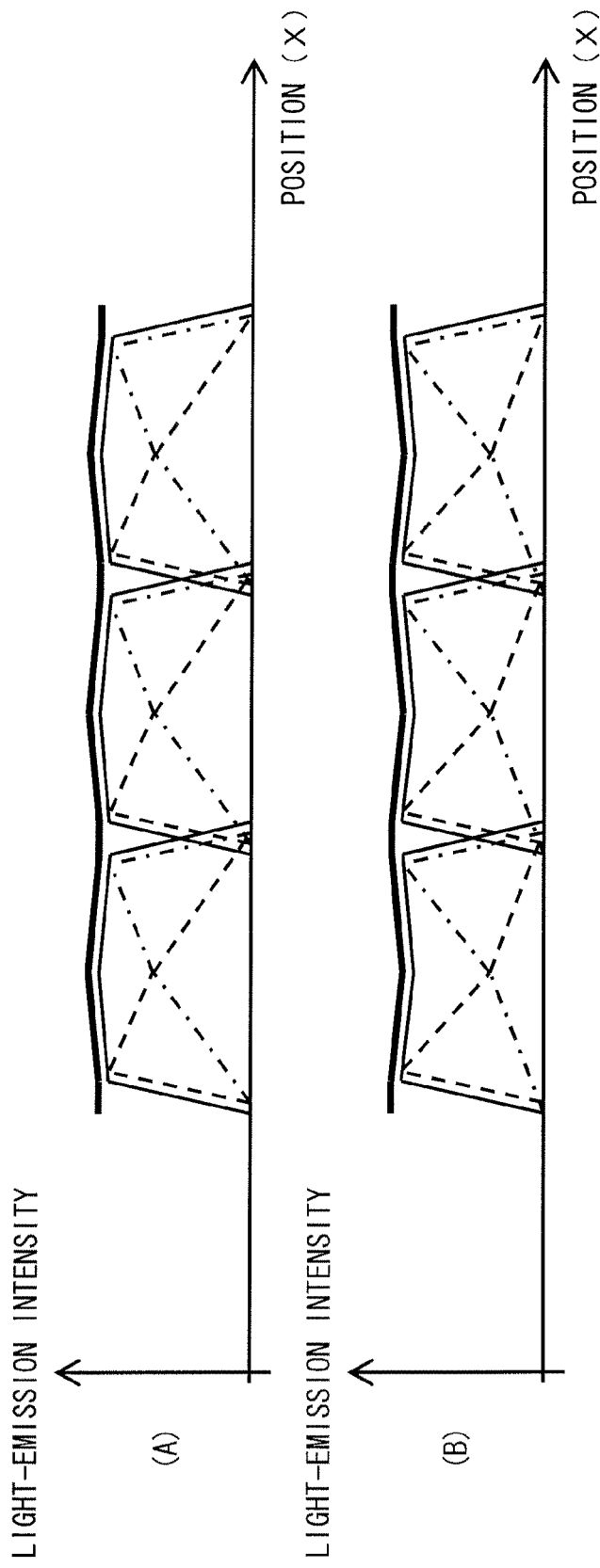
FIG. 30 is a diagram that illustrates another example of the light-emission intensity distribution of the surface light source device according to the first embodiment.
Figure 31:
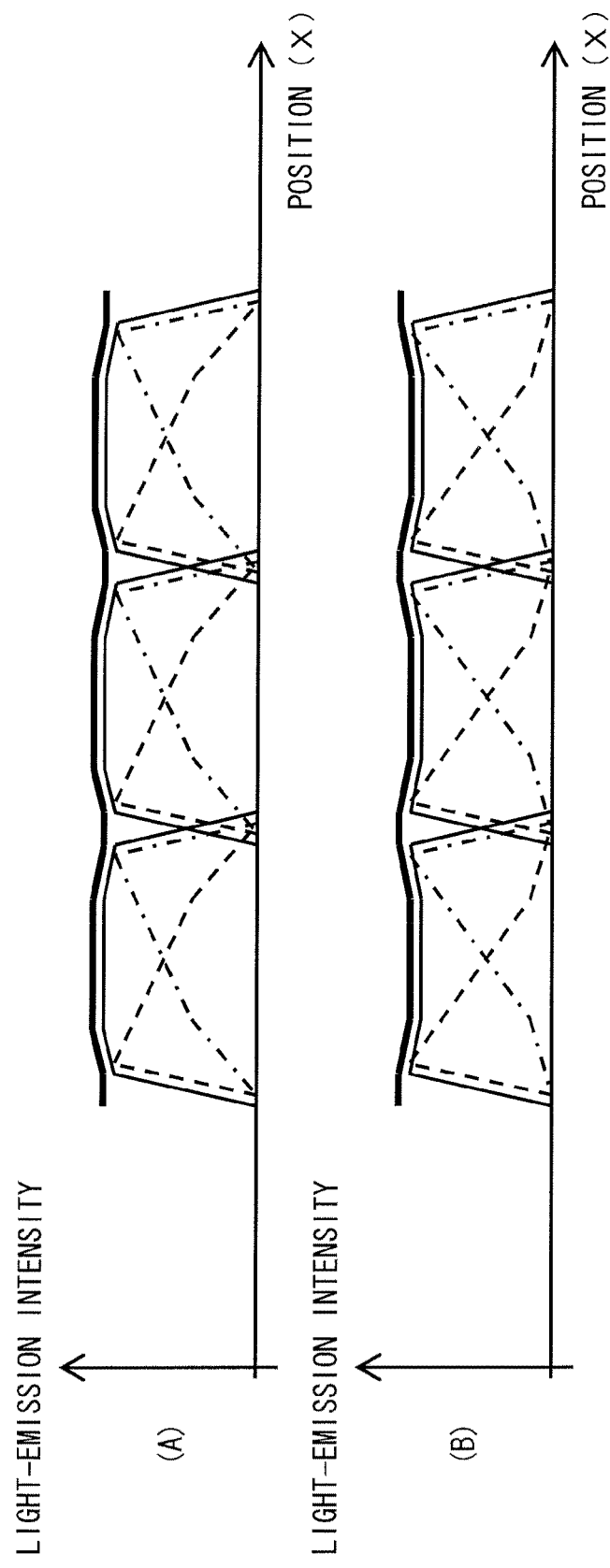
FIG. 31 is a diagram that illustrates another example of the light-emission intensity distribution of the surface light source device according to the first embodiment.
Figure 32:
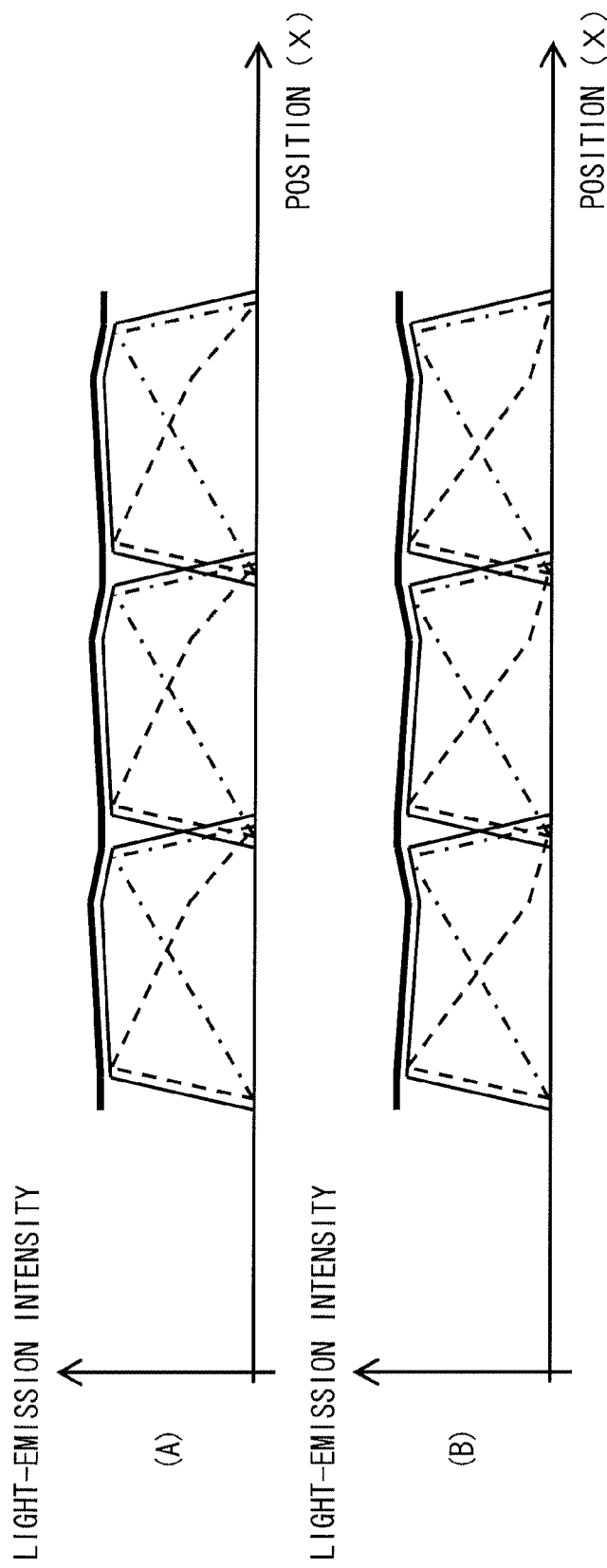
FIG. 32 is a diagram that illustrates another example of the light-emission intensity distribution of the surface light source device according to the first embodiment.
Figure 33:
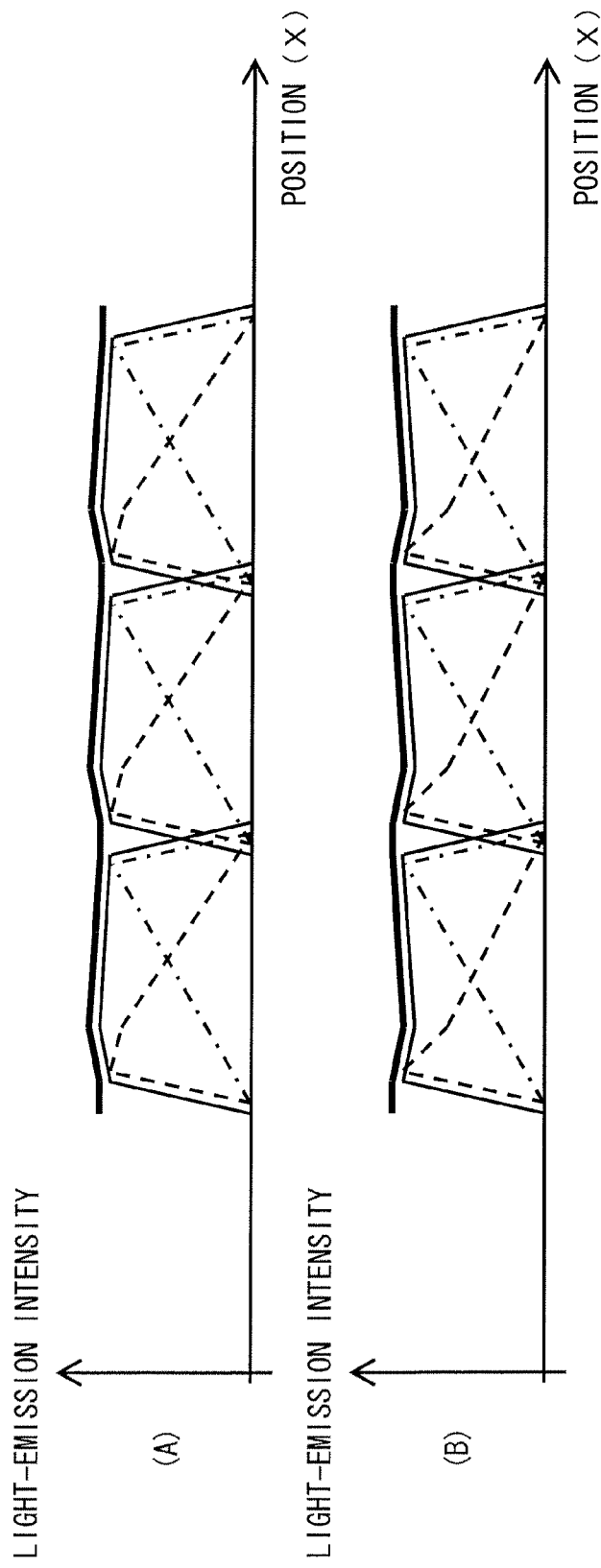
FIG. 33 is a diagram that illustrates another example of the light-emission intensity distribution of the surface light source device according to the first embodiment.

In this case, in the case illustrated in FIG. 27(B) and FIG. 28(B), as illustrated in, for example, FIG. 28(B), the light-emission intensities of the light sources arranged on the adjacent sides are desired to be, mutually, values of approximately the opposite tendency to the changing light-emission intensity distribution. Thus, it is possible to form a moderate light-emission intensity distribution in the surface light source device. Similarly, also in the case illustrated in FIG. 27(C) and FIG. 29(A), as illustrated in, for example, FIG. 29(B), the light-emission intensities of the light sources arranged on the adjacent sides are desired to be, mutually, values of approximately the opposite tendency to the changing light-emission intensity distribution. Thus, it is possible to form a moderate light-emission intensity distribution in the surface light source device.

In this way, when the unit light-source sections in which the intensity distributions deviated from the ideal intensity distributions are formed are aligned, the above-mentioned expressions (1) through (4) may not be desirable, and there is a case in which the above-mentioned expressions (5) through (8) are rather desirable. Therefore, it is preferable to use the expressions (1) through (8) differently according to the properties of the unit light-source sections.

Incidentally, as illustrated in FIG. 23 through FIG. 26, even with the unit light-source sections in which the intensity distributions deviated from the ideal intensity distributions are formed, when the light-emission intensity distribution in the surface light source device is not inclined, as illustrated in, for example, FIG. 30 through FIG. 33, it is possible to obtain an intensity distribution that is uniform to some extent. Therefore, the unit light-source sections, in which the intensity distributions deviated from the ideal intensity distributions are formed as illustrated in FIG. 23 through FIG. 26, are also able to be treated as the unit light-source sections that realize the present invention. Incidentally, between FIG. 23 through FIG. 26 and FIG. 30 through FIG. 33, FIG. 23(A) and FIG. 30(A) correspond to each other, FIG. 23(B) and FIG. 30(B) correspond to each other, FIG. 24(A) and FIG. 30(A) correspond to each other, FIG. 24(B) and FIG. 31(B) correspond to each other, FIG. 25(A) and FIG. 32(A) correspond to each other, FIG. 25(B) and FIG. 32(B) correspond to each other, FIG. 26(A) and FIG. 33(A) correspond to each other, and FIG. 26(B) and FIG. 33(B) correspond to each other.

Incidentally, in the present embodiment, every diagram that illustrates a light-emission intensity distribution is based on a linear intensity distribution as illustrated in, for example, FIG. 22. However, actually, a case of a curved intensity distribution as illustrated in, for example, FIG. 34(A), may take place. Even with the unit light-source section in which this light-emission intensity distribution as illustrated in FIG. 34(A) is formed, all the properties described in the present embodiment are obtained in a manner similar to the unit light-source section in which the light-emission intensity distribution illustrated in FIG. 22 is formed. For example, when the unit light-source sections in which the light-emission intensity distributions illustrated in FIG. 22 are formed are aligned, a light-emission intensity distribution as illustrated in, for example, FIG. 34(B) is formed in the surface light source device. In contrast, when the unit light-source sections in which the light-emission intensity distributions illustrated in FIG. 34(A) are formed are aligned, a light-emission intensity distribution as illustrated in, for example, FIG. 34(C) is formed in the surface light source device. In this way, every diagram that illustrates a light-emission intensity distribution in the present embodiment may be based on the curved intensity distribution as illustrated in FIG. 34(A). The unit light-source section in which such a light-emission intensity distribution is formed is also able to be treated as the unit light-source section that realizes the present invention.

(Modification of First Embodiment)

Figure 35:
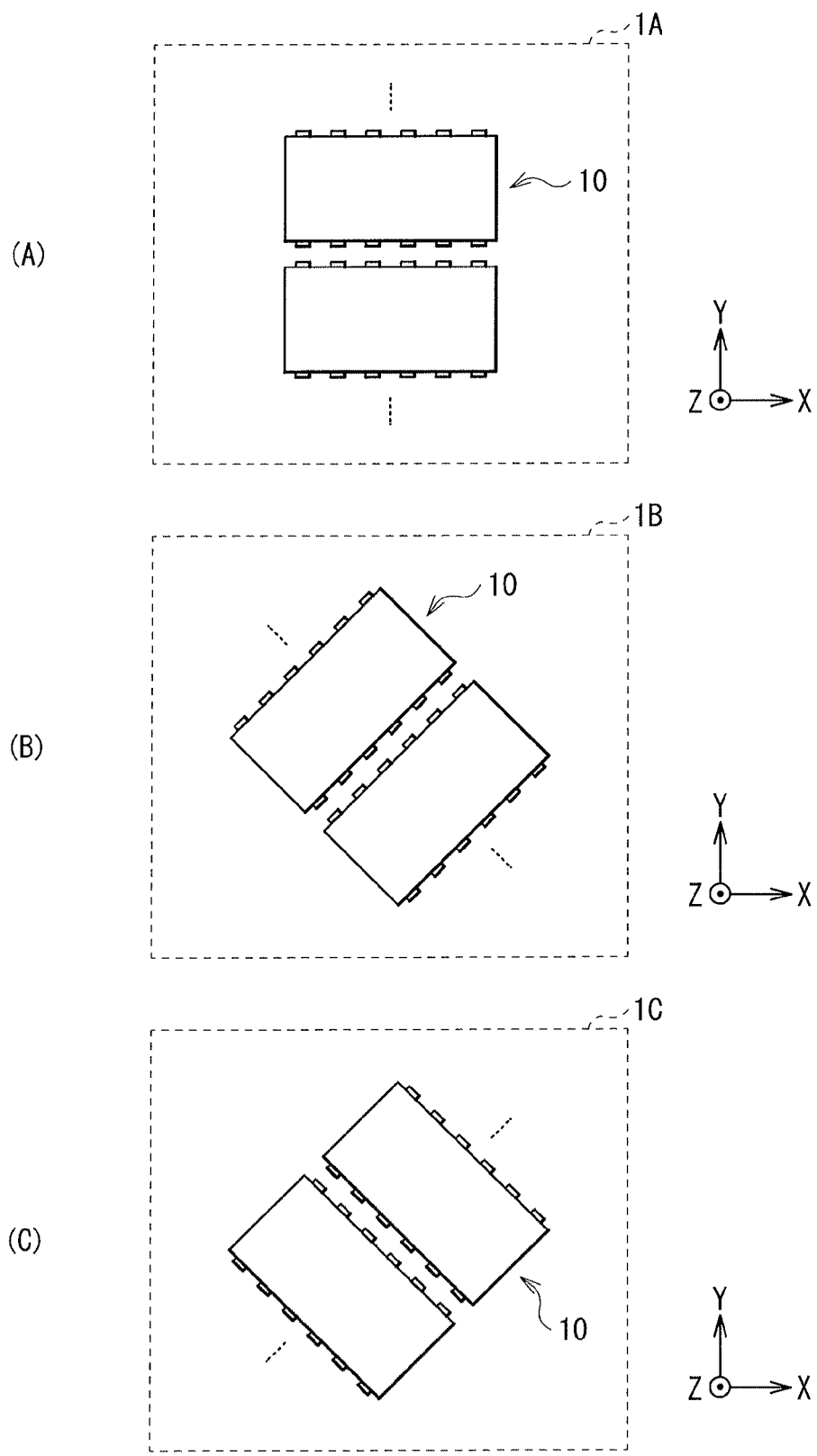
FIG. 35 is a plan view that illustrates a main structure of a surface light source device according to modifications of the first embodiment.
Figure 36:
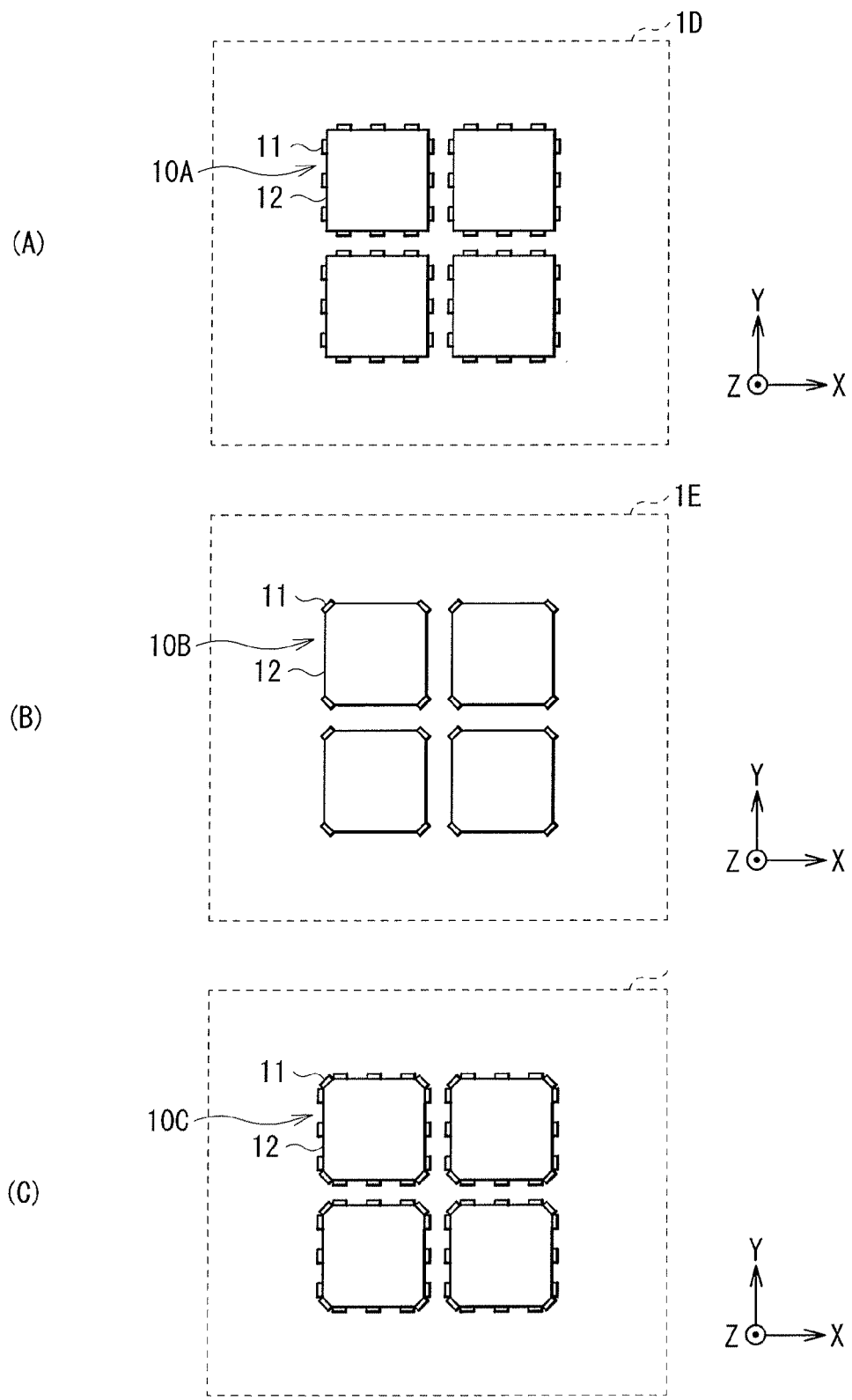
FIG. 36 is a plan view that illustrates a main structure of a surface light source device according to another modification of the first embodiment.
Figure 37:
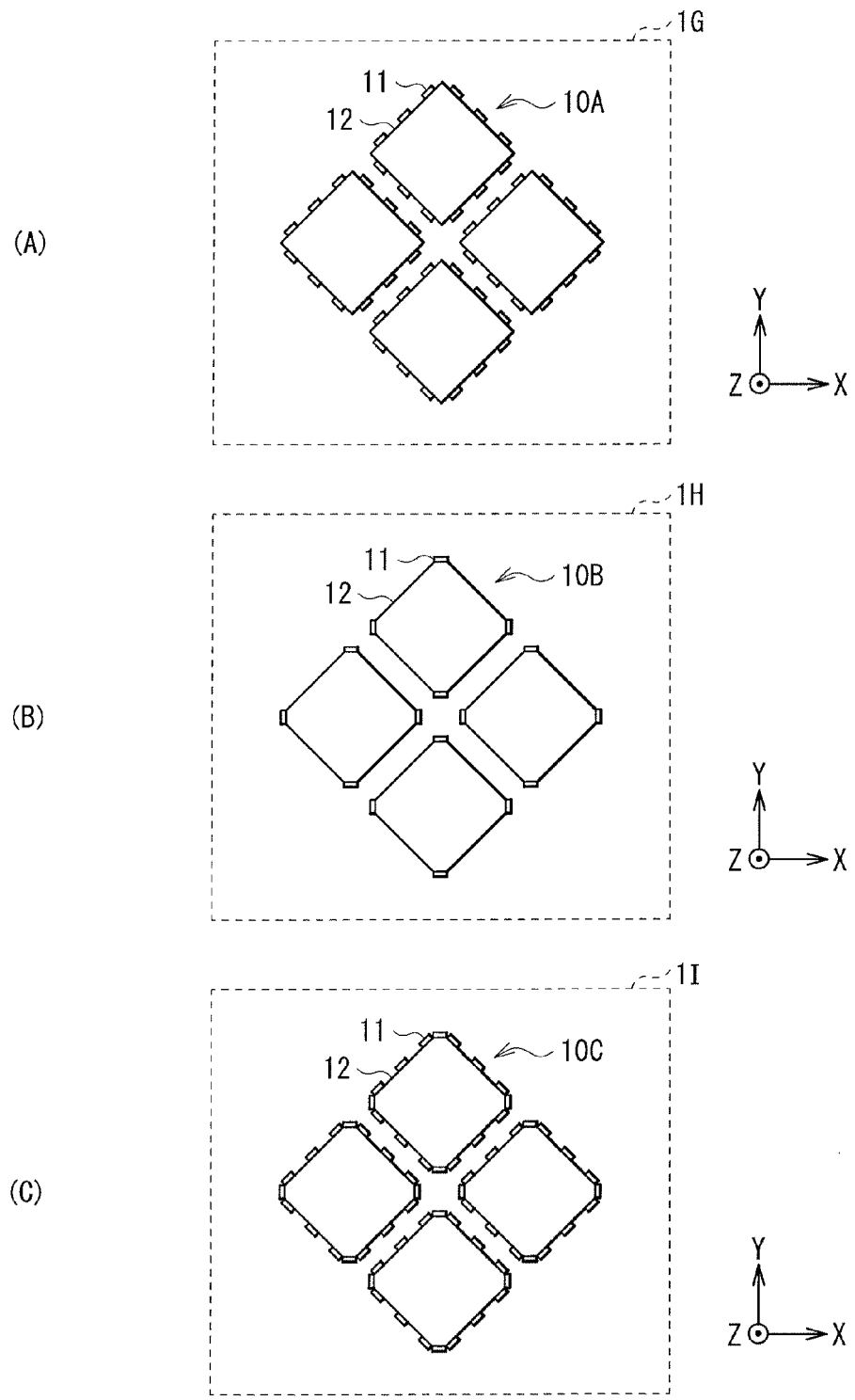
FIG. 37 is a plan view that illustrates a main structure of a surface light source device according to another modification of the first embodiment.
Figure 38:
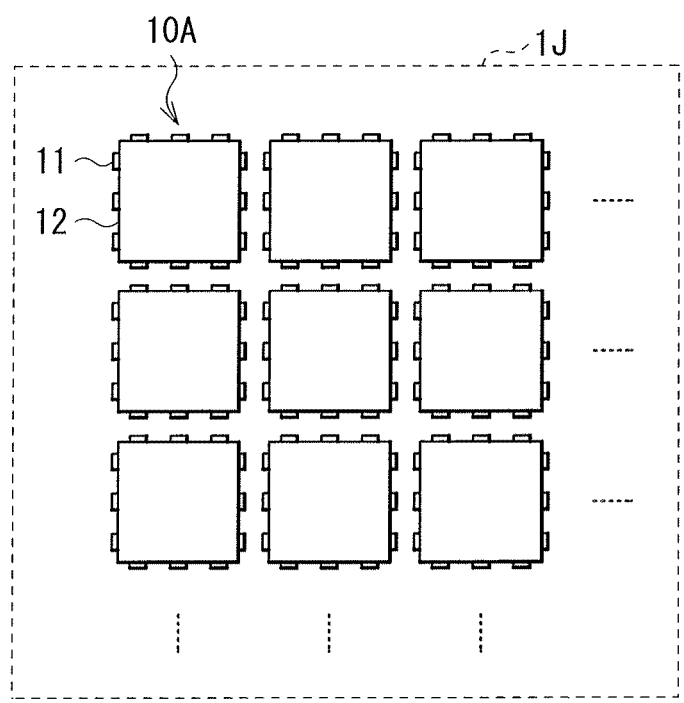
FIG. 38 is a plan view that illustrates a main structure of a surface light source device according to another modification of the first embodiment.

Incidentally, in the present embodiment, as illustrated in FIG. 1, the case in which the unit light-source sections 10 are aligned along the X-axis direction within the light-emission surface of the surface light source device 1 has been described, but an arrangement configuration of the unit light-source sections 10 is not limited this. Specifically, like surface light source devices 1A through 1C illustrated in, for example, FIG. 35(A) through FIG. 35(C), within a light-emission surface of the surface light source device, the unit light-source sections 10 may be aligned along a slanting direction between an X-axis and a Y-axis.

Further, in the present embodiment, the case in which the light sources 11 are arranged on each of the pair of opposed sides of the light guiding plates 12 has been described, but an arrangement configuration of the light sources 1I is not limited to this. Specifically, like surface light source devices 1D through 1J illustrated in, for example, FIG. 36(A) through FIG. 36(C), FIG. 37(A) through FIG. 37(C), and FIG. 38, the light sources may be arranged on each of two or three opposed sides of the light guiding plates 12, and within the light-emission surface of the surface light source device, unit light-source sections 10A through 10C may be arranged along a direction of an X-axis, a direction of a Y-axis, or a slanting direction between the X-axis and the Y-axis. In this case, by light emissions of the light sources 11 on each of the two or three sides, uneven light-emission intensity distributions that are mutually independent within the light-emission surface of each of the unit light-source sections 10A through 10C are formed, and thereby an arbitrary light-emission intensity distribution may be formed.

Figure 39:
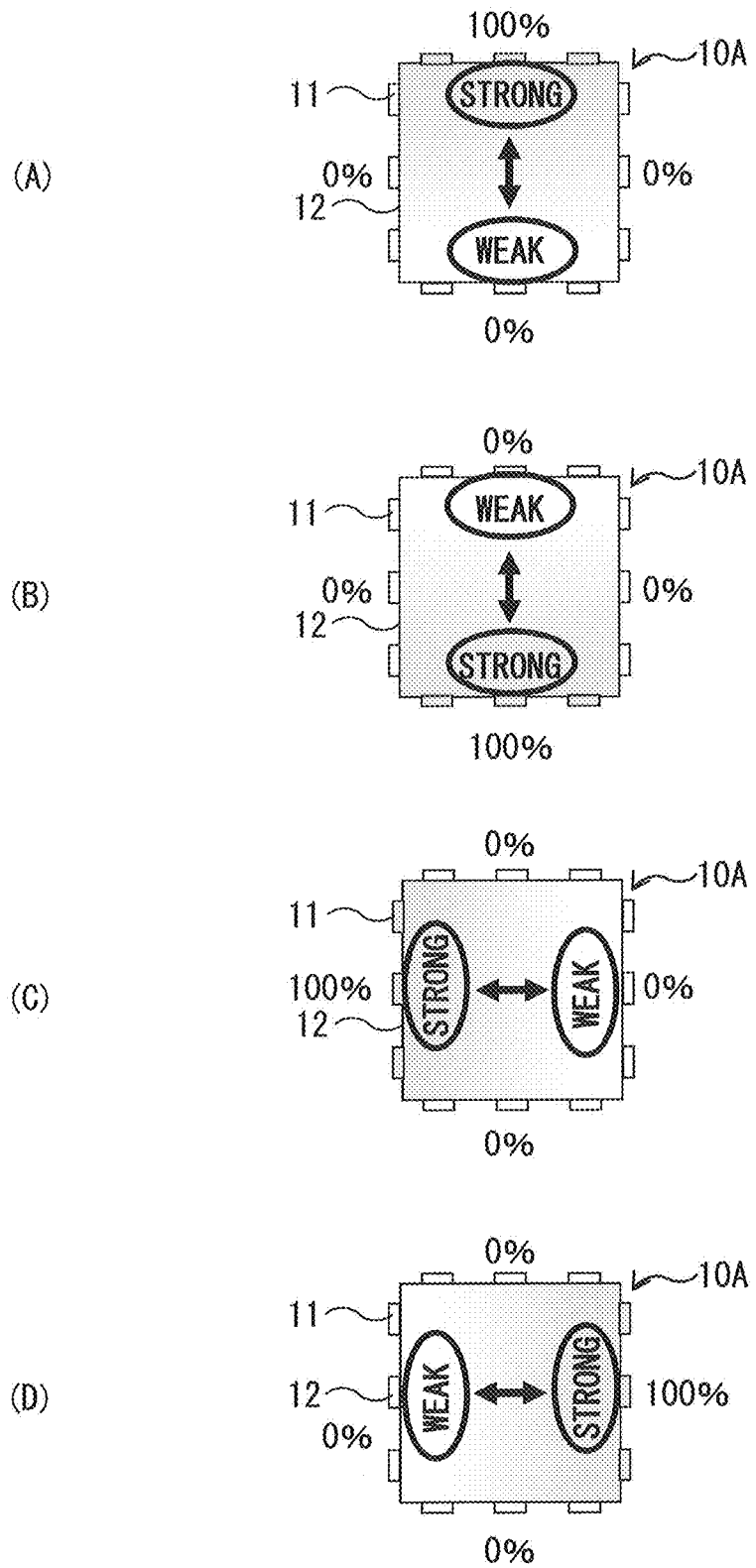
FIG. 39 is a plan view for explaining a light-emission mode of a unit light-source section according to modifications of the first embodiment.
Figure 40:
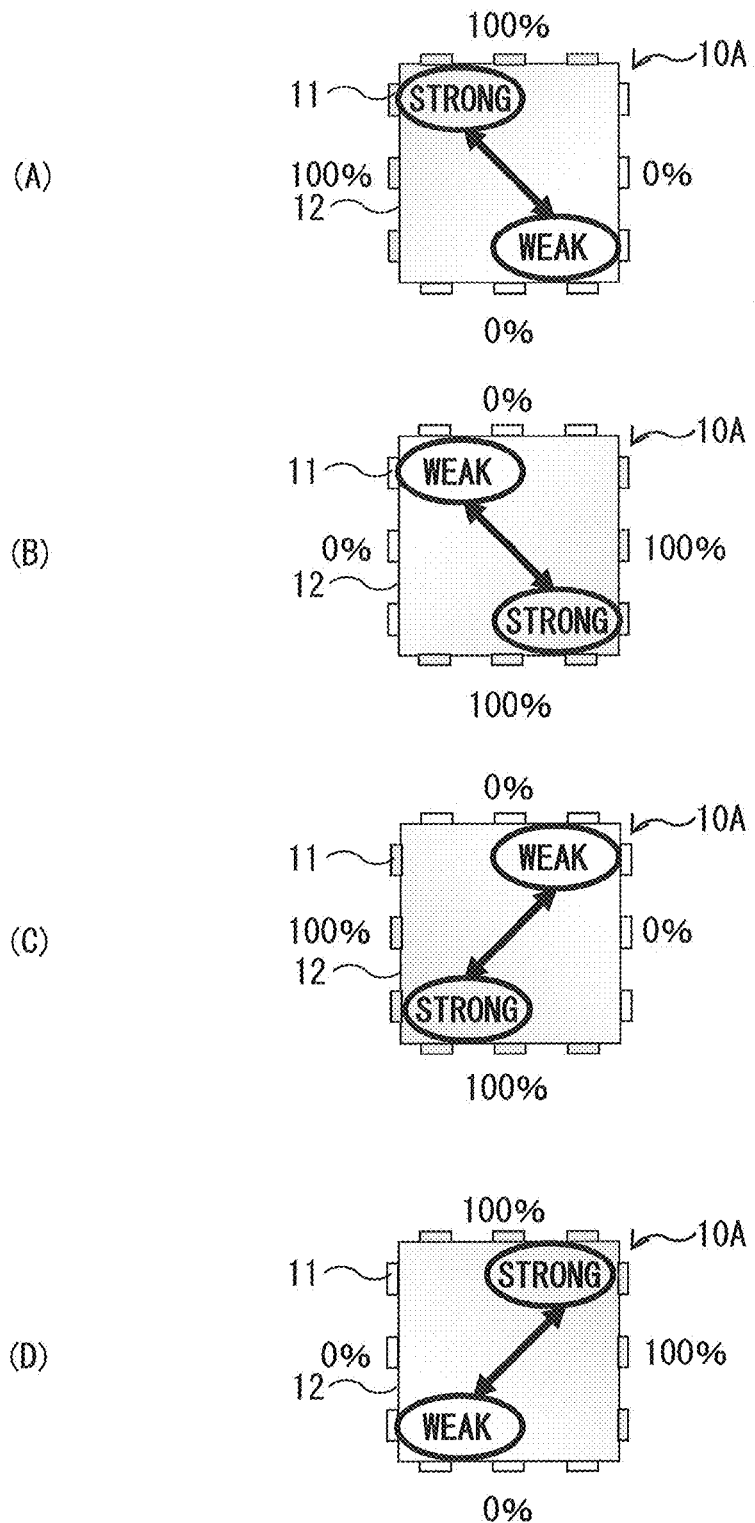
FIG. 40 is a plan view for explaining a light-emission mode of a unit light-source section according to another modification of the first embodiment.

In other words, as illustrated in, for example, FIG. 39(A) and FIG. 39(B), by adjusting the light-emission intensities of the light sources 11 arranged on upper and lower sides, it is possible to adjust an intensity inclination in a vertical direction. Further, as illustrated in, for example, FIG. 39(C) and FIG. 39(D), by adjusting the light-emission intensities of the light sources 11 arranged on left and right sides, it is possible to adjust an intensity inclination in a lateral direction. Furthermore, as illustrated in, for example, FIG. 40(A) and FIG. 40 (B), by adjusting the light-emission intensities of the light sources 11 arranged on upper and left sides and the light-emission intensities of the light sources 11 arranged on lower and right sides, it is possible to adjust an intensity inclination in a slanting direction from upper left to lower right. Still furthermore, as illustrated in, for example, FIG. 40(C) and FIG. 40 (D), by adjusting the light-emission intensities of the light sources 11 arranged on upper and right sides and the light-emission intensities of the light sources 11 arranged on lower and left sides, it is possible to adjust an intensity inclination in a slanting direction from upper right to lower left.

Figure 41:
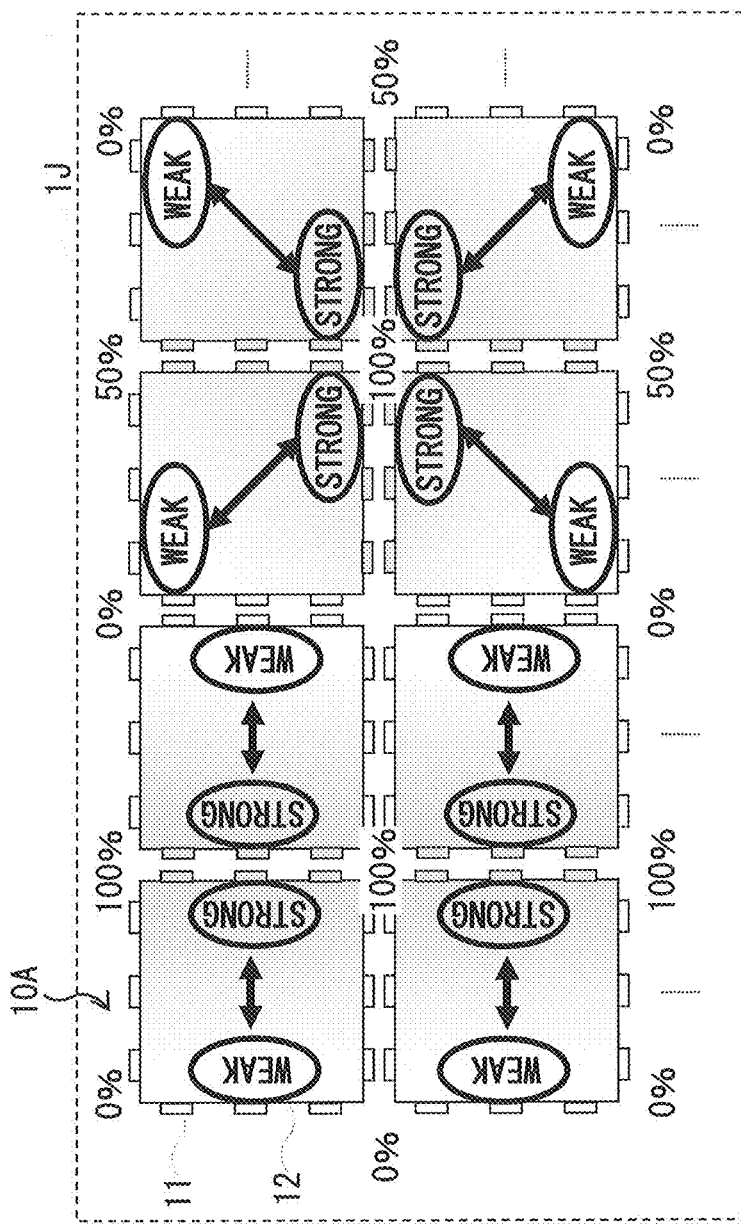
FIG. 41 is a plan view for explaining a light-emission mode of a unit light-source section according to another modification of the first embodiment.

By superimposing these uneven plural light-emission intensity distributions on each another, as illustrated in, for example, FIG. 41, an even or uneven light-emission intensity distribution is able to be formed within the light-emission surface of each of the unit light-source sections 10A, and it is possible to make the boundaries of the partial lighting areas look more natural.

(Example of Application to Display Device)

Figure 42:
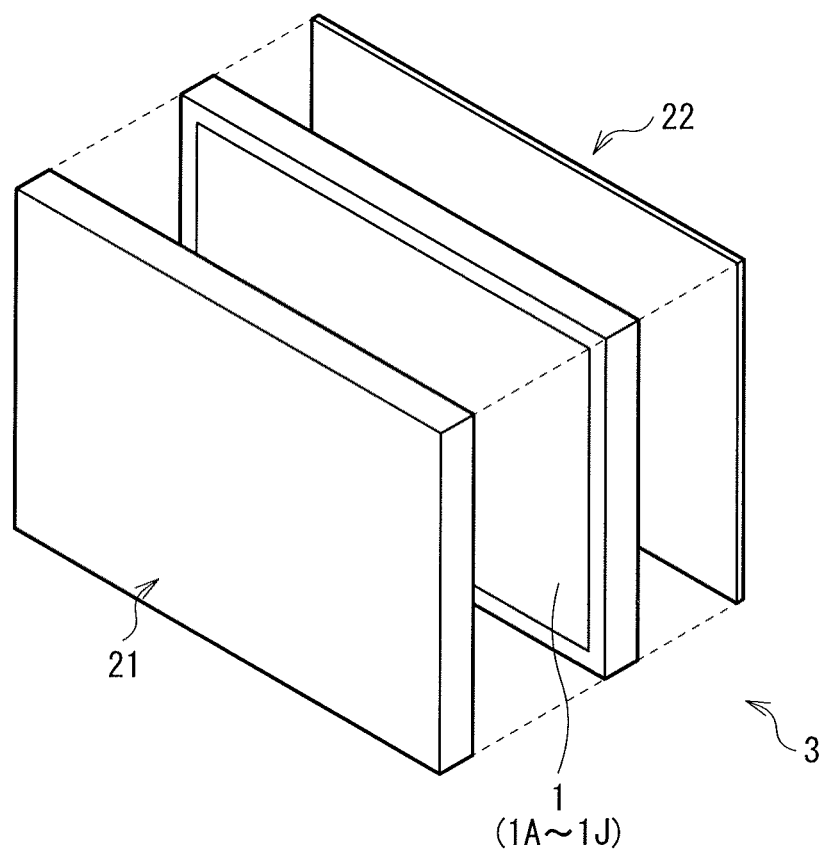
FIG. 42 is a perspective diagram that illustrates a main structure of a display device according to the first embodiment.

FIG. 42 illustrates a main structure of a display device (a display device 3) having the surface light source device according to the present embodiment and the modifications, in a perspective view. This display device 3 is configured by the surface light source device 1 (1A through 1J) that functions as a backlight, a display panel 21, and a circuit section 22 for controlling each of the unit light-source sections in the surface light source device 1 (1A through 1J) and the display panel 21. The display panel 21 performs image display by modulating illuminating light (emission light Lout) from the surface light source device 1 (1A through 1J) based on image signals, and for example, a liquid crystal panel is used.

In this display device 3, the surface light source device 1 (1A through 1J) according to the present embodiment and the modifications is provided and thereby the appearance of the boundaries of the partial lighting areas is made more natural. Thus, it is possible to improve the display image quality further than related art.

Figure 43:
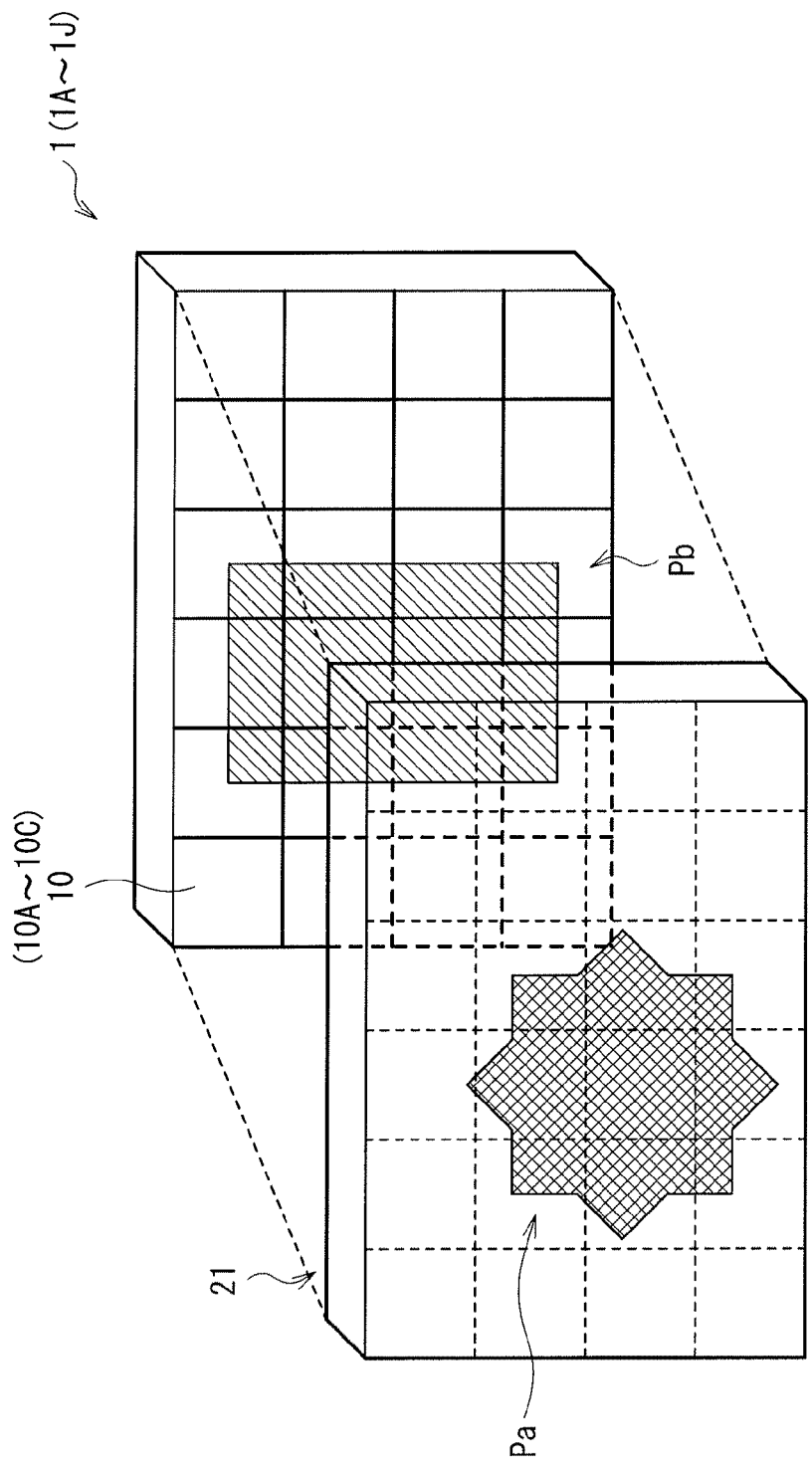
FIG. 43 is a perspective diagram that illustrates an example of a positional relation between an image display area and a partial lighting area.

Further, as illustrated in, for example, FIG. 43, it is possible to form partial lighting areas Pb in which only the unit light-source sections in areas corresponding to image display areas of not less than predetermined luminance (areas in which a display image Pa is displayed) among image display areas in the display panel 21. In the case of such a configuration, light-emission control according to brightness of an image (adjustment of light-emission intensity) is made possible, and a contrast between brightness and darkness within the display screen is able to be improved.

In the following, some other embodiments of the present invention will be described. Incidentally, the same elements as those in the above-described first embodiment will be provided with the same characters, and description will be omitted as appropriate.

Second Embodiment

FIG. 44(A) and (B) illustrate an example of a light-emission mode of a unit light-source section 10K according to a second embodiment of the present invention. In this unit light-source section 10K, it is configured such that contrary to the unit light-source section 10 described above in the first embodiment, within the light-emission surface, from the side of the illuminating light source 11 to the opposite side, the light-emission intensity of the light emission of that light source 11 gradually increases.

Figure 44:
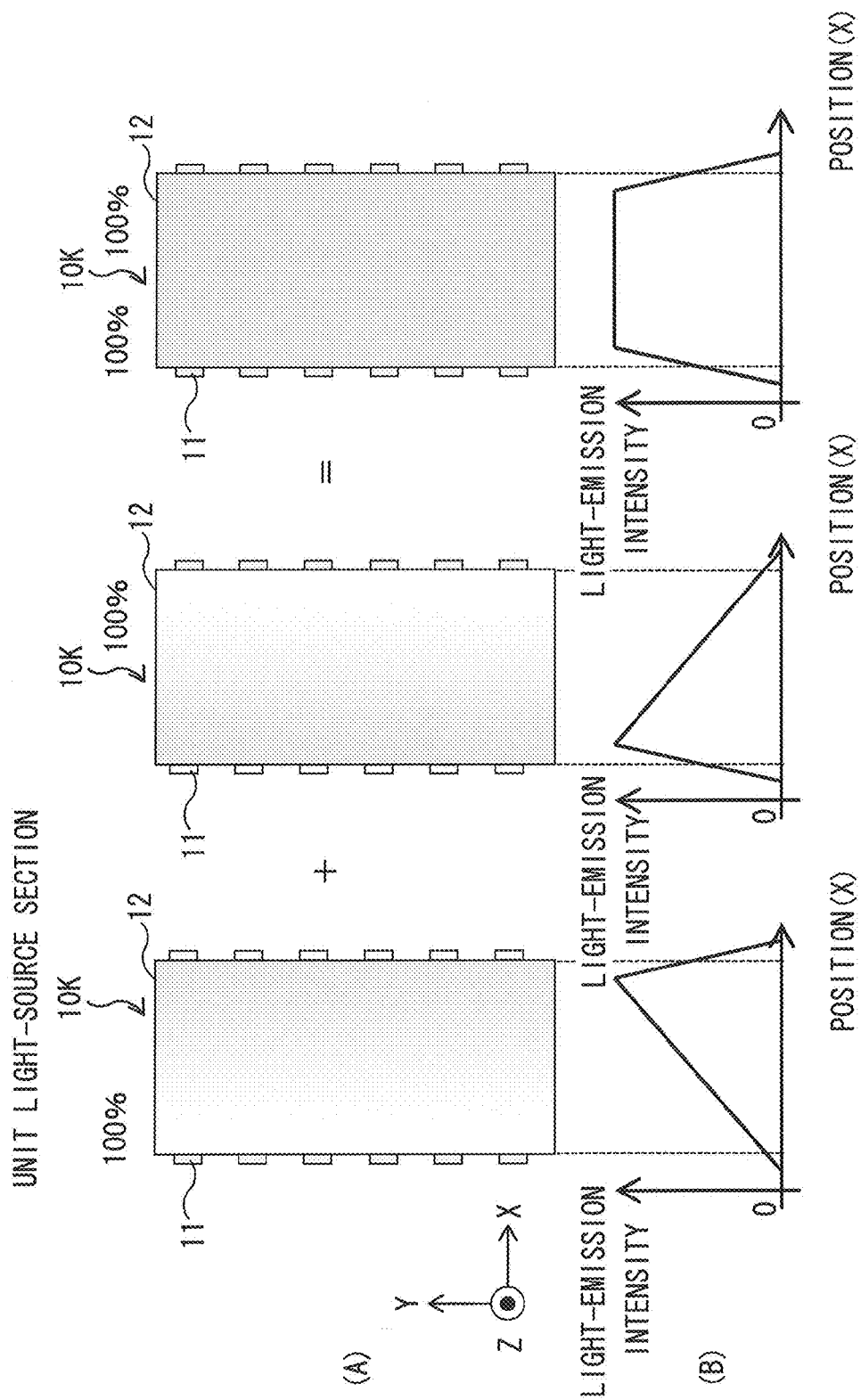
FIG. 44 is a diagram that illustrates an example of a light-emission mode of a unit light-source section according to a second embodiment.

Thus, as with the first embodiment, the uneven light-emission intensity distribution by the light emission of the light source 11 on the one side (the uneven light-emission intensity distribution on the left side of FIG. 44(B)) and the uneven light-emission intensity distribution by the light emission of the light source 11 on the other side (the uneven light-emission intensity distribution in the middle of FIG. 44(B)) are superimposed, and thereby it is possible to form a uniform light-emission intensity distribution within the light-emission surface of each of the unit light-source sections 10K (see a diagram on the right side of FIG. 44).

Figure 45:
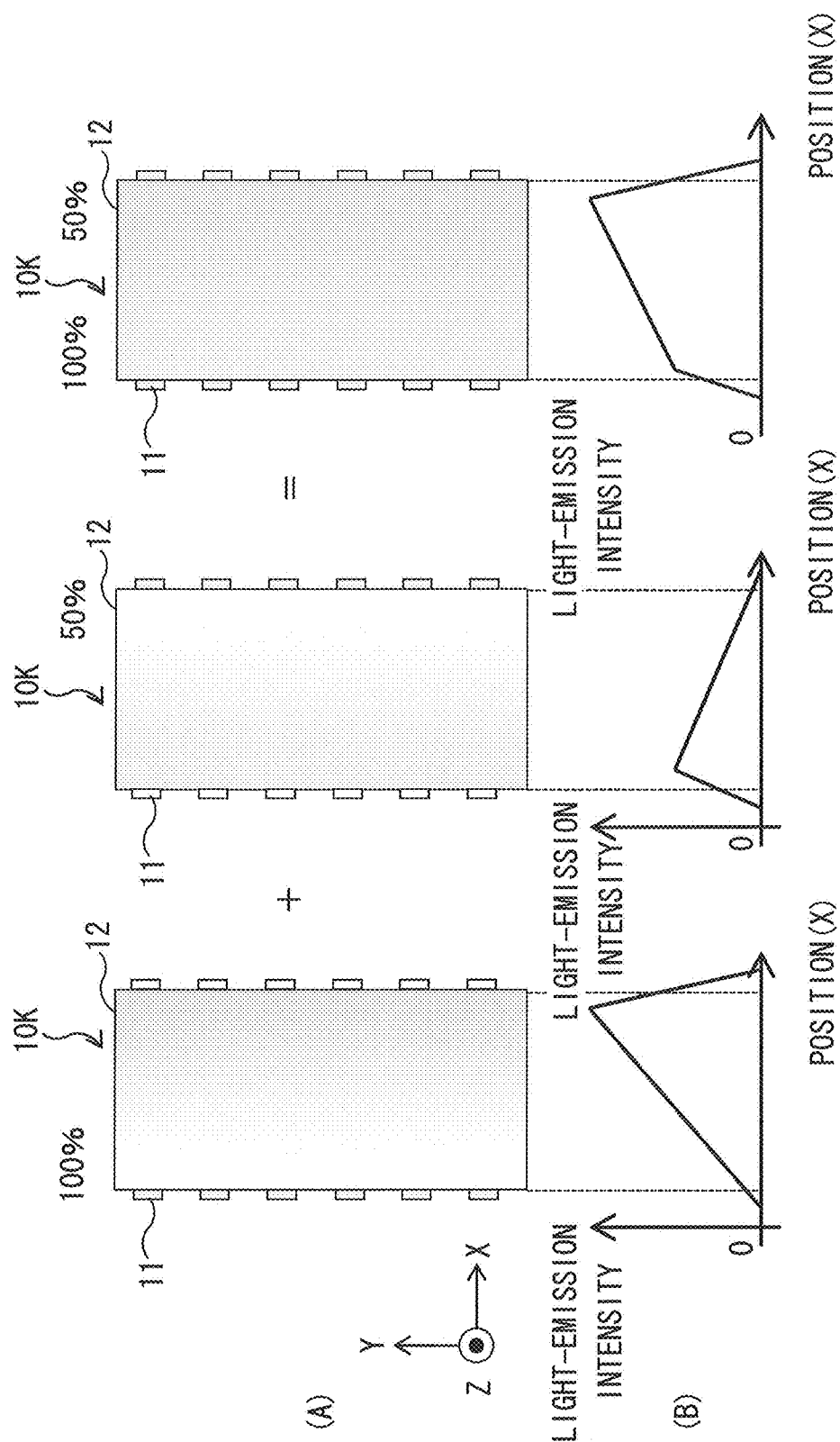
FIG. 45 is a diagram for explaining another example of the light-emission mode of the unit light-source section according to the second embodiment.

Further, as illustrated in, for example, FIG. 45(A) and (B), the uneven light-emission intensity distribution by the light emission of the light source 11 on the one side (the uneven light-emission intensity distribution on the left side of FIG. 45(B)) and the uneven light-emission intensity distribution by the light emission of the light source 11 on the other side (the uneven light-emission intensity distribution in the middle of FIG. 45(B)) are superimposed, and thereby it is also possible to form an uneven light-emission intensity distribution within the light-emission surface of each of the unit light-source sections 10K (see a diagram on the right side of FIG. 45).

As described above, in the present embodiment as well, like the first embodiment, as illustrated in, for example, FIG. 46(A) and (B), FIG. 47(A) and (B), and FIG. 48(A) and (B), on the light-emission surface of each of the unit light-source sections 10K, it is possible to form an arbitrary light-emission intensity distribution. Therefore, by adjusting the light-emission intensity of each of the unit light-source sections 10K, it is possible to make the appearance of the boundaries between the partial lighting areas more natural than related art.

Figure 46:
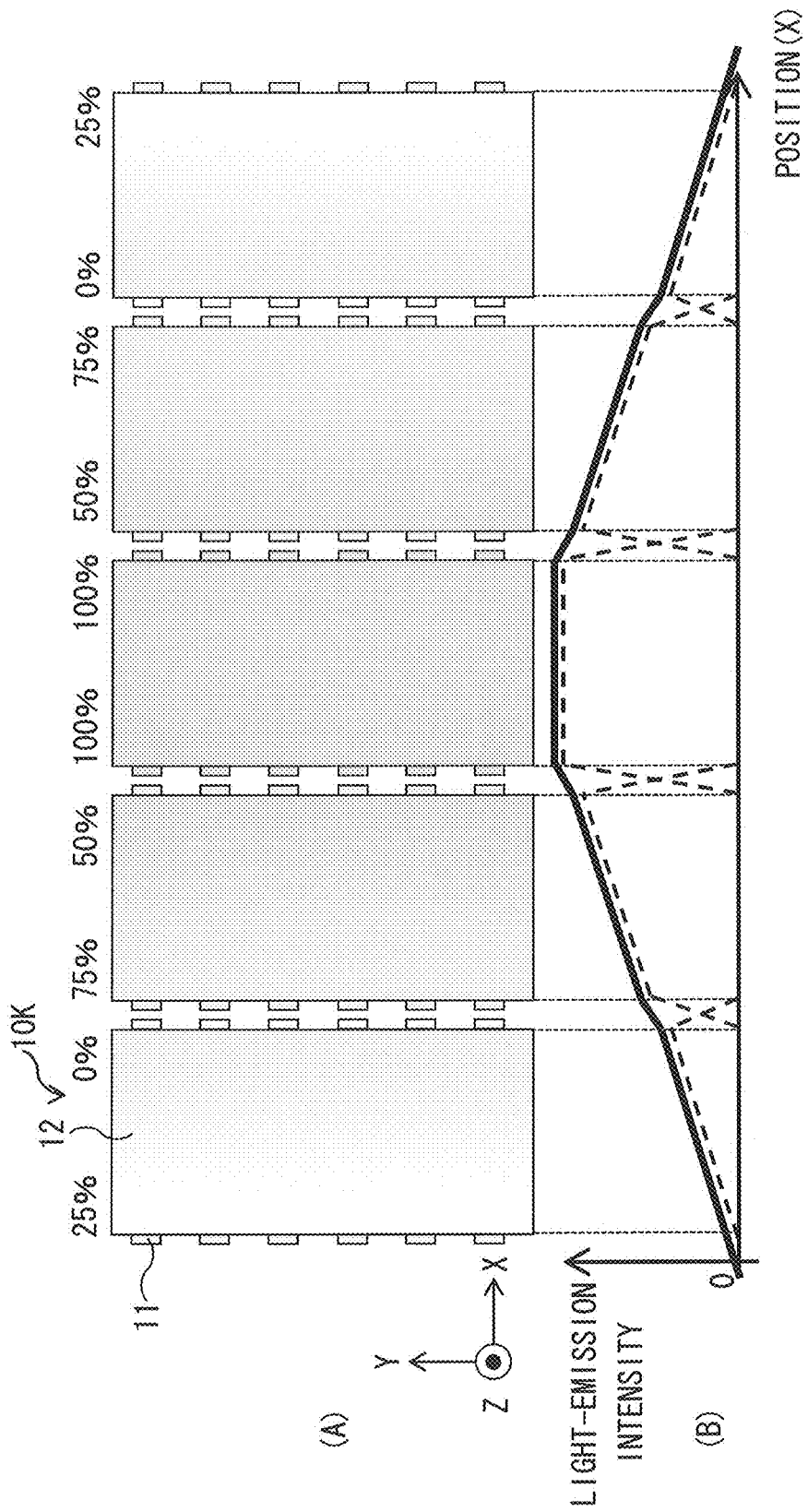
FIG. 46 is a diagram that illustrates an example of a light-emission intensity distribution of a surface light source device according to the second embodiment.
Figure 47:
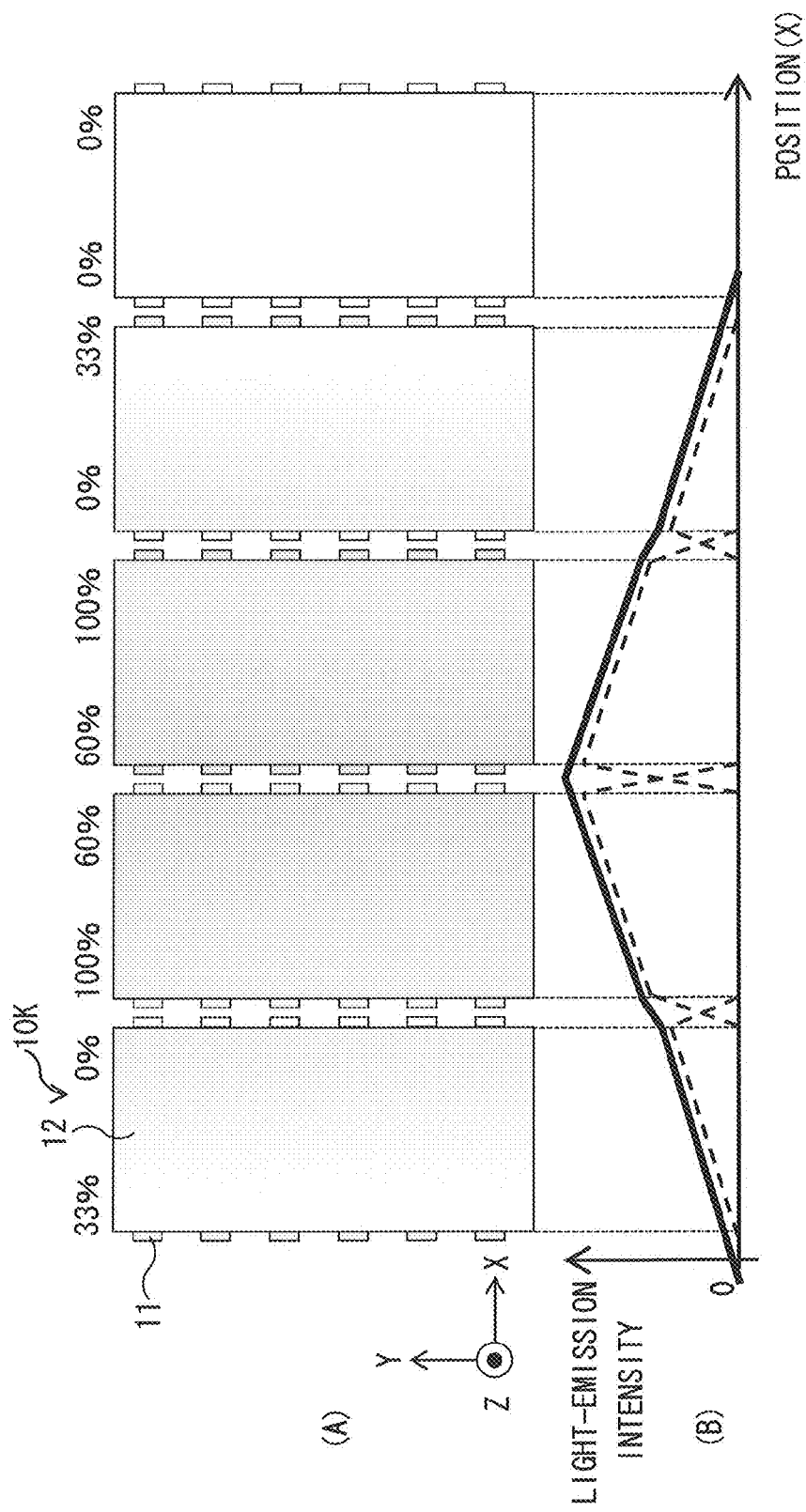
FIG. 47 is a diagram that illustrates another example of the light-emission intensity distribution of the surface light source device according to the second embodiment.
Figure 48:
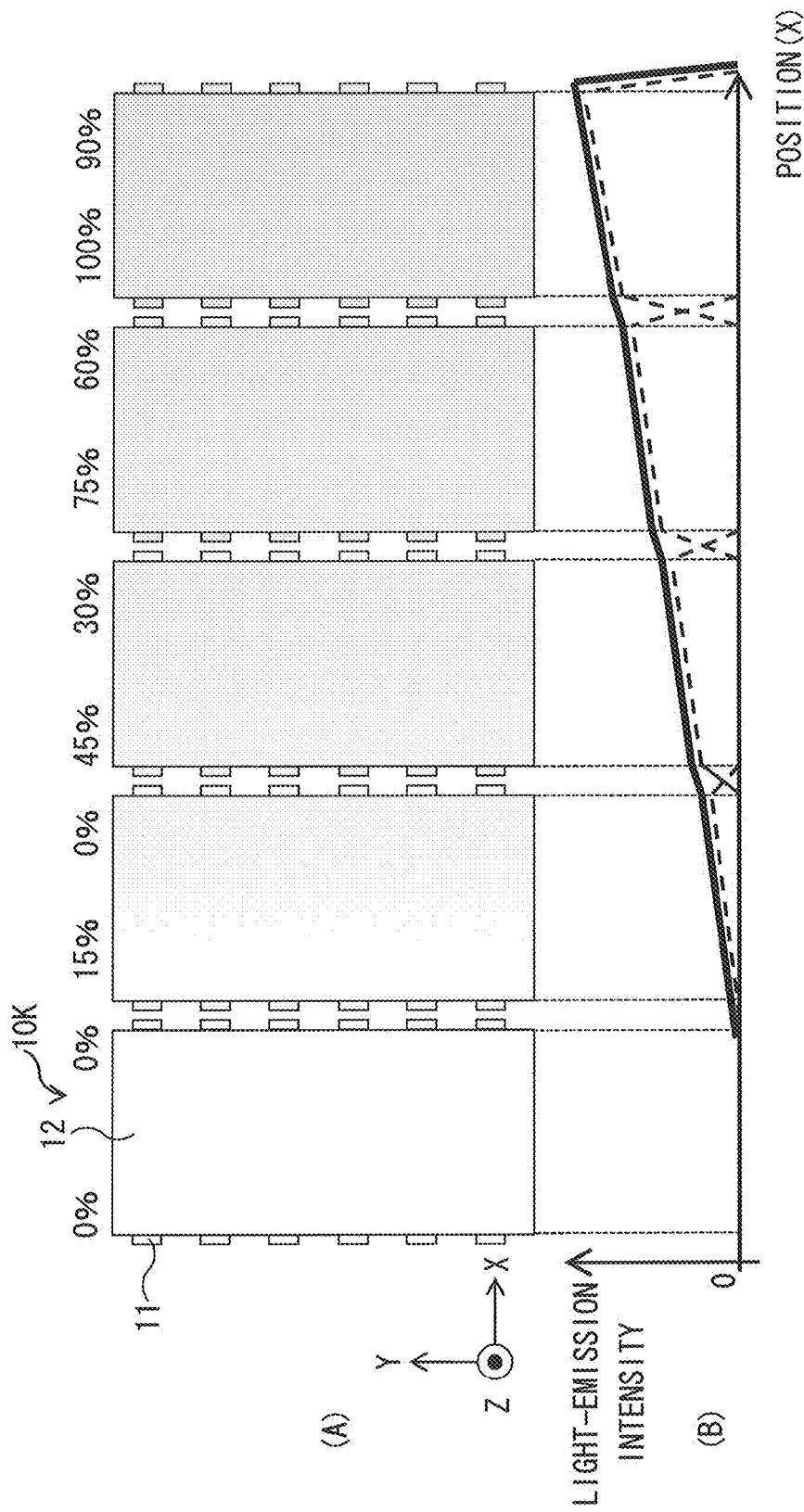
FIG. 48 is a diagram that illustrates another example of the light-emission intensity distribution of the surface light source device according to the second embodiment.
Figure 49:
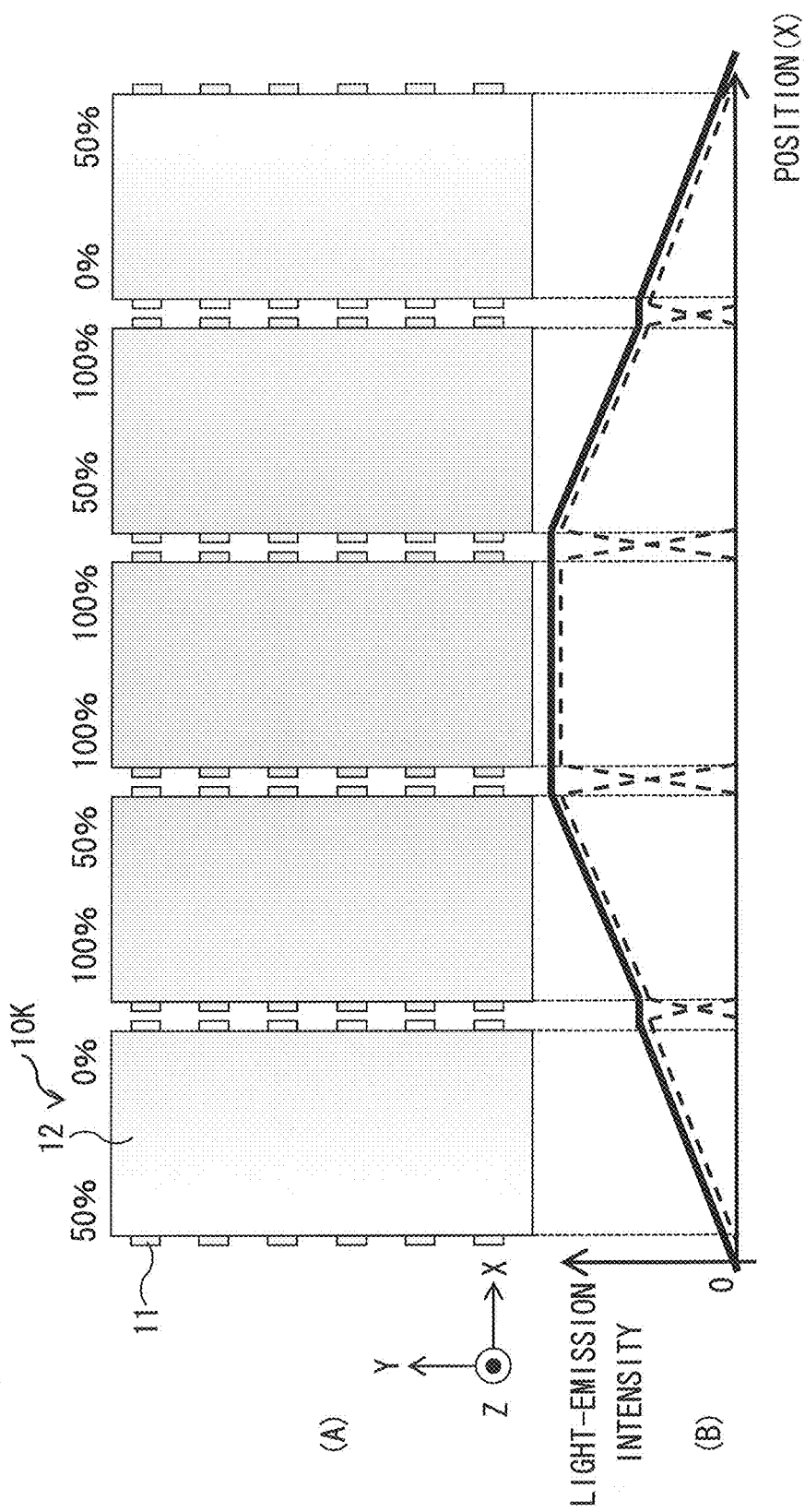
FIG. 49 is a diagram that illustrates another example of the light-emission intensity distribution of the surface light source device according to the second embodiment.
Figure 50:
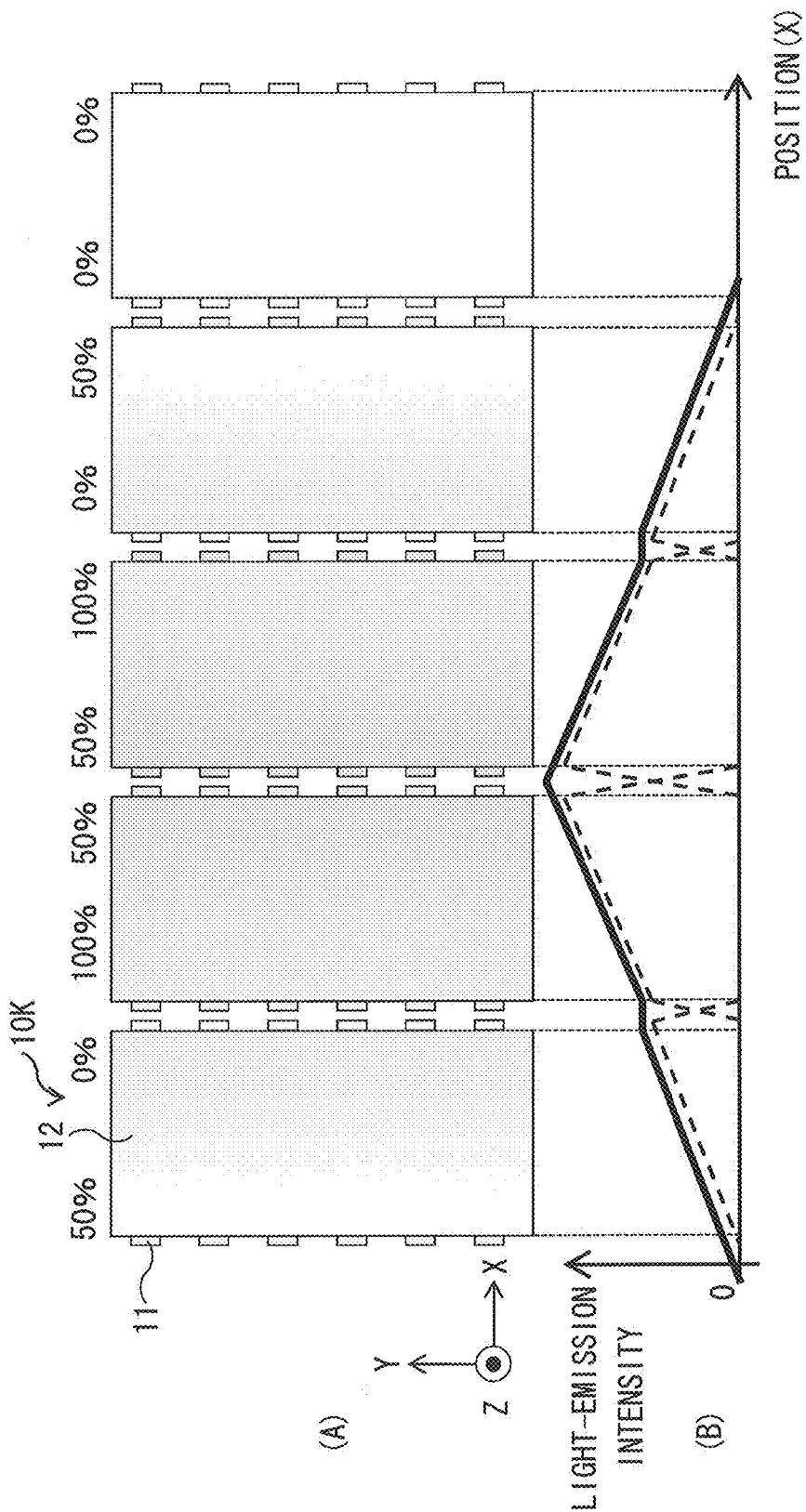
FIG. 50 is a diagram that illustrates another example of the light-emission intensity distribution of the surface light source device according to the second embodiment.
Figure 51:
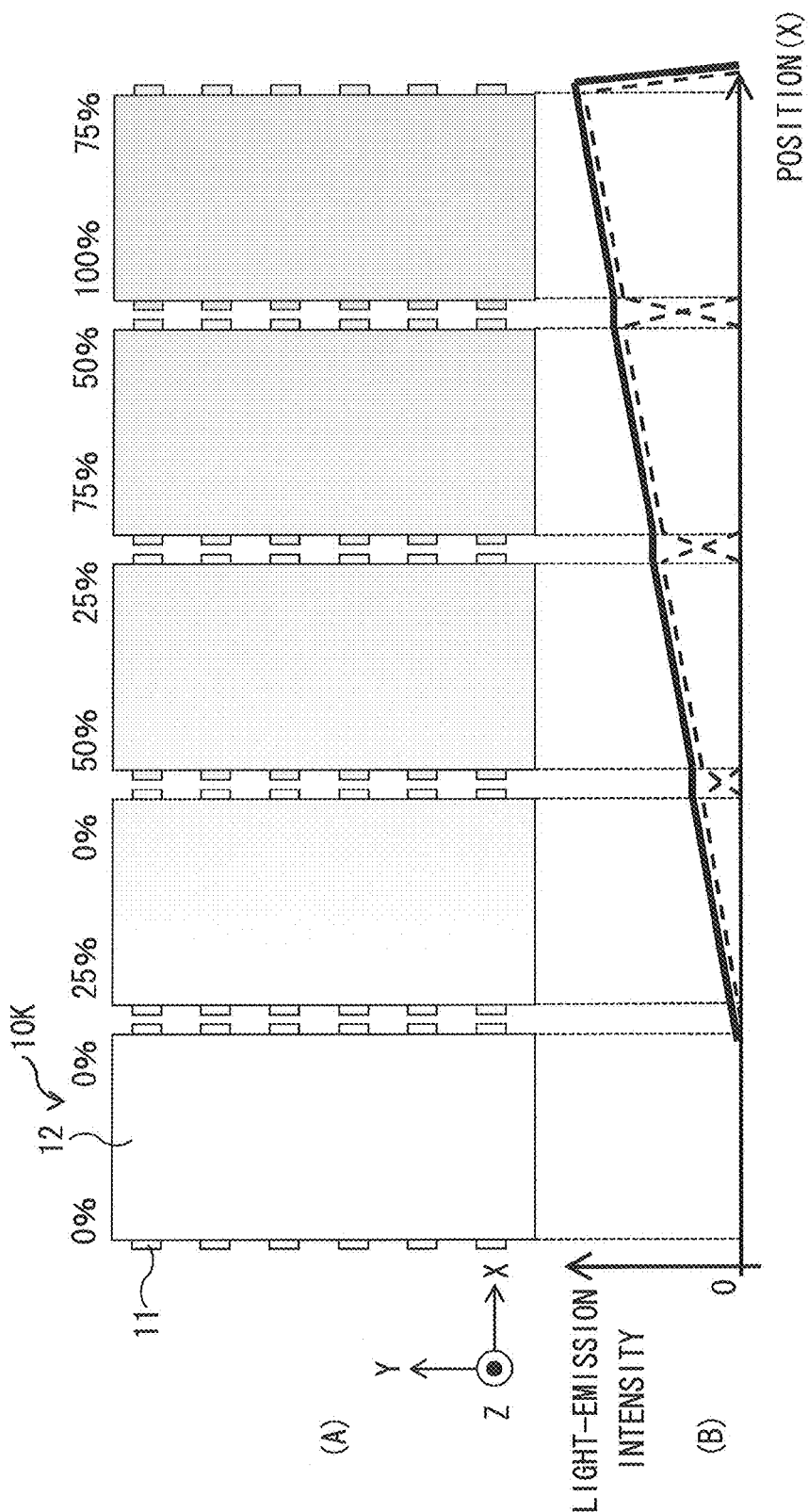
FIG. 51 is a diagram that illustrates another example of the light-emission intensity distribution of the surface light source device according to the second embodiment.

Here, in the present embodiment as well, as illustrated in, for example, FIG. 46 through FIG. 48, when the light-emission intensity distribution gradually changes between the unit light-source sections 10K adjacent to each other, between these unit light-source sections 10K adjacent to each other, the light-emission intensities of the light sources 11 on the opposed different sides are desired to be, mutually, values of approximately the same tendency as the changing light-emission intensity distribution. Alternatively, as illustrated in, for example, FIG. 49 through FIG. 51, the light-emission intensities of the light sources 11 on the opposed different sides are desired to be values equal to each other. This is because it is possible to make the appearance of the boundaries between the partial lighting areas more natural. This will be described in detail by using FIG. 52(A) through FIG. 52(D) as with the first embodiment.

Figure 52:
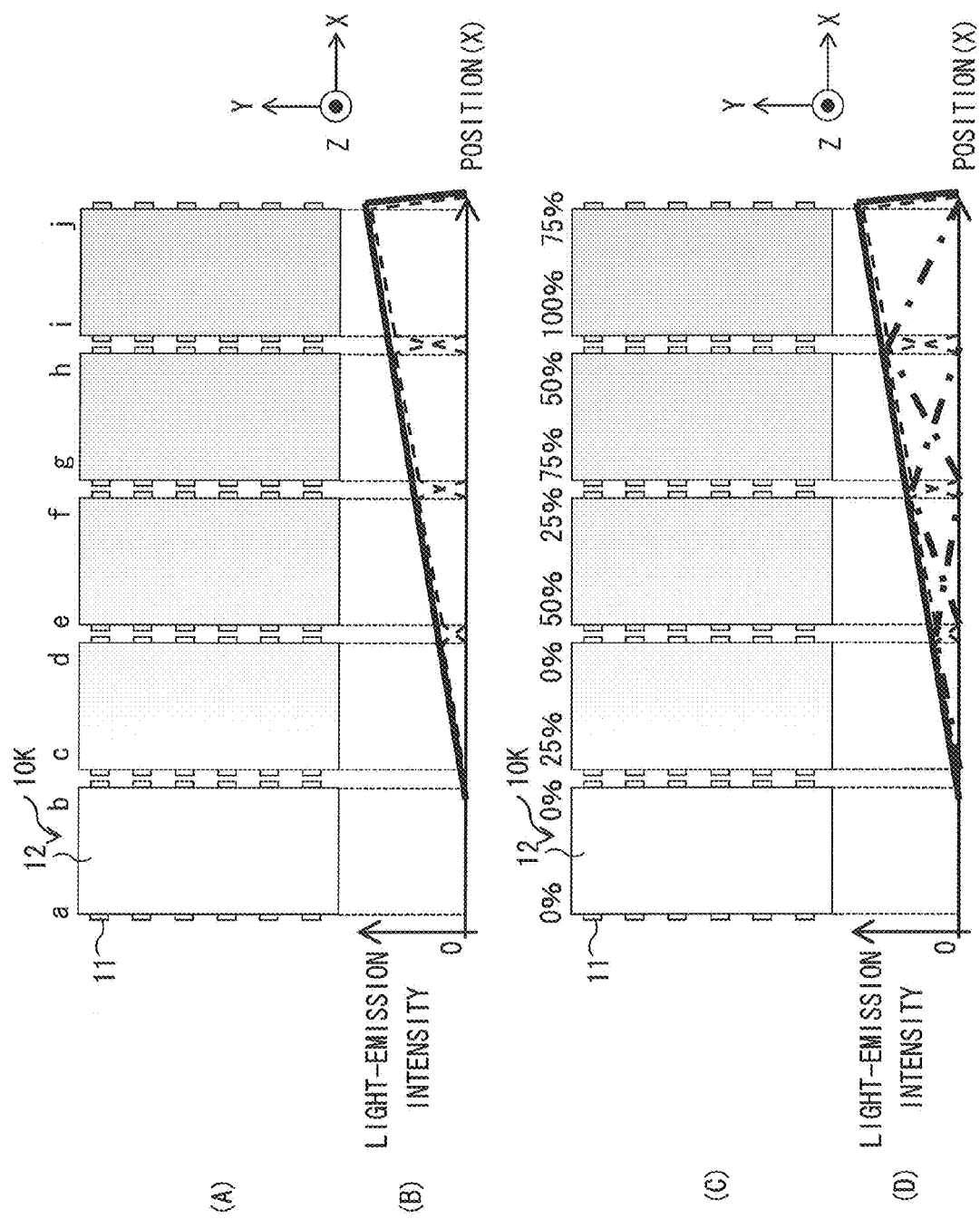
FIG. 52 is a diagram that illustrates another example of the light-emission intensity distribution of the surface light source device according to the second embodiment.
Figure 53:
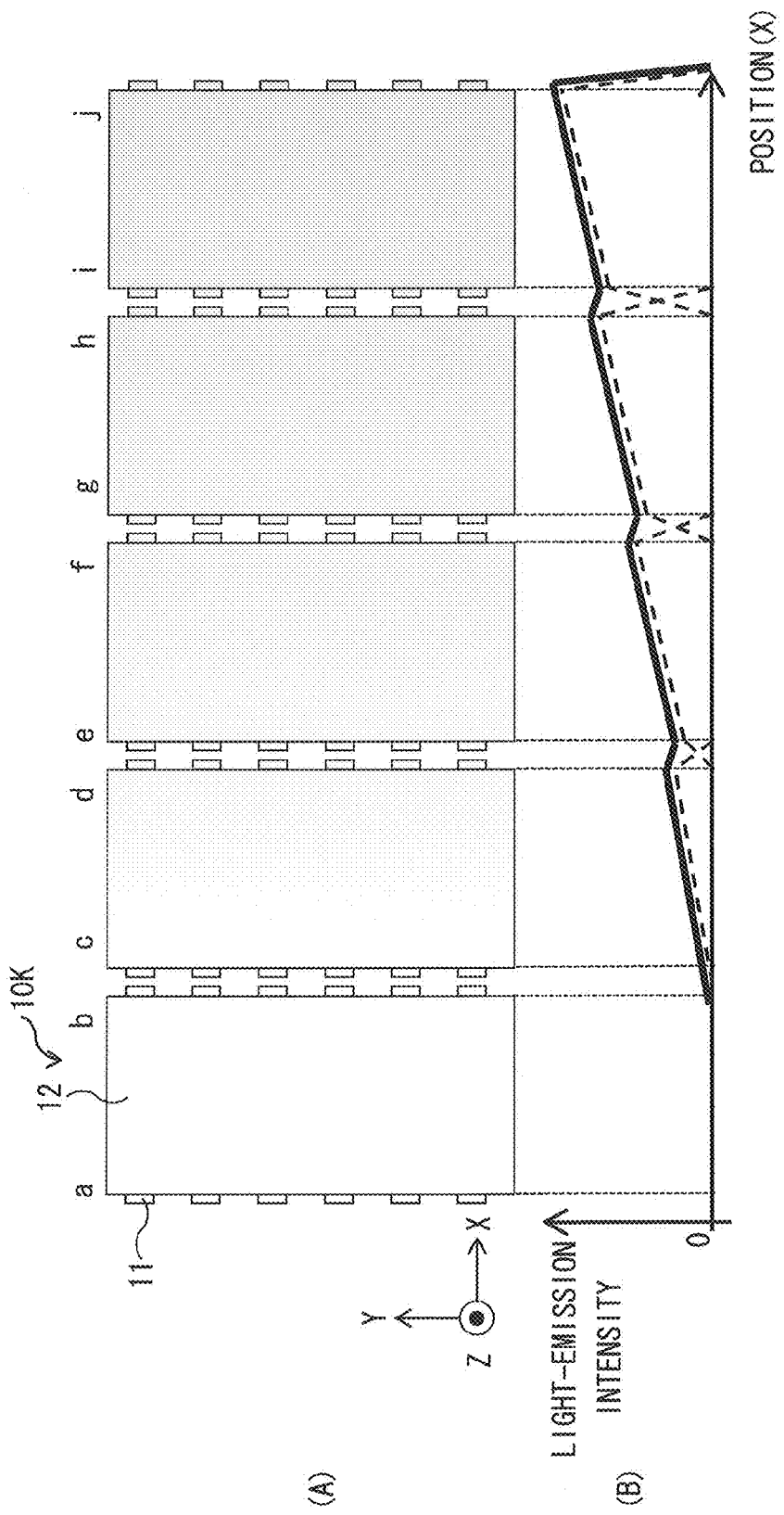
FIG. 53 is a diagram that illustrates another example of the light-emission intensity distribution of the surface light source device according to the second embodiment.

In FIG. 52(A) and FIG. 52(B), among five mutually adjacent unit light-source sections 10K, from left to right (along a positive direction of an X-axis), the light0emission intensity distribution in which the light-emission intensities by the light sources 11 are formed to be gradually higher is formed. In this case, between the adjacent unit light-source sections 10K, between the light sources 11 arranged on the opposed different sides, the light-emission intensity of the light source 11 on the right side is desired to be greater than or equal to the light-emission intensity of the light source 11 on the left side. In other words, in this case, it is desirable that the following expressions (9) through (12) be satisfied. When these expressions (9) through (12) are satisfied, as indicated by, for example, alternate long and short dashed lines in FIG. 52(D), a single uniform and moderate light-emission intensity distribution is formed by a set of the light sources 11 arranged on the opposed different sides. Further, the light-emission intensity distributions of the respective sets are superimposed on each another and thereby, as indicated with, for example, a solid line in FIG. 52(D), a moderate light-emission intensity distribution as a whole is formed. Therefore, the appearance of the boundary between the partial lighting areas becomes more natural. Furthermore, on the contrary, when the above-mentioned expressions (9) through (12) are not satisfied between the light sources 11 arranged on the opposed different sides, in other words, when the following expressions (13) through (16) are satisfied, as illustrated in, for example, FIG. 53, a moderate light-emission intensity distribution is not formed. From this viewpoint as well, it is desirable that the following expressions (9) through (12) be satisfied.

Light-emission intensity of light source on side a $\leq$ Light-emission intensity of light source on side d (9)

Light-emission intensity of light source on side c $\leq$ Light-emission intensity of light source on side f (10)

Light-emission intensity of light source on side e $\leq$ Light-emission intensity of light source on side h (11)

Light-emission intensity of light source on side g $\leq$ Light-emission intensity of light source on side j (12)

Light-emission intensity of light source on side a > Light-emission intensity of light source on side d (13)

Light-emission intensity of light source on side
c>Light-emission intensity of light source on
side f    (14)

Light-emission intensity of light source on side
e>Light-emission intensity of light source on
side h    (15)

Light-emission intensity of light source on side
g>Light-emission intensity of light source on
side j    (16)

However, the above relations have been described strictly on the assumption that in each of the unit light-source sections, the intensity distribution formed by the one light source and the intensity distribution formed by the other light source are ideal intensity distributions. Nevertheless, actually, instead of the ideal intensity distribution, a case of an intensity distribution deviated from the ideal intensity distribution may occur. In this case, the above-mentioned expressions (9) through (12) may not be desirable, and there is a case in which the above-mentioned expressions (13) through (16) are rather desirable. Incidentally, the reason is the same as the reason described above by using FIG. 22 through FIG. 29 in the first embodiment and thus, description will be omitted.

Further, even with the unit light-source section in which the intensity distribution deviated from the ideal intensity distribution is formed, when the light-emission intensity distribution in the surface light source device is not inclined, as in the case of FIG. 30 through FIG. 33 in the first embodiment, it is possible to obtain an intensity distribution that is uniform to some extent.

Figure 34:
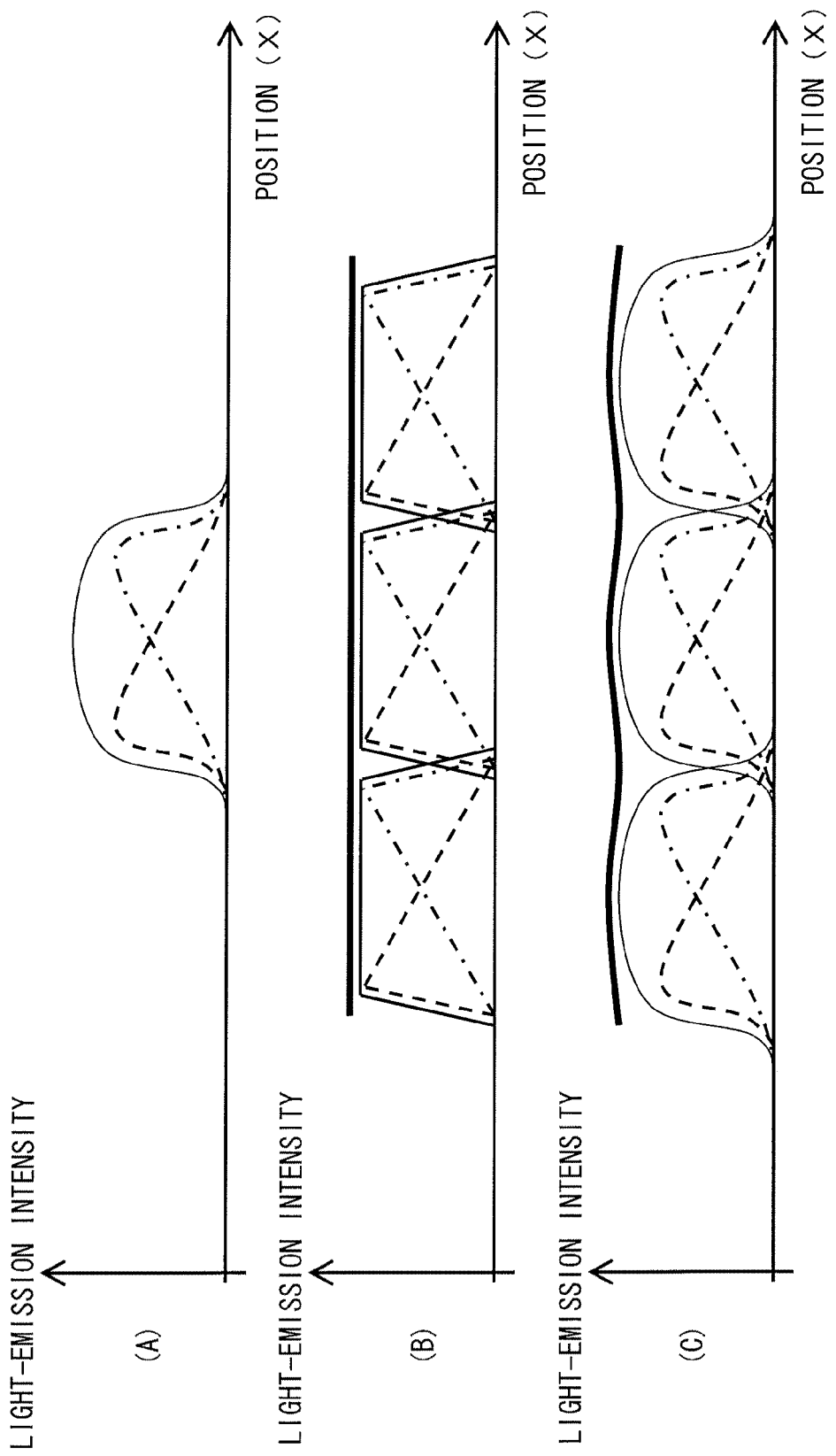
FIG. 34 is a diagram that illustrates another example of the light-emission intensity distribution of the surface light source device according to the first embodiment.

Furthermore, even in a case in which the unit light-source section has a curved light-emission intensity distribution, as in the case of FIG. 34 in the first embodiment, all the properties described in the present embodiment are obtained in a manner similar to the unit light-source section in which the linear light-emission intensity distribution is formed. In other words, every diagram that illustrates the light-emission intensity distribution stated in the present embodiment may be based on the curved light-emission intensity distribution.

Moreover, in the present embodiment, within the light-emission surface of each of the unit light-source sections 10K, from the side of the emitting light source 11 to the opposite side, the light-emission intensity by the light emission of that light source 11 gradually increases and thus, as compared to the first embodiment (in the case in which the light-emission intensity by the light emission of the light source 11 gradually decreases on the contrary), the occurrence of bright line unevenness or linear unevenness in a boundary part between the light guiding plates 12 is able to be made difficult and the appearance of the boundary between the partial lighting areas is able to be made more natural, for the following two reasons.

(1) First Reason

1. First, at the boundary part between the light guiding plates 12, because the light guiding plate 12 is not disposed, light is not emitted from that part. Therefore, it readily becomes relatively dark as compared to other part (part where the light guiding plate 12 is disposed) and as a result, joint unevenness readily occurs. In order to solve this problem, it is desirable to make the boundary part between the light guiding plates 12 as small as possible as will be described later, but it is not possible to eliminate the boundary part completely because the light source 11 is necessary to be disposed. Moreover, in order to completely eliminate the boundary part between the light guiding plates 12, the adjacent light guiding plates 12 are necessary to be linked to be integrated with each other, which make it difficult to realize the basic structure of the present invention, which is to align the plural light guiding plates 12.

2. For the above reason 1, in order to improve the joint unevenness in the boundary part between the light guiding plates 12, it is necessary to cause a larger amount of light to be emitted from this boundary part, namely, a part in which the light guiding plate 12 is absent and which readily becomes dark.

3. On the other hand, outgoing light from the light guiding plate 12 proceeds within the light guiding plate 12 in a direction to be away from the light source 11 and then goes outside the light guiding plate 12 and thus, it is easy to emit the light in a direction to be away from the light source 11. Therefore, a peak angle of a distributed light distribution of the outgoing light (an intensity distribution in an angle direction) easily points, rather than in a normal direction of an outgoing surface, in a direction to be away from the light source 11.

4. For the above reason 3, it is easy to emit the light from the light source 11, at the joint on the side opposite to the side where the light source 11 is disposed, while it is difficult to emit the light from the light source 11 at the joint on the side where the light source 11 is disposed.

5. Here, in the case, like the present embodiment, in which from the side of the emitting light source 11 to the opposite side, the light-emission intensity of the light emission of that light source 11 gradually increases, it is necessary to cause a larger amount of light to be emitted, at the joint on the side opposite to the side where the light source 11 is disposed. On the other hand, in the case, like the first embodiment, in which from the side of the emitting light source 11 to the opposite side, the light-emission intensity of the light emission of that light source 11 gradually decreases, it is necessary to cause a larger amount of light to be emitted, at the joint on the side where the light source 11 is disposed.

6. Here, for the above reason 4, in the case in which the light-emission intensity gradually increases like the present embodiment, it is said that it is easy to cause a larger amount of light to be emitted at the joint on the side opposite to the side where the light source 11 is disposed. Further, for the same reason, in the case in which the light-emission intensity gradually decreases like the first embodiment, there occurs a case in which it is difficult to cause a larger amount of light to be emitted at the joint on the side where the light source 11 is disposed.

7. In view of the foregoing, it is said that in the present embodiment, as compared with the first embodiment, the joint unevenness is possible to be made difficult to generate.

(2) Second Reason

8. When a surface light source is configured by using the light guiding plate 12, as long as a linear light source is not employed, generally, brightness unevenness, a so-called fluorescence nonuniformity, readily occurs on the side where the light source is disposed. This results from (i) an easy emission of a large amount of light because of a large amount of light traveling within the light guiding plate near the light source, and (ii) a difficult emission of a large amount of light because of a small amount of light traveling within the light guiding plate between the light sources.

9. Further, the longer the distance from the light source, the smaller a difference between the above (i) and (ii) and thus, the fluorescence nonuniformity becomes difficult to generate.

10. For these reasons, the harder an attempt to emit the light near the light source is made, the more easily the fluorescence nonuniformity occurs. Furthermore, it is said that when the amount of outgoing light near the light source is increased and concurrently the amount of outgoing light at a position away from the light source to some extent is decreased, the occurrence of the fluorescence nonuniformity is possible to be made more difficult.

11. Therefore, in the case in which the light-emission intensity is cause to gradually increase as in the present embodiment, the fluorescence nonuniformity less easily occurs, and on the contrary, in the case in which the light-emission intensity is cause to gradually decrease as in the first embodiment, the fluorescence nonuniformity readily occurs.

12. In view of the foregoing, it is said that in the present embodiment, as compared with the first embodiment, it is possible to make the occurrence of the fluorescence nonuniformity more difficult.

Incidentally, in the present embodiment as well, as with the modifications of the first embodiment, the light source may be arranged on each of two or three opposed sides of the light guiding plate 12, and within the light-emission surface of the surface light source device, such unit light-source sections may be arranged along a direction of an X-axis, a direction of a Y-axis, or a slanting direction between the X-axis and the Y-axis. In this case as well, by the light emission of the light source 11 on each of the two or three sides, uneven light-emission intensity distributions that are mutually independent within the light-emission surface of each of the unit light-source sections are formed, and thereby an arbitrary light-emission intensity distribution may be formed.

Figure 54:
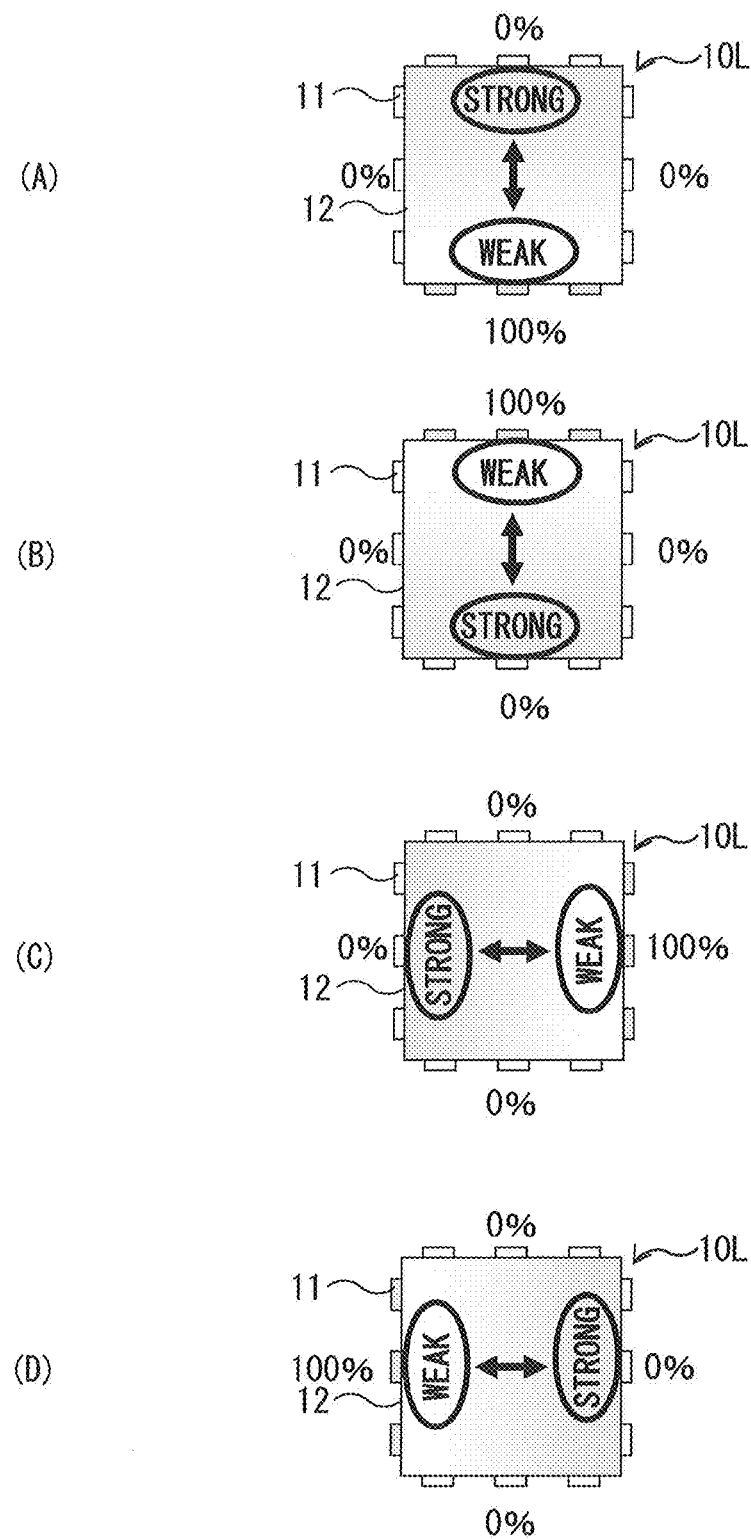
FIG. 54 is a plan view for explaining a light-emission mode of a unit light-source section according to modifications of the second embodiment.
Figure 55:
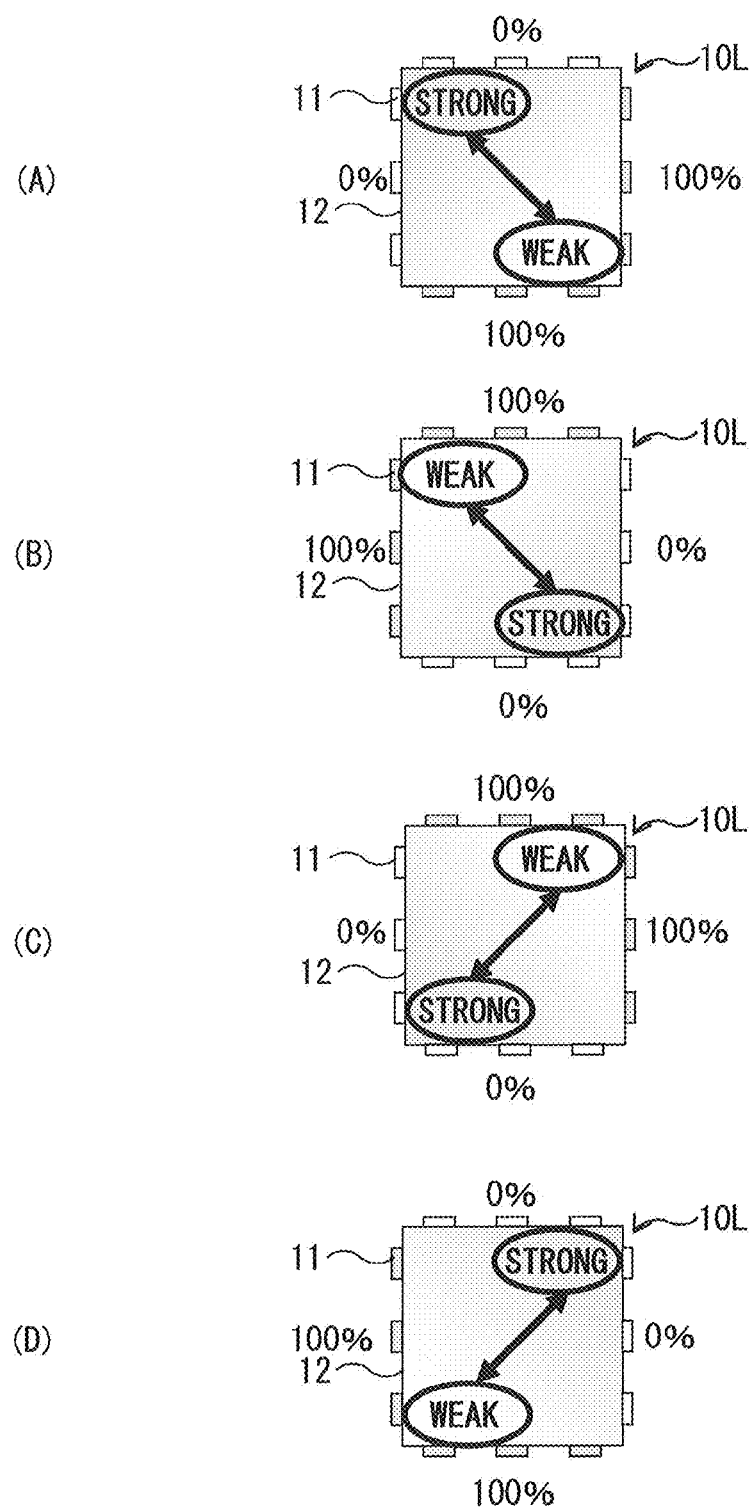
FIG. 55 is a plan view for explaining a light-emission mode of a unit light-source section according to another modification of the second embodiment.

In other words, like a unit light-source section 10L illustrated in, for example, FIG. 54(A) and FIG. 54(B), by adjusting the light-emission intensities of the light sources 11 arranged on upper and lower sides, it is possible to adjust an intensity inclination in a vertical direction. Further, like the unit light-source section 10L illustrated in, for example, FIG. 54(C) and FIG. 54(D), by adjusting the light-emission intensities of the light sources 11 arranged on left and right sides, it is possible to adjust an intensity inclination in a lateral direction. Furthermore, like the unit light-source section 10L illustrated in, for example, FIG. 55(A) and FIG. 55(B), by adjusting the light-emission intensities of the light sources 11 arranged on lower and right sides and the light-emission intensities of the light sources 11 arranged on upper and left sides, it is possible to adjust an intensity inclination in a slanting direction from upper left to lower right. Still furthermore, like the unit light-source section 10L illustrated in, for example, FIG. 55(C) and FIG. 55(D), by adjusting the light-emission intensities of the light sources 11 arranged on upper and right sides and the light-emission intensities of the light sources 11 arranged on lower and left sides, it is possible to adjust an intensity inclination in a slanting direction from upper right to lower left.

Figure 56:
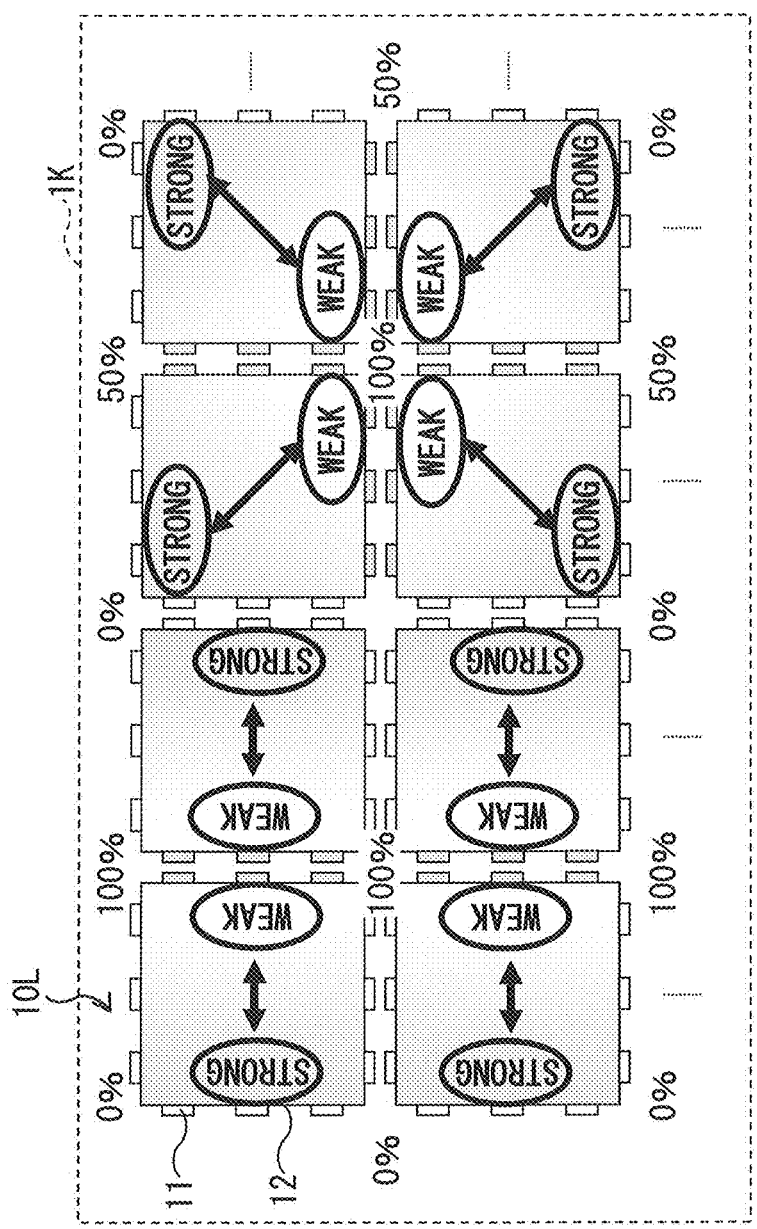
FIG. 56 is a plan view for explaining a light-emission mode of a unit light-source section according to another modification of the second embodiment.

By superimposing these uneven plural light-emission intensity distributions on each another, like a surface light source device 1K illustrated in, for example, FIG. 56, it is possible to form an even or uneven light-emission intensity distribution within the light-emission surface of each of the unit light-source sections 10L, and it is possible to make the boundary between the partial lighting areas look more natural.

(Modification of Second Embodiment: Modification 1)

Figure 64:
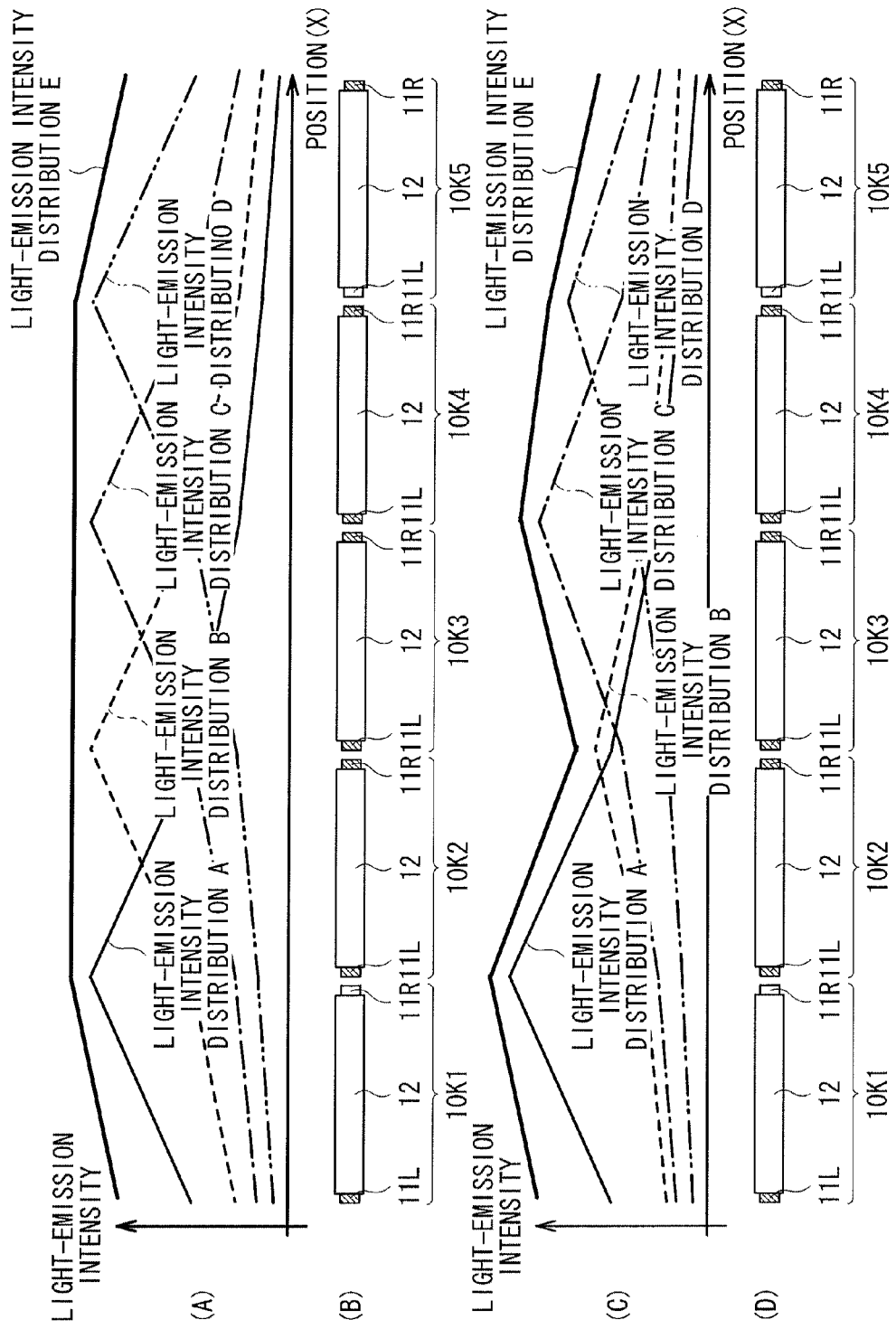
FIG. 64 is a diagram that illustrates another example of the light-emission intensity distribution of the surface light source device according to the modification 1.

FIG. 57 through FIG. 61 are for explaining a light-emission intensity distribution in a surface light source device according to the present modification. In these figures, (B) and (D) each illustrate a cross-sectional structure of a surface light source device formed by five unit light-source sections 10K1 through 10K5 (each corresponding to the unit light-source section 10K described in the second embodiment) arranged along a positive direction of an X-axis, and (A) and (C) each illustrate a light-emission intensity distribution in an X-axis direction in such a surface light source device. Here, each of the unit light-source sections 10K1 through 10K5 includes the light guiding plate 12, a light source 11L disposed on the left side (a negative direction side of the X-axis) of this light guiding plate 12, and a light source 11R disposed on the right side (a positive direction side of the X-axis) of the light guiding plate 12. Further, in the present modification (except FIG. 64 to be described later), a light-emission intensity distribution formed by the light source 11L is indicated by alternate long and short thin or thick dashed lines, a light-emission intensity distribution formed by the light source 11R is indicated by thin or thick dashed lines, and a light-emission intensity distribution formed by all the five unit light-source sections 10K1 through 10K5 is indicated by a thick solid line. In the following, in the present modification, a technique of solving the problem that may take place in the second embodiment will be described.

First, as illustrated in, for example, FIG. 57(A) and (B), a case in which only the light source 11L of the unit light-source section 10K1 is lighted will be considered. As illustrated in these FIG. 57(A) and (B), in a case in which the light source 11L of the unit light-source section 10K1 is lit, when the light-emission intensity distribution is formed only immediately above this unit light-source section 10K1, it is possible to realize a moderate light-emission intensity distribution in the surface light source device as a whole by the technique described so far.

However, as illustrated in, for example, FIG. 57(C) and (D), there is a case in which the light is transmitted to other unit light-source section located near the lit unit light-source section, depending on the positional relations of the unit light-source sections or the positions and types of the optical sheets and the like disposed above the light guiding plate 12. In such a case, on the unit light-source sections other than the lit unit light-source section as well, the light-emission intensity distributions (uneven light-emission intensity distribution) are formed. This situation may occur in the following case and the like.

A case in which when the light source on one of the sides is lit, the light is emitted from the side opposite to the side where the light source is lit, and the light enters from a side of the next (adjacent) unit light-source section.

A case in which light once emitted from the light guiding plate is reflected by the optical sheets and the like disposed above the light guiding plate and comes back, and thereby the light enters from the top surface of the light guiding plate of the next (adjacent) unit light-source section.

Here, as illustrated in FIG. 57(A) and (B), in a case in which when the light source 11L of the unit light-source section 10K1 is lit, the uneven light-emission intensity distribution is formed only immediately above the light guiding plate 12 of this unit light-source section 10K1, it is possible to form a moderate light-emission intensity distribution in the surface light source device as a whole, by lighting the light source 11L of the unit light-source section 10K1 and the light source 11R of the unit light-source section 10K2, as illustrated in, for example, FIG. 58(A) and (B). On the other hand, as illustrated in FIG. 57(C) and (D), in a case in which when the light source 11L of the unit light-source section 10K1 is lit, the light is transmitted to the adjacent unit light-source sections 10K2 through 10K5 and the uneven light-emission intensity distributions are formed, it is not possible to form a moderate light-emission intensity distribution in the surface light source device as a whole, even when the light source 11L of the unit light-source section 10K1 and the light source 11R of the unit light-source section 10K2 are lit, as illustrated in, for example, FIG. 58(C) and (D). In order to solve this problem, the following technique may be used.

First, as illustrated in FIG. 57(C) and (D), in a case in which when the light source 11L of the unit light-source section 10K1 is lit, the light is transmitted to the adjacent unit light-source sections 10K2 through 10K5 and the uneven light-emission intensity distributions are formed, the light sources of the peripheral (adjacent) unit light-source sections are lit, so that, as indicated by thick lines and arrows illustrated in, for example, FIG. 59(A) and (B), there are formed uneven light-emission intensity distributions of the same amount as and the opposite tendency to the uneven light-emission intensity distributions formed as a result of the transmission. Thus, the light-emission intensity distributions cancel out the uneven light-emission intensity distributions formed as a result of the transmission of the light to the adjacent unit light-source sections 10K2 through 10K5, and thereby the above-described problem is able to be solved.

Specifically, in the case in which the light source 11L of the unit light-source section 10K1 is lit, the uneven light-emission intensity distribution formed as a result of the transmission of the light to the unit light-source section 10K2 is cancelled out by lighting the light source 11R of the unit light-source section 10K3 and thereby forming the uneven light-emission intensity distribution of the same amount and the opposite tendency in this unit light-source section 10K3, the uneven light-emission intensity distribution formed as a result of the transmission of the light to the unit light-source section 10K3 is cancelled out by lighting the light source 11R of the unit light-source section 10K4 and thereby forming the uneven light-emission intensity distribution of the same amount and the opposite tendency in this unit light-source section 10K4, and the uneven light-emission intensity distribution formed as a result of the transmission of the light to the unit light-source section 10K4 is cancelled out by lighting the light source 11R of the unit light-source section 10K5 and thereby forming the uneven light-emission intensity distribution of the same amount and the opposite tendency in this unit light-source section 10K5.

Thus, in the entire surface light source device as a whole, it is possible to form a moderate light-emission intensity distribution, as illustrated, in for example, FIG. 59(C) and (D).

In other words, when this is generalized, in a case in which the light source 11L on the left side of the unit light-source section 10Kn (n: an integer of 1 or more) is lit, the light-emission intensity distributions are cancelled out each other by lighting the light source 11R on the right side of each of the unit light-source section 10Kn+1, 10Kn+2, 10Kn+3, 10Kn+4, . . . and thereby forming the uneven light-emission intensity distributions of the same degree (about the same amount) as and the opposite tendency to the peripheral uneven light-emission intensity distributions formed as a result of the transmission of the light, so that this problem is able to be solved.

Further, also in a case in which the light source 11R on the right side of the unit light-source section 10Kn is lit, similarly, the light-emission intensity distributions are cancelled out each other by lighting the light source 11L on the left side of each of the unit light-source section 10Kn−1, 10Kn−2, 10Kn−3, 10Kn−4, . . . and thereby forming the uneven light-emission intensity distributions of the same degree (about the same amount) as and the opposite tendency to the peripheral uneven light-emission intensity distributions formed as a result of the transmission of the light, so that this problem is able to be solved.

Figure 57:
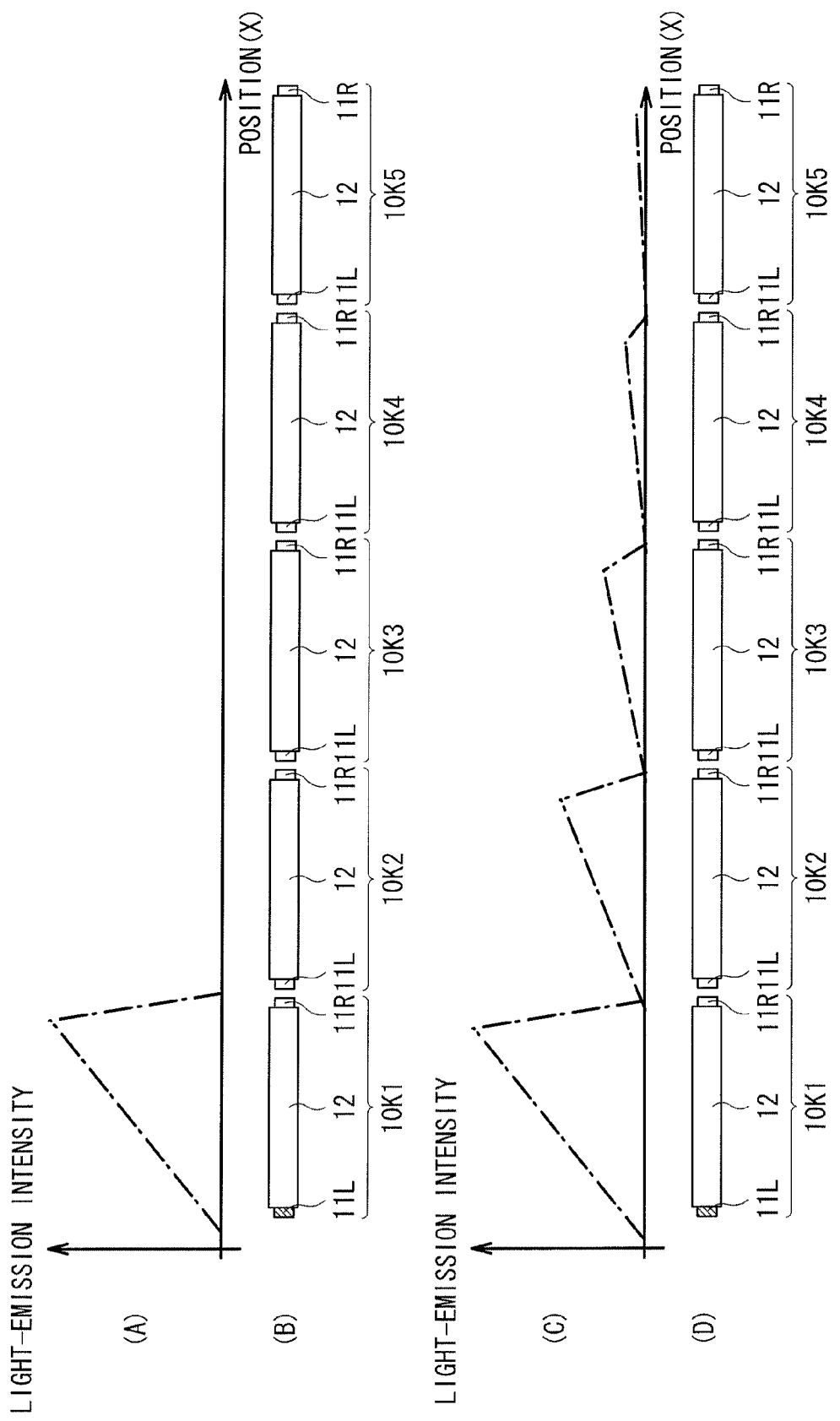
FIG. 57 is a diagram that illustrates an example of a light-emission intensity distribution of a surface light source device according to another modification (modification 1) of the second embodiment.
Figure 58:
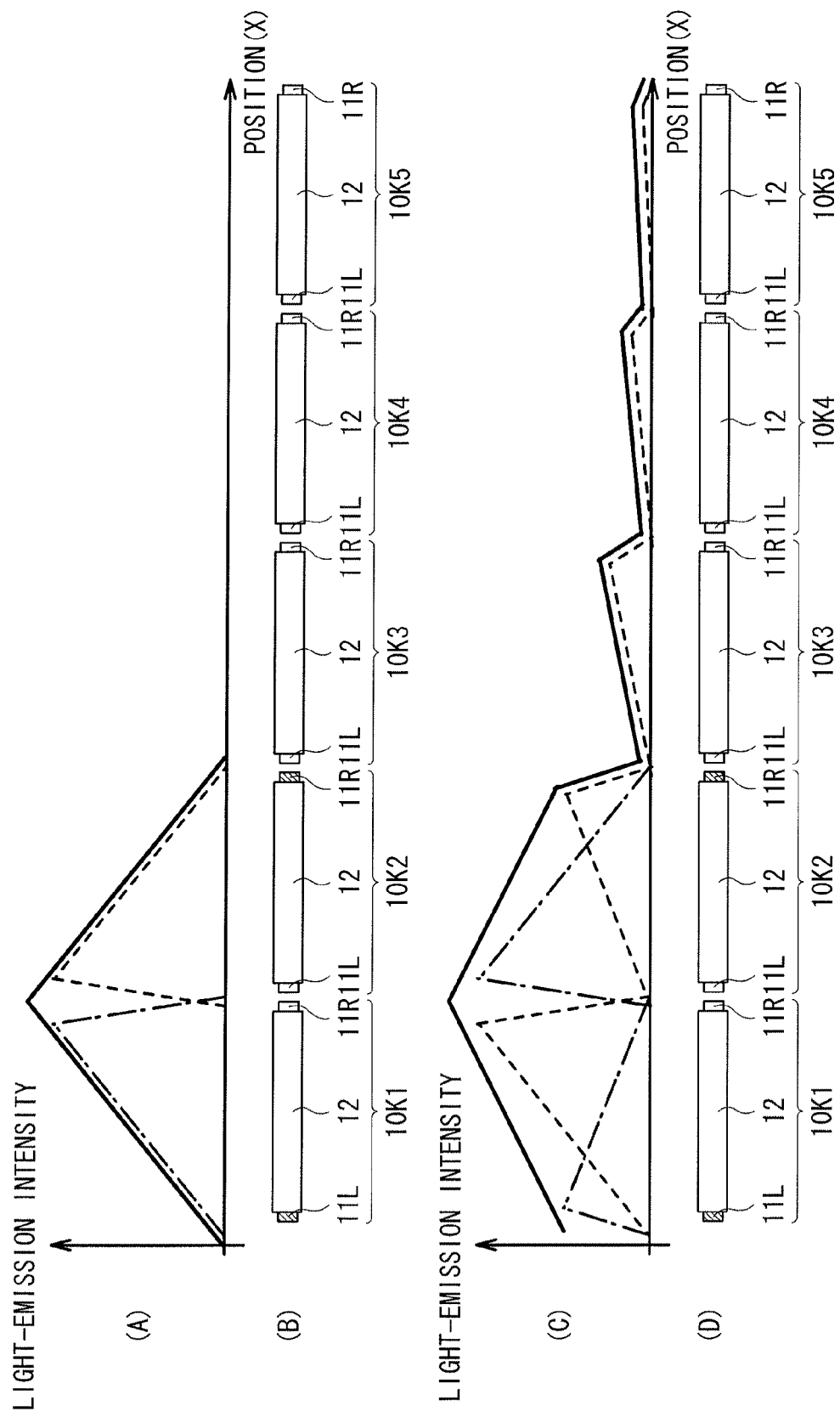
FIG. 58 is a diagram that illustrates another example of the light-emission intensity distribution of the surface light source device according to the modification 1.
Figure 59:
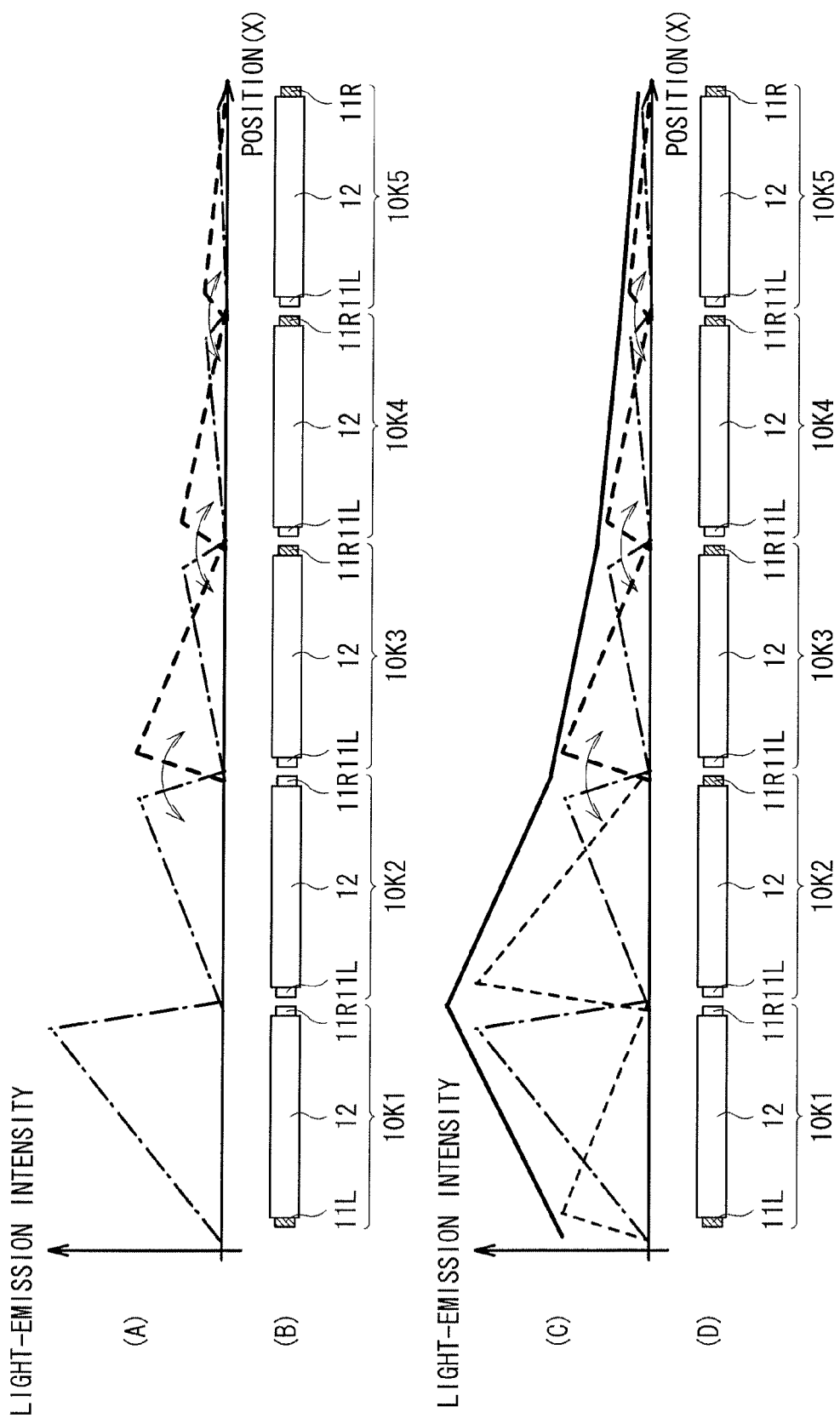
FIG. 59 is a diagram that illustrates another example of the light-emission intensity distribution of the surface light source device according to the modification 1.
Figure 60:
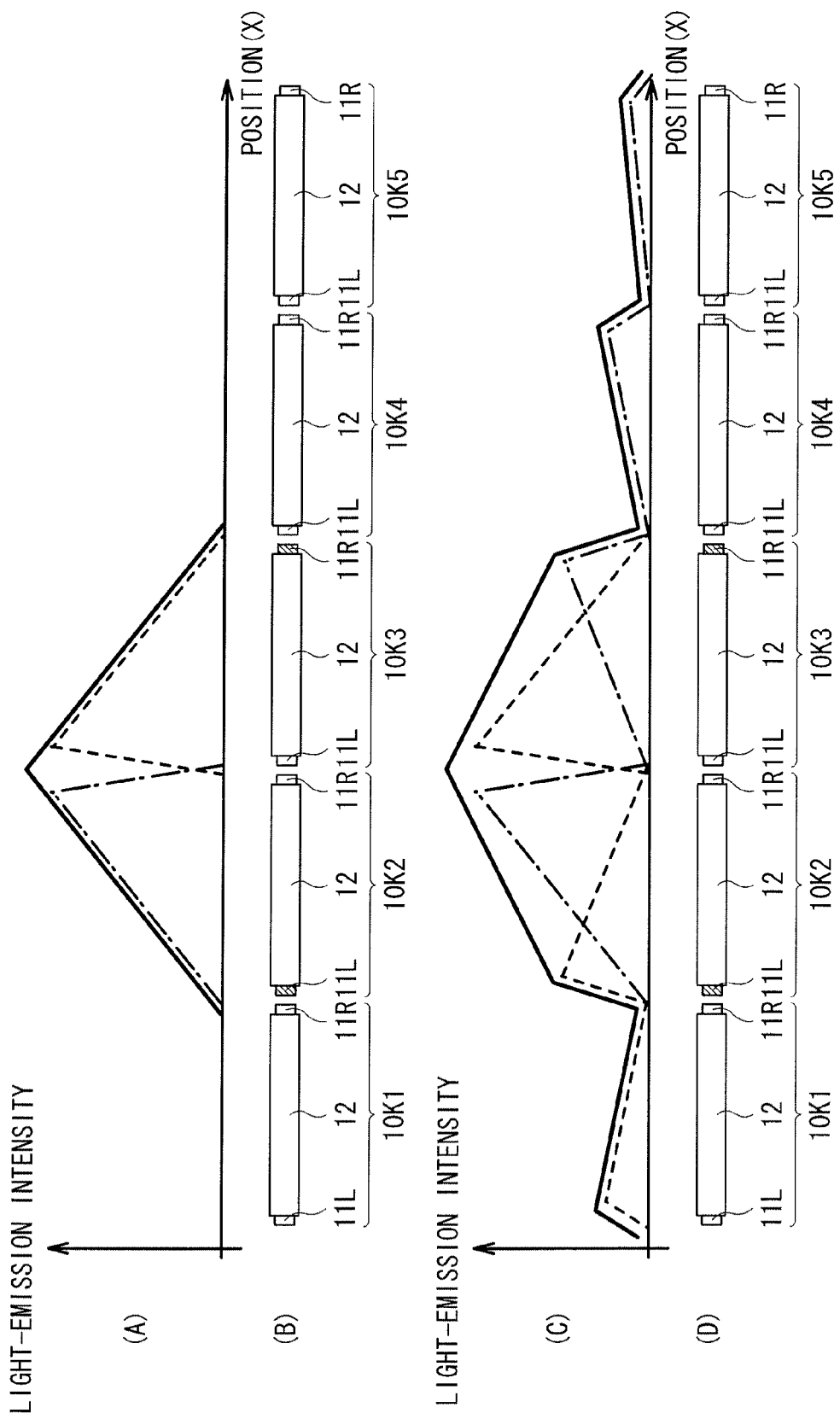
FIG. 60 is a diagram that illustrates another example of the light-emission intensity distribution of the surface light source device according to the modification 1.
Figure 61:
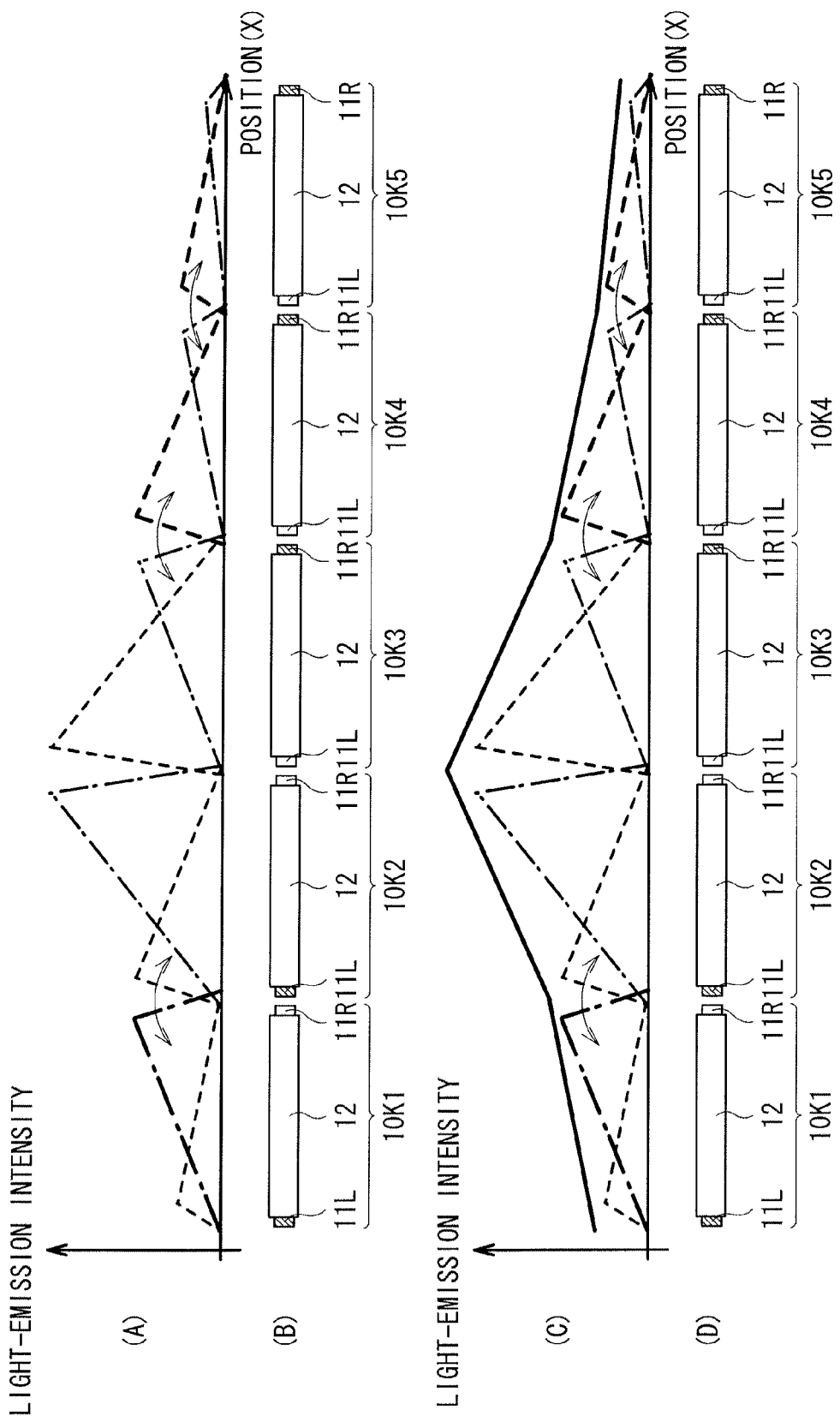
FIG. 61 is a diagram that illustrates another example of the light-emission intensity distribution of the surface light source device according to the modification 1.

Furthermore, any of FIG. 57 through FIG. 59 is for the example of the case in which only the light source 11L on the left side of the leftmost unit light-source section 10K1 is lit, but this is performed likewise in other cases. For example, as illustrated in FIG. 60(A) and (B), in a case in which the light source 11L of the unit light-source section 10K2 and the light source 11R of the unit light-source section 10K3 are lit, when the light is transmitted to other near unit light-source sections and a moderate light-emission intensity distribution in the surface light source device as a whole is difficult to be formed as illustrated in, for example, FIG. 60(C) and (D), the following may be performed. Specifically, as illustrated in, for example, FIG. 61(A) and (B), by lighting the light sources of the peripheral (adjacent) unit light-source sections according to the above-described technique, it is possible to form a moderate light-emission intensity distribution in the surface light source device as a whole, as illustrated in, for example, FIG. 61(C) and (D).

In addition, also in a case in which each of the light sources within plural unit light-source sections is lit to thereby form a moderate light-emission intensity distribution in the surface light source device as a whole, it is possible to form a moderate light-emission intensity distribution in the surface light source device as a whole in the following manner. Specifically, first, an uneven light-emission intensity distribution to be formed as a result of transmission at the time when the light source in each of locations is lit, and light-emission intensities of the peripheral light sources necessary to form an uneven light-emission intensity distribution of the same degree and the opposite tendency for cancelling that out are grasped beforehand. Subsequently, the light-emission intensities of the respective light sources and the intensities of the peripheral light sources necessary for the respective light sources are all added together and output, and thereby it is possible to realize a desired moderate light-emission intensity distribution in the surface light source device as a whole, without being affected by the uneven light-emission intensity distribution to be formed as a result of the transmission.

Figure 62:
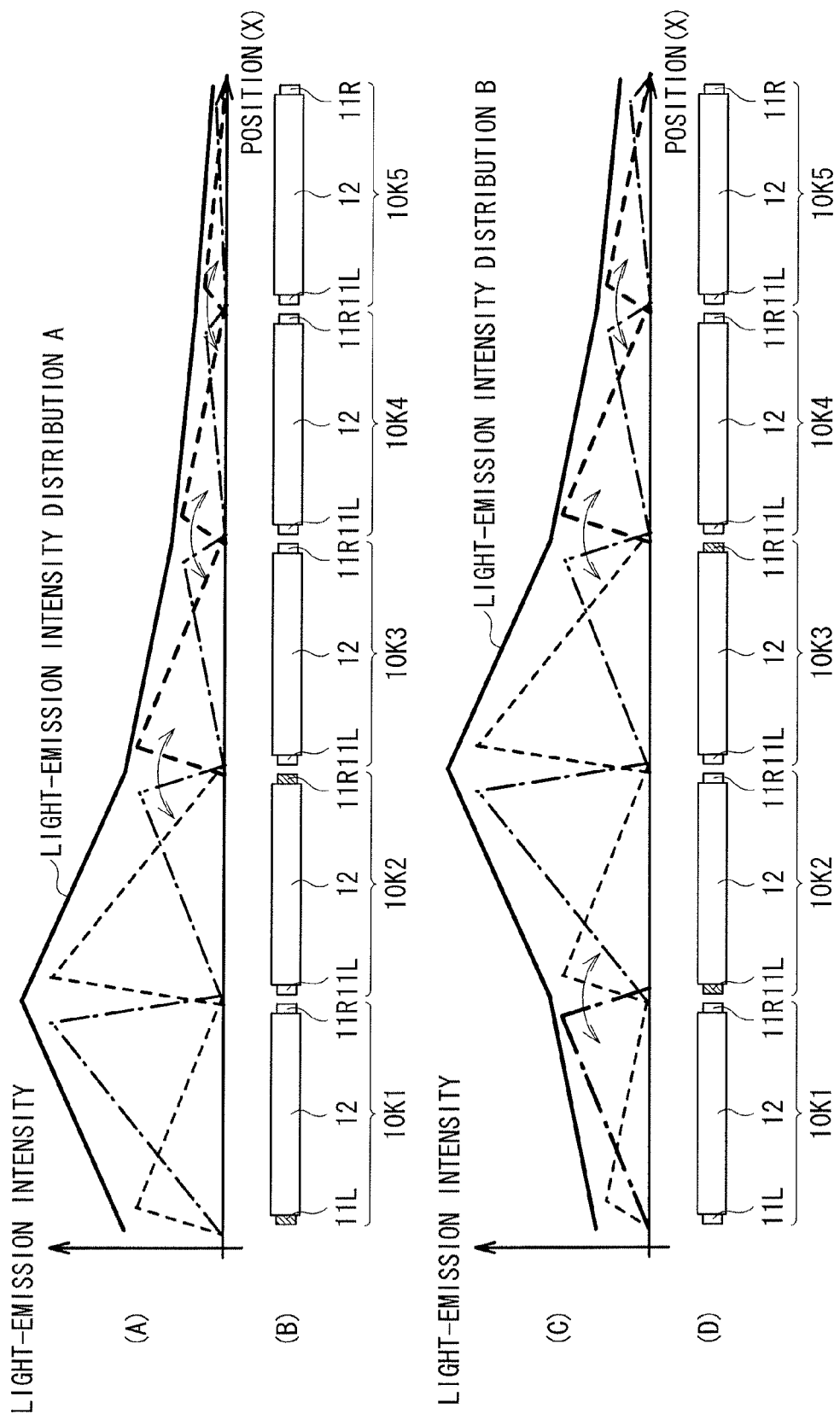
FIG. 62 is a diagram that illustrates another example of the light-emission intensity distribution of the surface light source device according to the modification 1.
Figure 63:
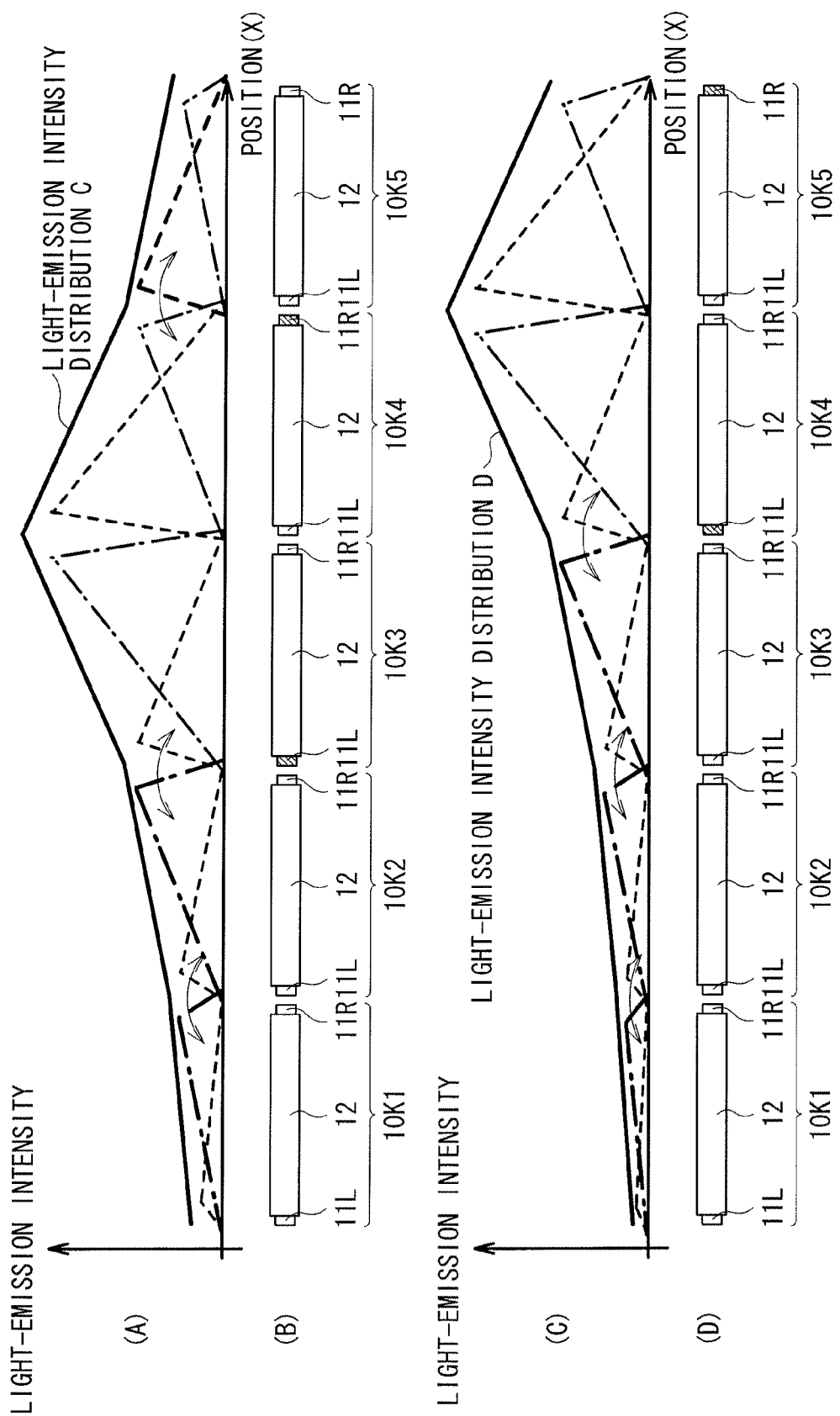
FIG. 63 is a diagram that illustrates another example of the light-emission intensity distribution of the surface light source device according to the modification 1.

To be more specific, as illustrated in, for example, FIG. 62(A) and (B), when a light-emission intensity distribution A having a peak between the unit light-source sections 10K1 and 10K2 is formed, the light source 11L of the unit light-source section 10K1 and the light source 11R of the unit light-source section 10K2 are lit, and at the same time, the peripheral light sources also are lit so that the uneven light-emission intensity distributions formed as a result of the transmission of the light are cancelled out. Similarly, as illustrated in, for example, FIG. 62(C) and (D), when a light-emission intensity distribution B having a peak between the unit light-source sections 10K2 and 10K3 is formed, the light source 11L of the unit light-source section 10K2 and the light source 11R of the unit light-source section 10K3 are lit, and at the same time, the peripheral light sources also are lit so that the uneven light-emission intensity distributions formed as a result of the transmission of the light are cancelled out. Similarly, as illustrated in, for example, FIG. 63(A) and (B), when a light-emission intensity distribution C having a peak between the unit light-source sections 10K3 and 10K4 is formed, the light source 11L of the unit light-source section 10K3 and the light source 11R of the unit light-source section 10K4 are lit, and at the same time, the peripheral light sources also are lit so that the uneven light-emission intensity distributions formed as a result of the transmission of the light are cancelled out. Similarly, as illustrated in, for example, FIG. 63(C) and (D), when a light-emission intensity distribution D having a peak between the unit light-source sections 10K4 and 10K5 is formed, the light source 11L of the unit light-source section 10K4 and the light source 11R of the unit light-source section 10K5 are lit, and at the same time, the peripheral light sources also are lit so that the uneven light-emission intensity distributions formed as a result of the transmission of the light are cancelled out.

Subsequently, by adding together all the intensities of the respective light sources necessary to form these light-emission intensity distributions A through D and outputting at a time, a light-emission intensity distribution E in which the light-emission intensity distributions A through D are added together is formed as illustrated in, for example, FIG. 64(A) and (B). In this way, the light-emission intensity distributions A through D are made to serve as reference intensity distributions, the intensities of the light sources necessary to form the respective reference intensity distributions are grasped beforehand, and the respective reference intensity distributions are adjusted, and thereby it is possible to realize a desired moderate light-emission intensity distribution in the surface light source device as a whole, without being affected by the uneven light-emission intensity distributions formed as a result of the transmission, as illustrated in, for example, FIG. 64(C) and (D).

Third Embodiment

Figure 65:
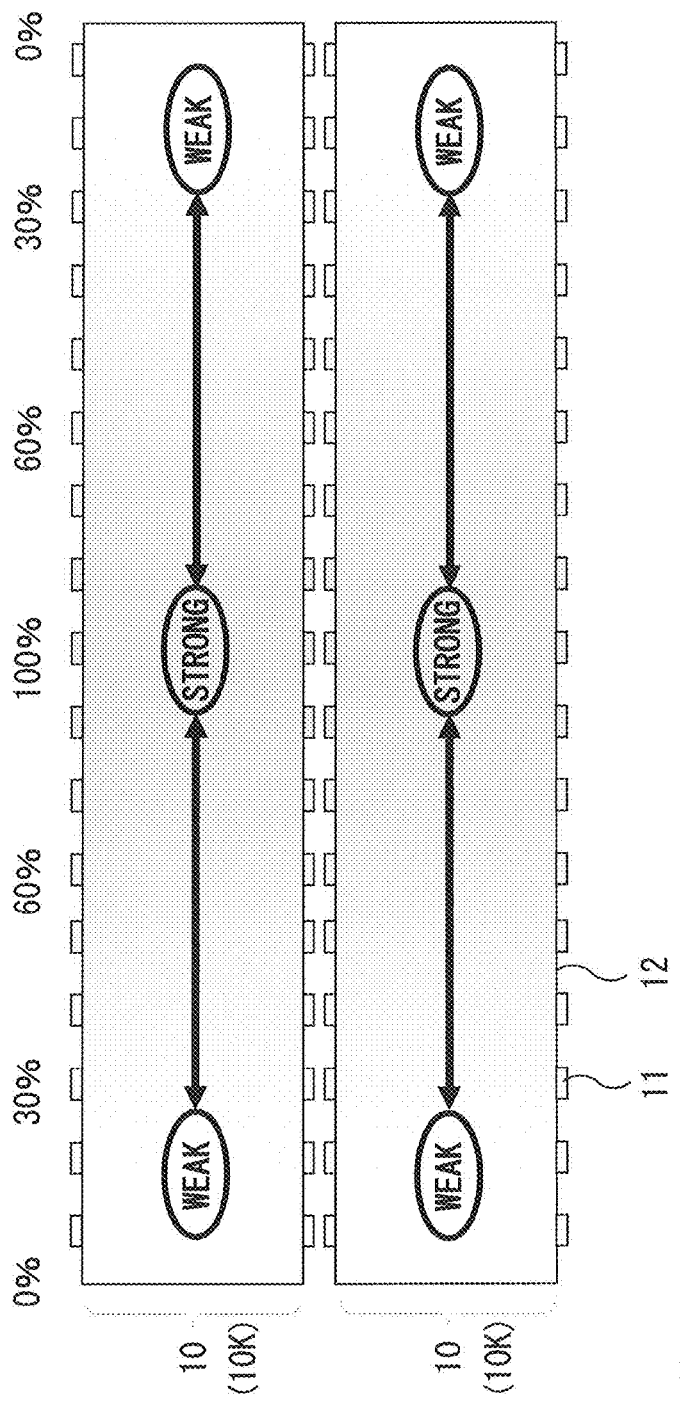
FIG. 65 is a diagram for explaining an example of a light-emission mode of a unit light-source section according to a third embodiment.

FIG. 65 illustrates an example of a light-emission mode of the unit light-source section 10 (or the unit light-source section 10K) according to a third embodiment of the present invention. In this unit light-source section 10 (10K), in each of the light guiding plates 12, it is possible to set, along a side where the plural light sources 11 are arranged (here, a side in an X-axis direction), the light-emission intensities of the respective light sources 11 independently of each other. Thus, in the unit light-source section 10 (10K) illustrated in FIG. 66, the light-emission intensities of the light sources 11 are set to change gradually along the side where the light sources 11 are arranged (here, the side in the X-axis direction), and a light-emission intensity distribution is adjusted along that direction.

Figure 66:
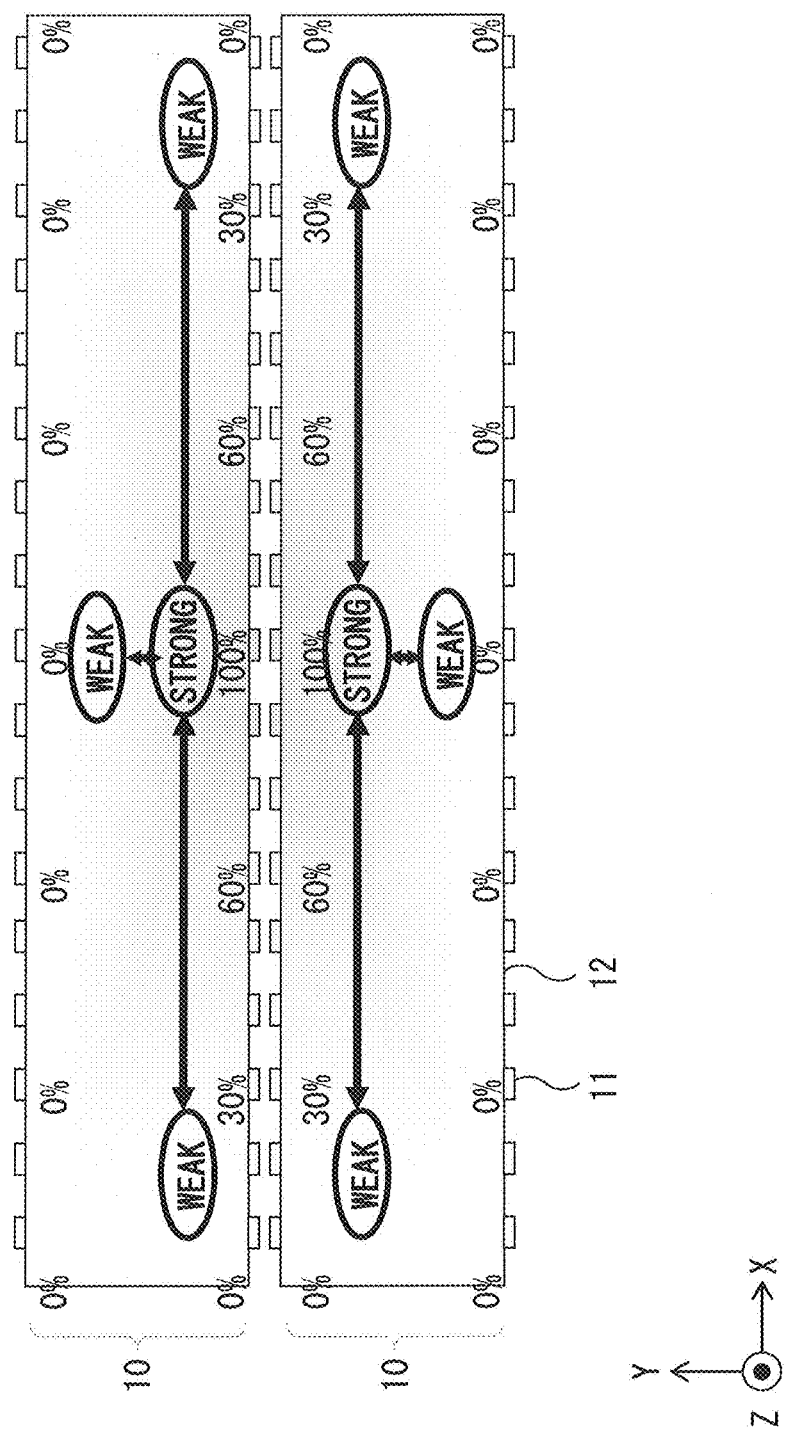
FIG. 66 is a diagram for explaining another example of the light-emission mode of the unit light-source section according to the third embodiment.
Figure 67:
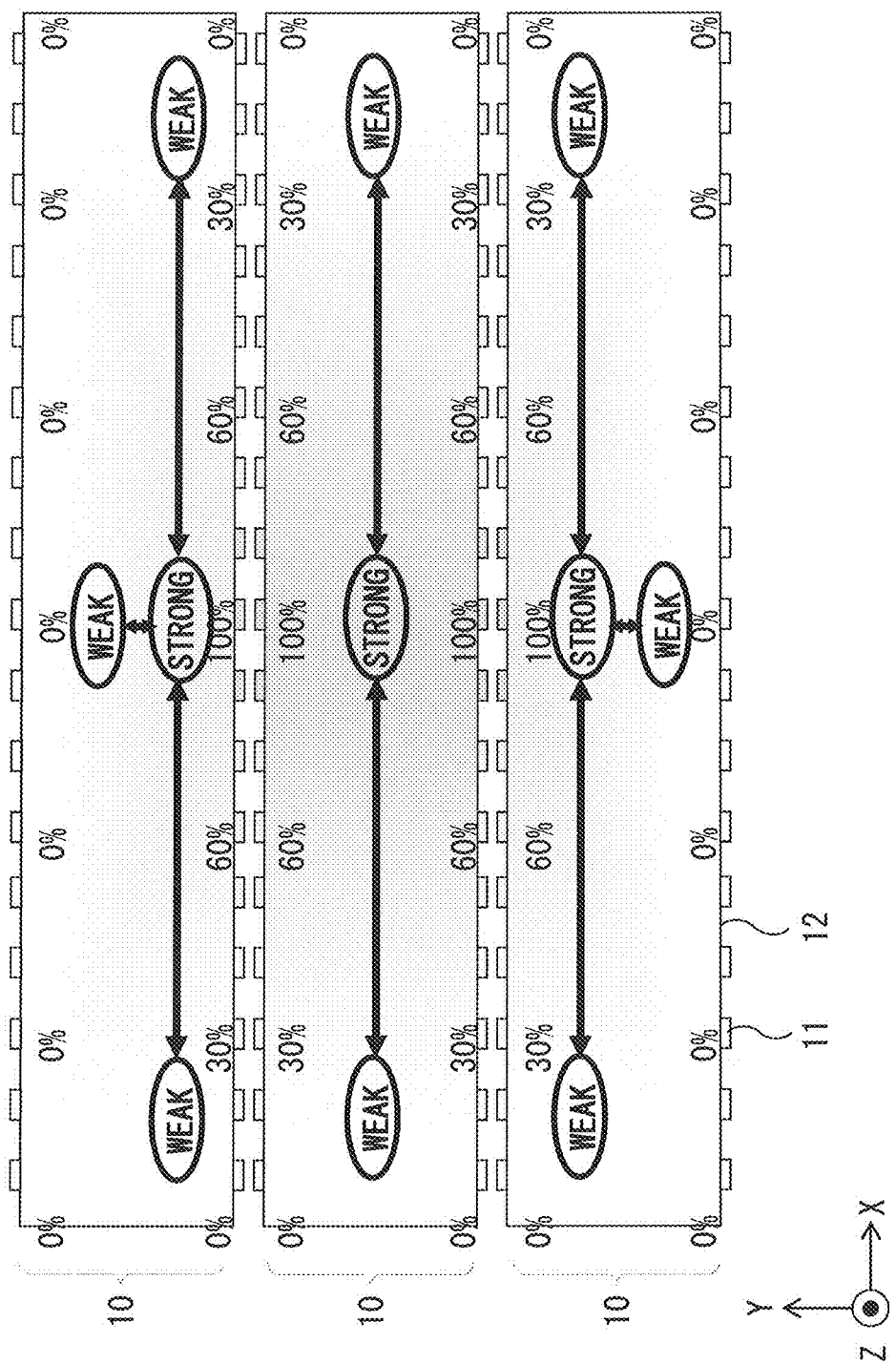
FIG. 67 is a diagram for explaining another example of the light-emission mode of the unit light-source section according to the third embodiment.

Therefore, as illustrated in, for example, FIG. 66 and FIG. 67, by combination with the structure in which in a manner similar to that described in the first embodiment, within the light-emission surface of each of the unit light-source sections 10, from the side of the emitting light source 11 to the opposite side, the light-emission intensity of the light emission of this light source 11 gradually decreases, it is possible to two-dimensionally change the light-emission intensity within the light-emission surface.

Figure 68:
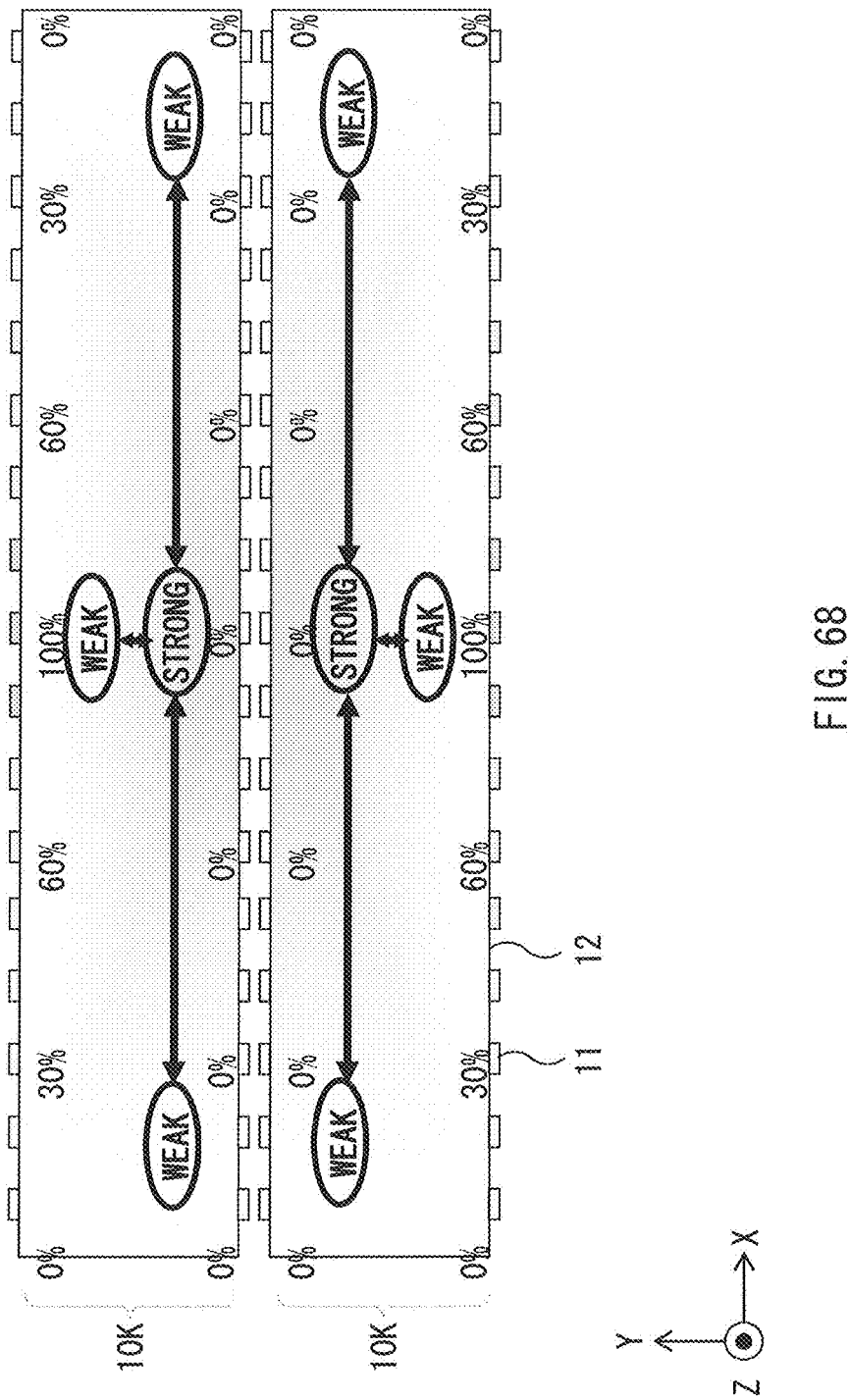
FIG. 68 is a diagram for explaining another example of the light-emission mode of the unit light-source section according to the third embodiment.
Figure 70:
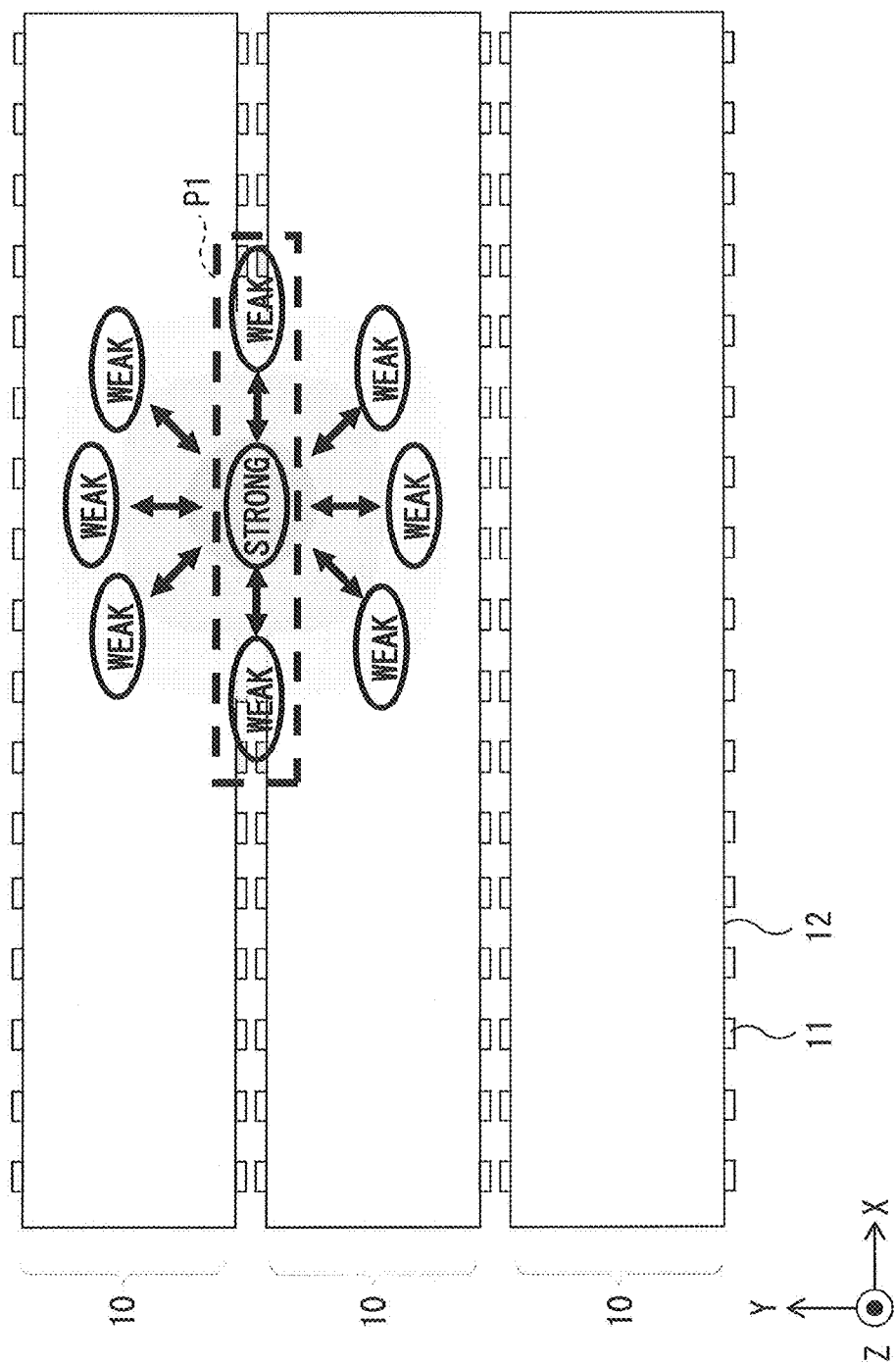
FIG. 70 is a diagram for explaining a light-emission mode of a unit light-source section according to a modification of the third embodiment.
Figure 71:
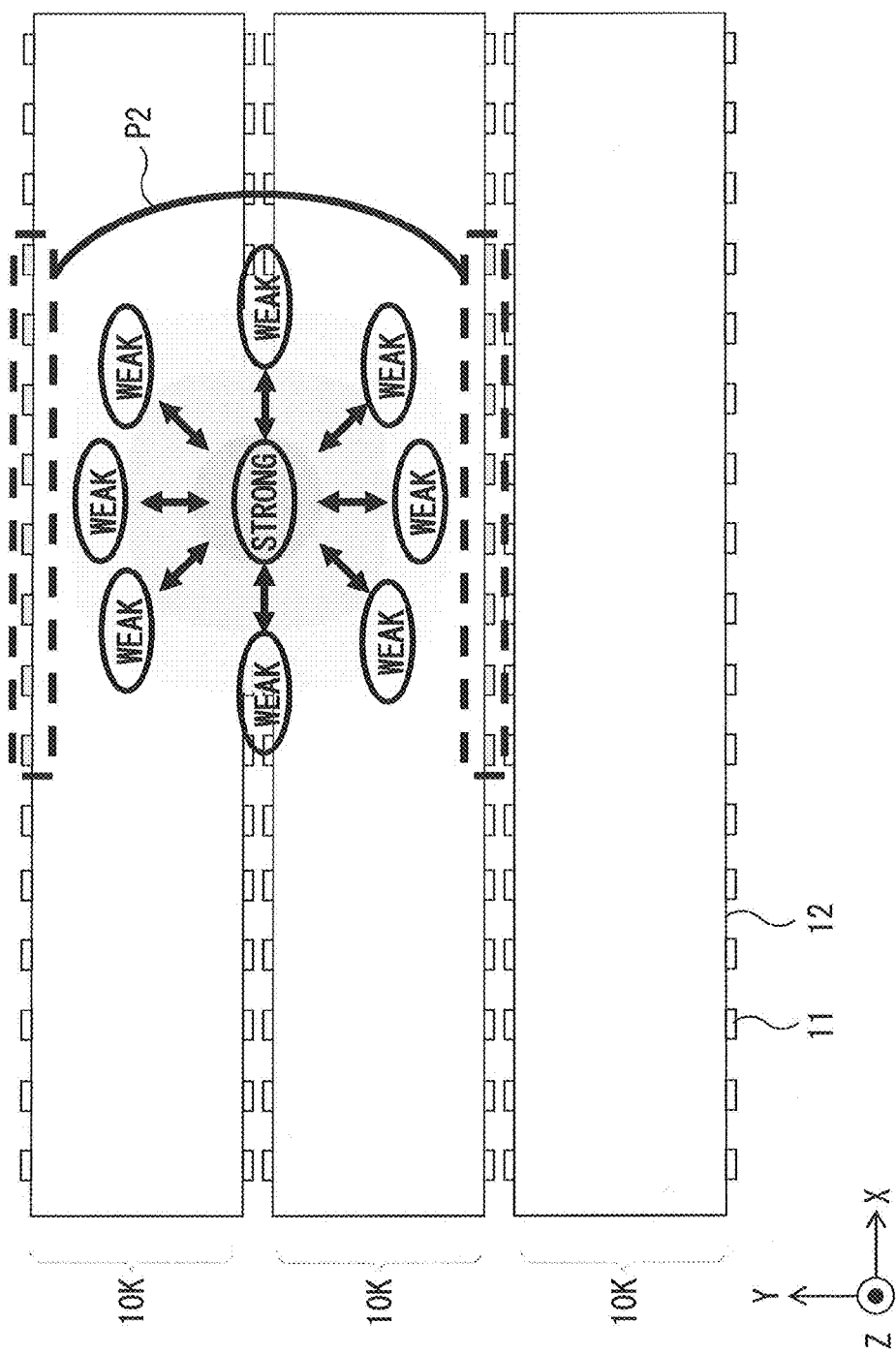
FIG. 71 is a diagram for explaining a light-emission mode of a unit light-source section according to another modification of the third embodiment.
Figure 72:
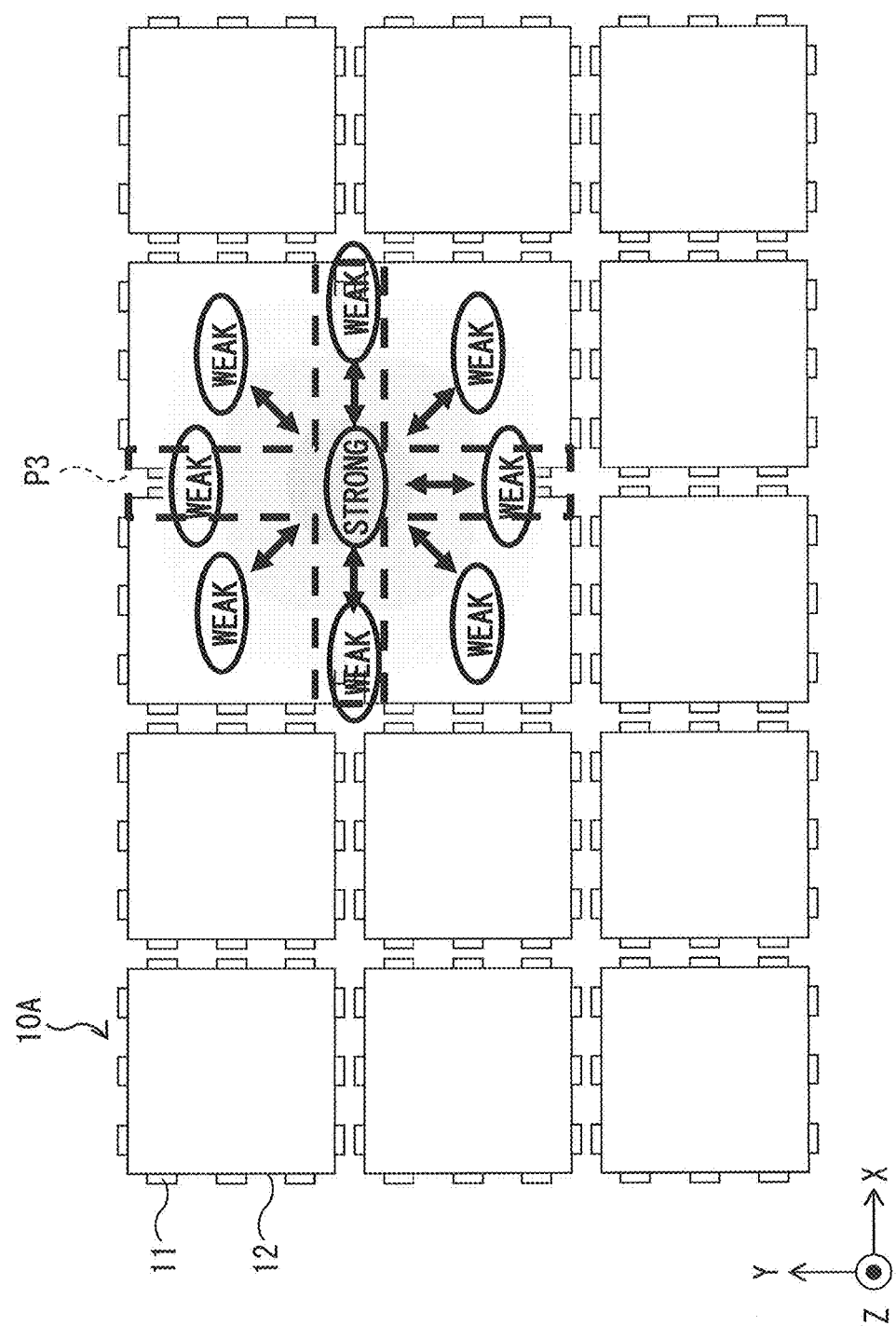
FIG. 72 is a diagram for explaining a light-emission mode of a unit light-source section according to another modification of the third embodiment.
Figure 73:
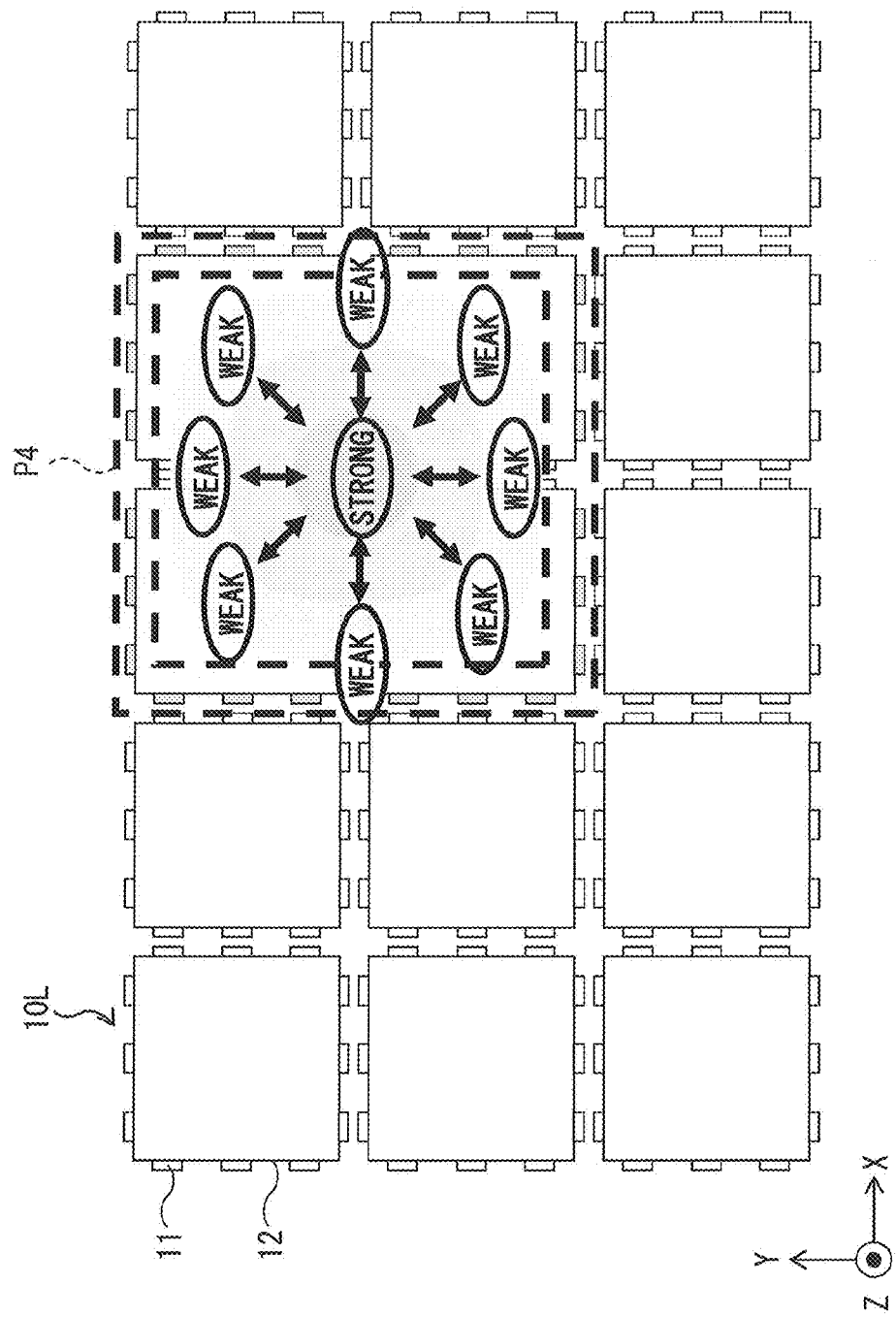
FIG. 73 is a diagram for explaining a light-emission mode of a unit light-source section according to another modification of the third embodiment.

Further, as illustrated in, for example, FIG. 68 and FIG. 69, by combination with the structure in which in a manner similar to that described in the second embodiment, within the light-emission surface of each of the unit light-source sections 10K, from the side of the emitting light source 11 to the opposite side, the light-emission intensity of the light emission of this light source 11 gradually increases, it is possible to two-dimensionally change the light-emission intensity within the light-emission surface.

Incidentally, as illustrated in FIG. 65 and FIG. 69, when the light-emission intensities of the respective light sources 11 are all controlled independently, it is conceivable that there may be a case in which an amount of signal to be transmitted to the light sources 11 becomes enormous and signal processing becomes complicated. Therefore, in such a case, like the unit light-source sections 10, 10K, 10A and 10L illustrated in, for example, FIG. 70 through FIG. 73, on the side where the plural light sources 11 are arranged, the light-emission intensities of some light sources 11 (light source groups within areas indicated by signs P1 through P4 in the figures) among these plural light sources 11 may be mutually generalized and the same signal may be transmitted. In other words, even when a certain group of light sources 11 is assumed to be one set and the same signal is transmitted (even with the same light-emission intensity), the light propagates within the light-guiding plate while gradually decreasing the intensity after coming out from the light-emission surface of the light-guiding plate 12 and thus, as illustrated in FIG. 70 through FIG. 73, a moderate radial light-emission intensity distribution is obtained. Therefore, by adjusting an intensity balance between the light-emission intensity of this one set and the light-emission intensity of another adjacent one set and combining them two-dimensionally while repeating that, it is possible to obtain a moderate two-dimensional light-emission intensity distribution. In other words, the sets of the light sources 11 are formed and controlled, so that it is possible to realize two-dimensional partial driving while suppressing the amount of signals to be transmitted to the light sources 11.

Figure 74:
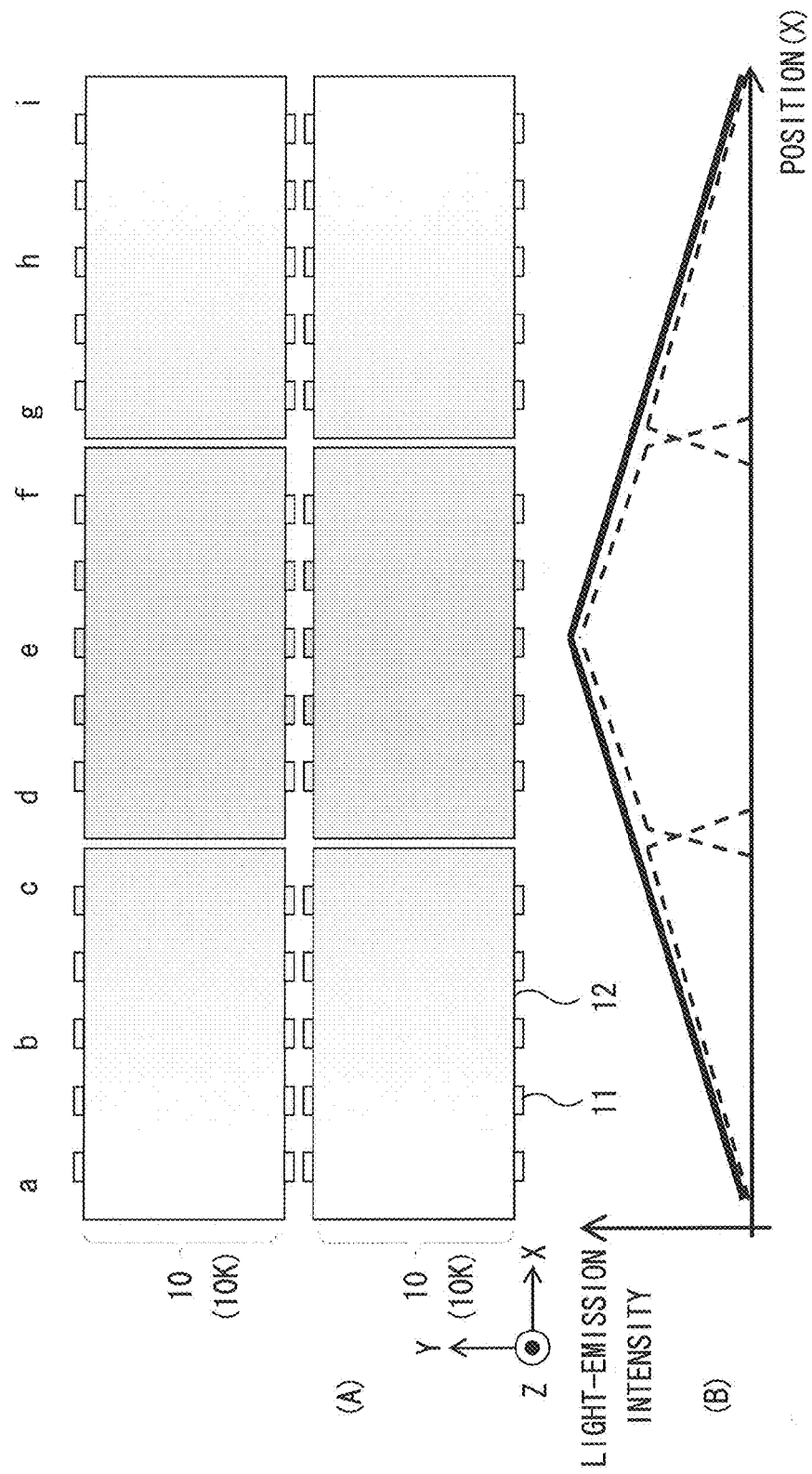
FIG. 74 is a diagram for explaining a light-emission mode of a unit light-source section according to another modification of the third embodiment.

Further, as illustrated in, for example, FIG. 74, when between the unit light-source sections 10 (10K) adjacent to each other, the light-emission intensity of each of the light sources 11 is set to gradually change along the side where the light sources 11 are arranged (in this case, in an X-axis direction), it is desirable that between the unit light-source sections 10 (10K) adjacent to each other, the light-emission intensities of the unit light-source sections 10 (10K), which are adjacent to each other along the side where the light sources 11 are arranged (X-axis direction), mutually be values of about the same tendency as the distribution of the changing light-emission intensity. Alternatively, it is desirable that the light-emission intensities of the light sources 11, which are adjacent to each other along the side where the light sources 11 are arranged (X-axis direction), be values equal to each other. This is because it is possible to make the appearance of the boundary between the partial lighting areas more natural. Specifically, in the example illustrated in FIG. 74, it is desirable that when the following expressions (17) through (19) are satisfied, the following expressions (20) and (21) be satisfied.

Light-emission intensity of light source a≦Light-emission intensity of light source b≦Light-emission intensity of light source surface c  (17)

Light-emission intensity of light source d≦Light-emission intensity of light source e≧Light-emission intensity of light source surface f  (18)

Light-emission intensity of light source g≧Light-emission intensity of light source h≧Light-emission intensity of light source surface i  (19)

Light-emission intensity of light source c≦Light-emission intensity of light source d  (20)

Light-emission intensity of light source f≧Light-emission intensity of light source g  (21)

Up to this point, the present invention has been described by providing the first through third embodiments and their modifications as well as their application examples, but the present invention is not limited to these embodiments and the like and may be variously modified.

Figure 75:
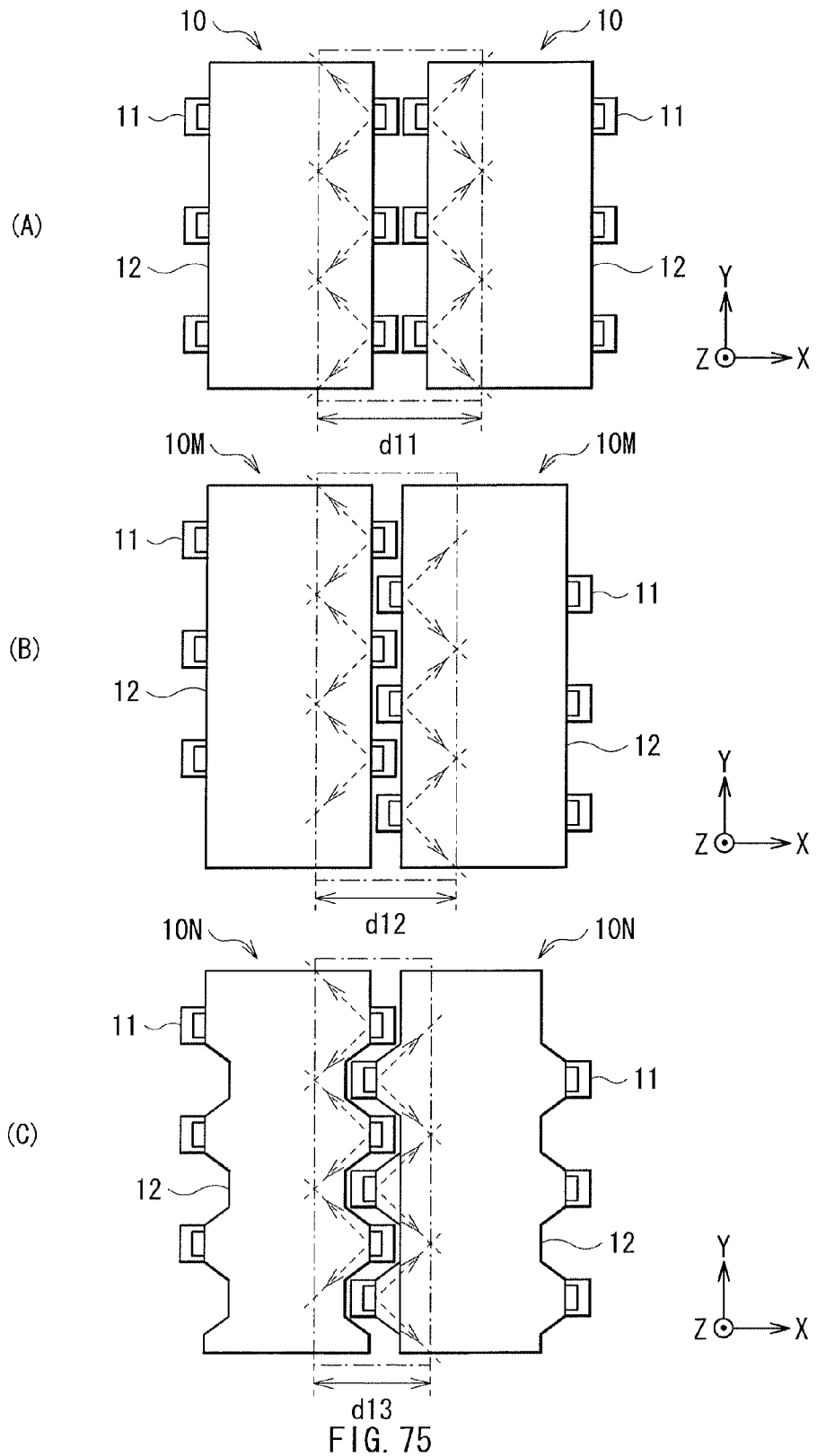
FIG. 75 is a plan view that illustrates a structure of a unit light-source section according to modifications of the present invention.

For example, in the embodiments and the like describe above, as illustrated in FIG. 75(A), the case in which the light sources 11 within the unit light-source sections 10 adjacent to each other are arranged in the same positions along an arrangement direction (Y-axis direction) of the light sources 11 has been described, but the arrangement of the light sources 11 is not limited to this. Incidentally, in FIG. 75(A) and the like, an arrow from the light source 11 indicates a traveling direction of a light beam on the outermost side (wide angle) of the light from the light source 11. Specifically, as illustrated in, for example, FIG. 75(B), the light sources 11 within unit light-source sections 10M adjacent to each other may be arranged in alternate positions along the arrangement direction (Y-axis direction) of the light sources 11. In the case of this structure, as indicated by signs d11 and d12 in the figure, it is possible to reduce an area between the adjacent light-guiding plates 12 and thereby the bright line unevenness or linear unevenness in the boundary part is made to less easily occur, so that the appearance in the boundary is able to be made more natural. Further, it is possible to reduce a distance (clearance) between the light-guiding plate 11 and the optical sheets 141 through 144 and the like and thus, the surface light source device is possible to be made thin. Furthermore, when, like a unit light-source section 10N illustrated in, for example, FIG. 75(C), each of the light sources 11 is disposed further rearward to be disposed further backward than a row of the light sources of the next light-guiding plate 12, as indicated by a sign d13 in the figure, the area between the adjacent light-guiding plates 12 is further reduced and thus, it is possible to make the appearance in the boundary even more natural and the surface light source device is possible to be made thinner.

Figure 76:
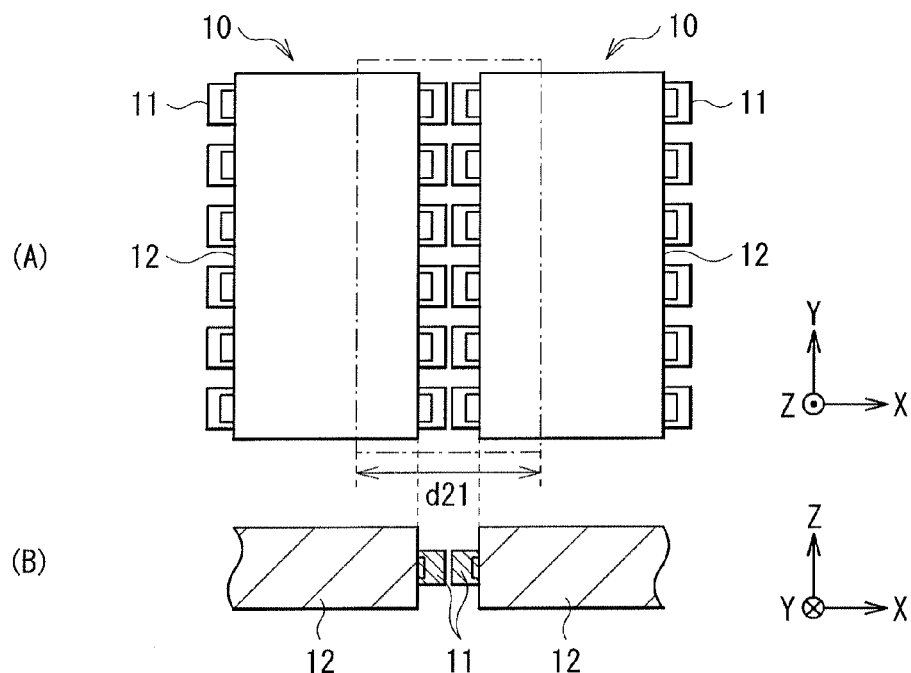
FIG. 76 is a plan view and a cross-sectional view which illustrate a structure of a unit light-source section according to another modification of the present invention.
Figure 77:
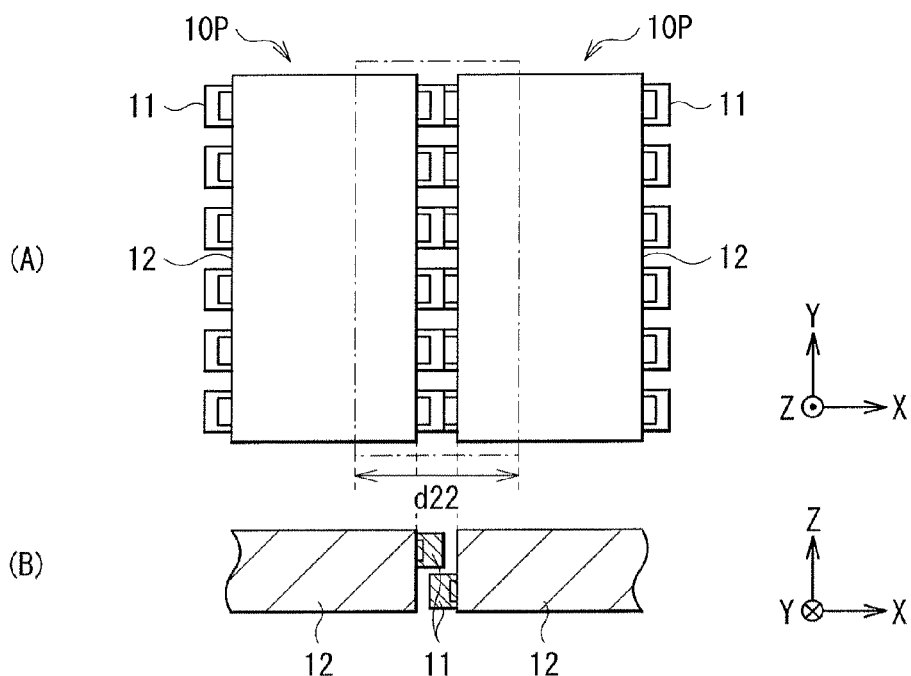
FIG. 77 is a plan view and a cross-sectional view which illustrate a structure of a unit light-source section according to another modification of the present invention.

Further, in the embodiments and the like describe above, as illustrated in FIG. 76(A) and (B), the case in which the light sources 11 within the unit light-source sections 10 adjacent to each other are arranged in the same positions along a thickness direction (Z-axis direction) of the light guiding plate 12 has been described, but the arrangement of the light sources 11 is not limited to this. Specifically, as illustrated in, for example, FIG. 77(A) and (B), the light sources 11 within unit light-source sections 10P adjacent to each other may be alternately arranged in vertically along the thickness direction (Z-axis direction) of the light guiding plate 12. In the case of this structure as well, as indicated by signs d21 and d22 in the figure, it is possible to reduce the area between the adjacent light-guiding plates 12 and thereby the bright line unevenness or linear unevenness in the boundary part is made to less easily occur, so that the appearance in the boundary is able to be made more natural. In addition, it is possible to reduce the distance (clearance) between the light-guiding plate 11 and the optical sheets 141 through 144 and the like and thus, the surface light source device is possible to be made thin.

Figure 78:
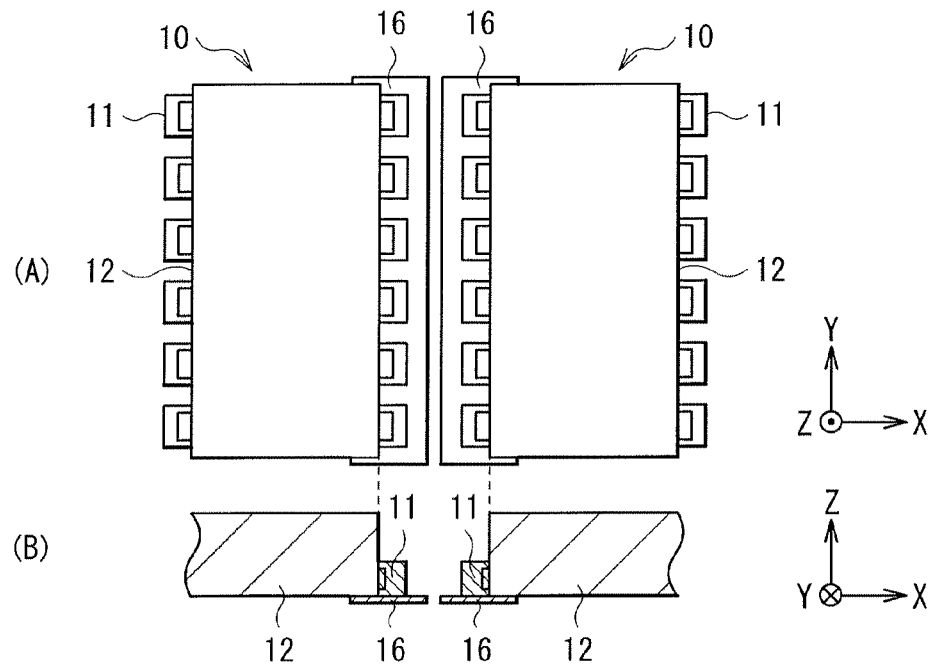
FIG. 78 is a plan view and a cross-sectional view which illustrate a structure of a unit light-source section according to another modification of the present invention.
Figure 79:
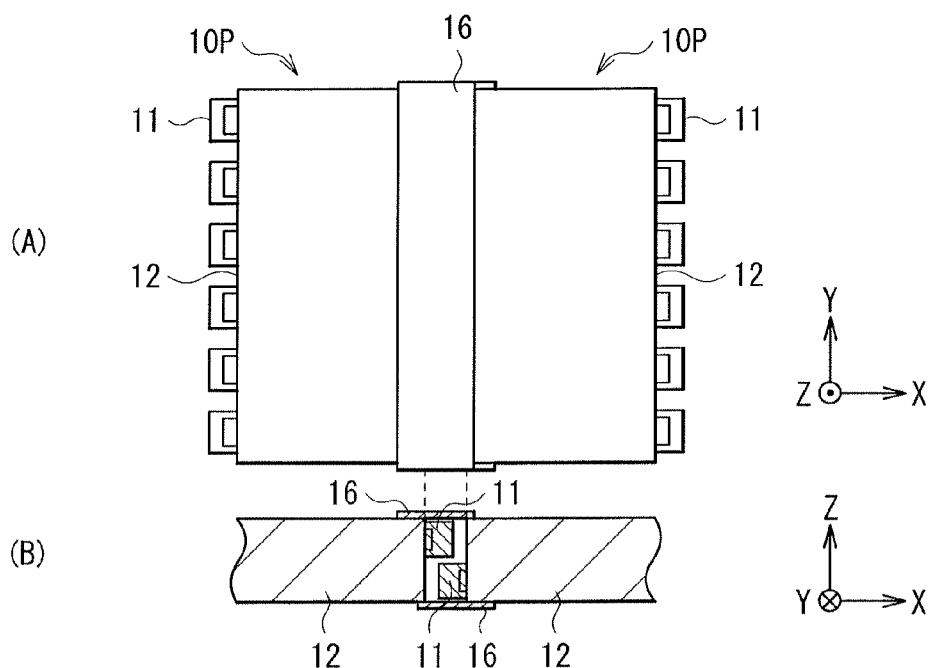
FIG. 79 is a plan view and a cross-sectional view which illustrate a structure of a unit light-source section according to another modification of the present invention.

Furthermore, as illustrated in, for example, FIG. 78(A) and (B), a case in which mounted surfaces (wiring substrates 16) of the light sources 11 within the unit light-source sections 10 adjacent to each other are arranged on the same side (here, on the undersurface side of the light-guiding plates 12) is not a limit. Specifically, as illustrated in, for example, FIG. 79(A) and (B), the mounted surfaces (wiring substrates 16) of the light sources 11 within the unit light-source sections 10P adjacent to each other may be arranged on the opposed sides (here, on the top-surface side and the undersurface side of the light-guiding plates 12). In the case of this structure, the mounted surfaces of the wiring substrates 16 do not interfere with each other and thus, it is possible to reduce the distance between the light sources 11, so that the more light sources 11 are able to be disposed.

Figure 80:
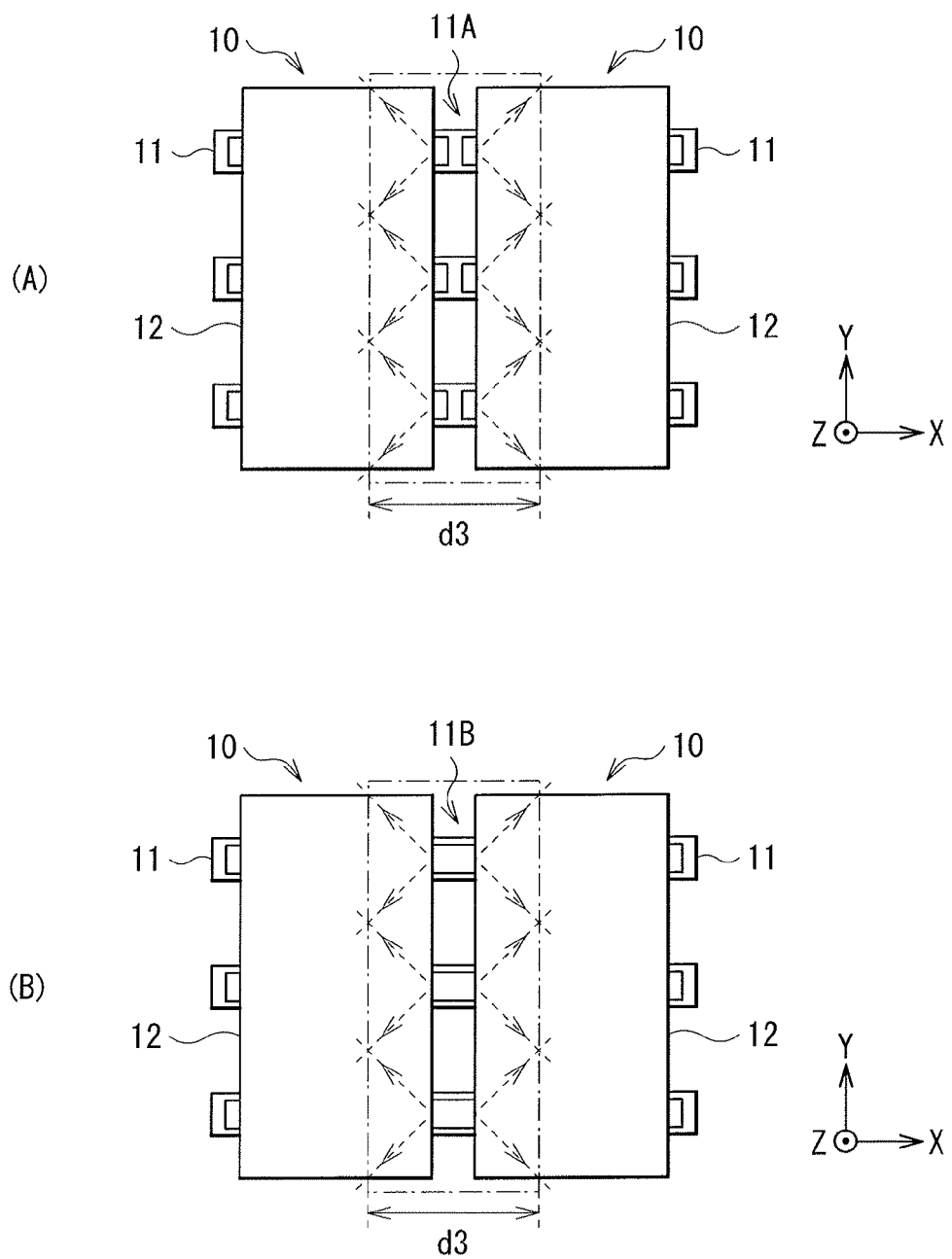
FIG. 80 is a plan view that illustrates a structure of a unit light-source section according to another modification of the present invention.
Figure 81:
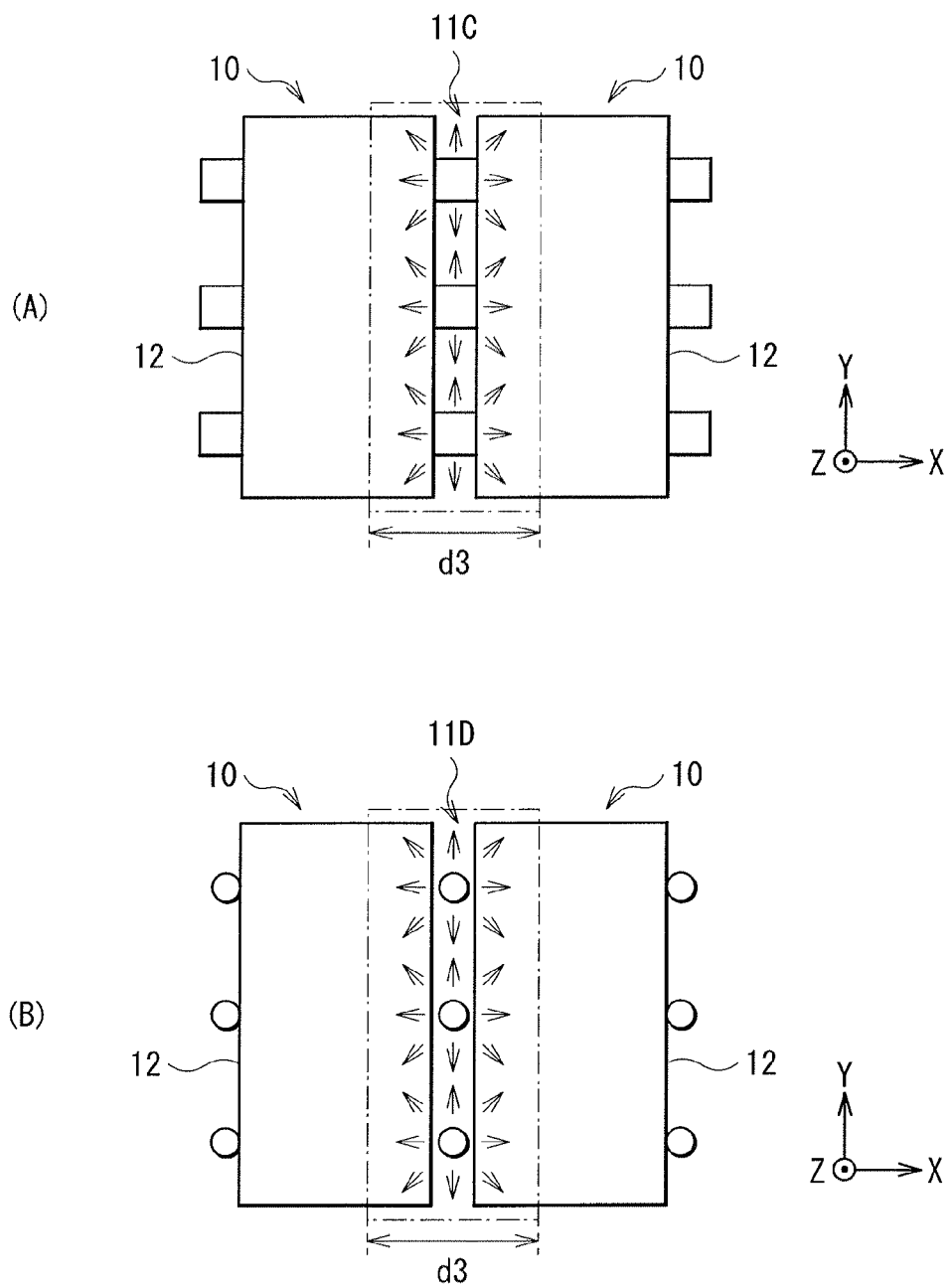
FIG. 81 is a plan view that illustrates a structure of a unit light-source section according to another r modification of the present invention.
Figure 82:
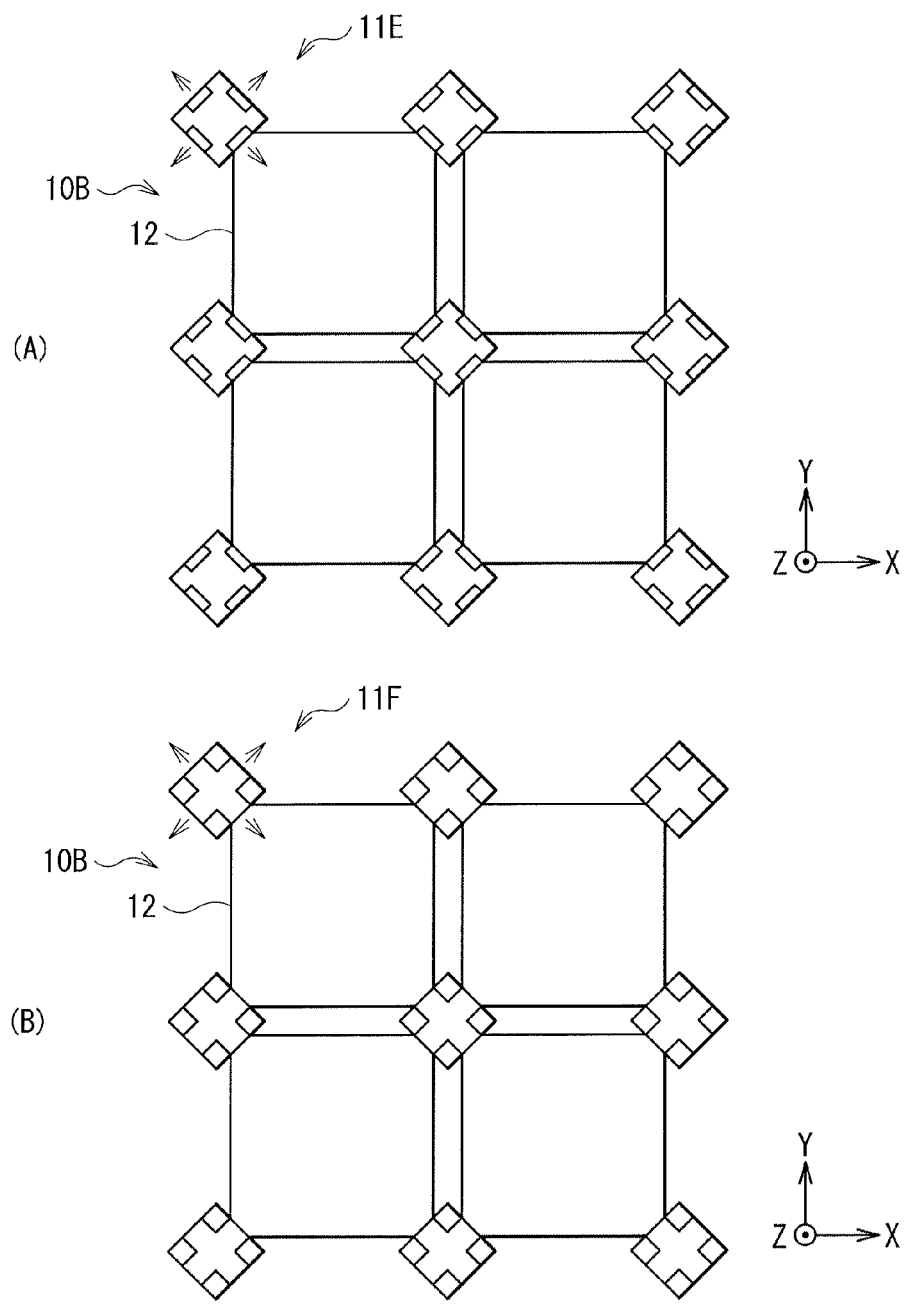
FIG. 82 is a plan view that illustrates a structure of a unit light-source section according to another modification of the present invention.
Figure 83:
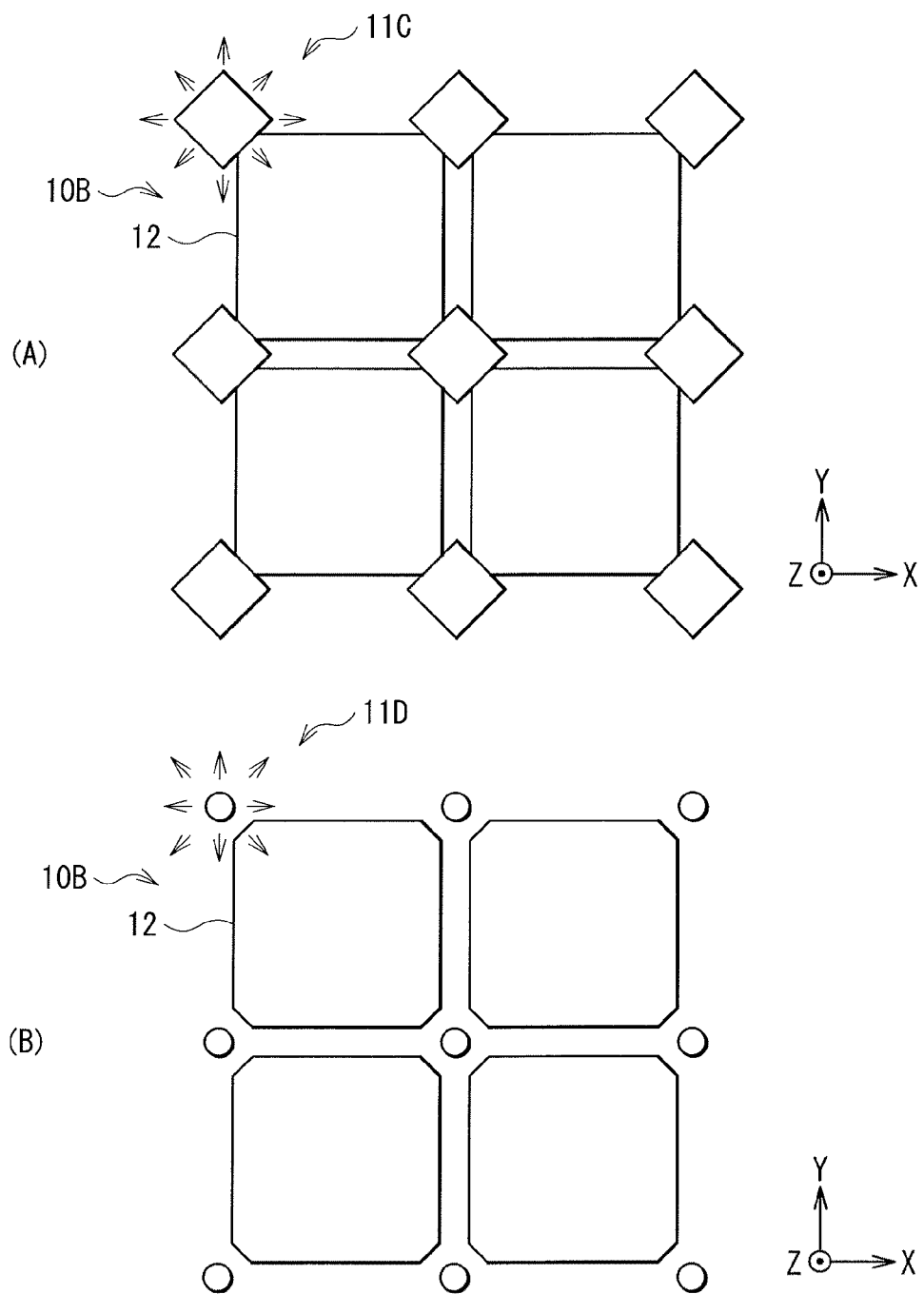
FIG. 83 is a plan view that illustrates a structure of a unit light-source section according to another r modification of the present invention.

Moreover, as illustrated in, for example, FIG. 80(A) and (B), FIG. 81(A) and (B), FIG. 82(A) and (B), and FIG. 83(A) and (B), light sources 11A or light sources 11B within the unit light-source sections 10 adjacent to each other may emit the light in two of frontward and backward directions, in four of frontward, backward, leftward and rightward directions, or circularly or in all around directions.

Further, when a light scattering material is used as a material of the light-guiding plate 12, the light traveling within the light-guiding plate 12 is scattered and made easy to emit outside the light-guiding plate 12 and thus, it is preferable to be applied to the first embodiment, rather than the second embodiment.

Figure 84:
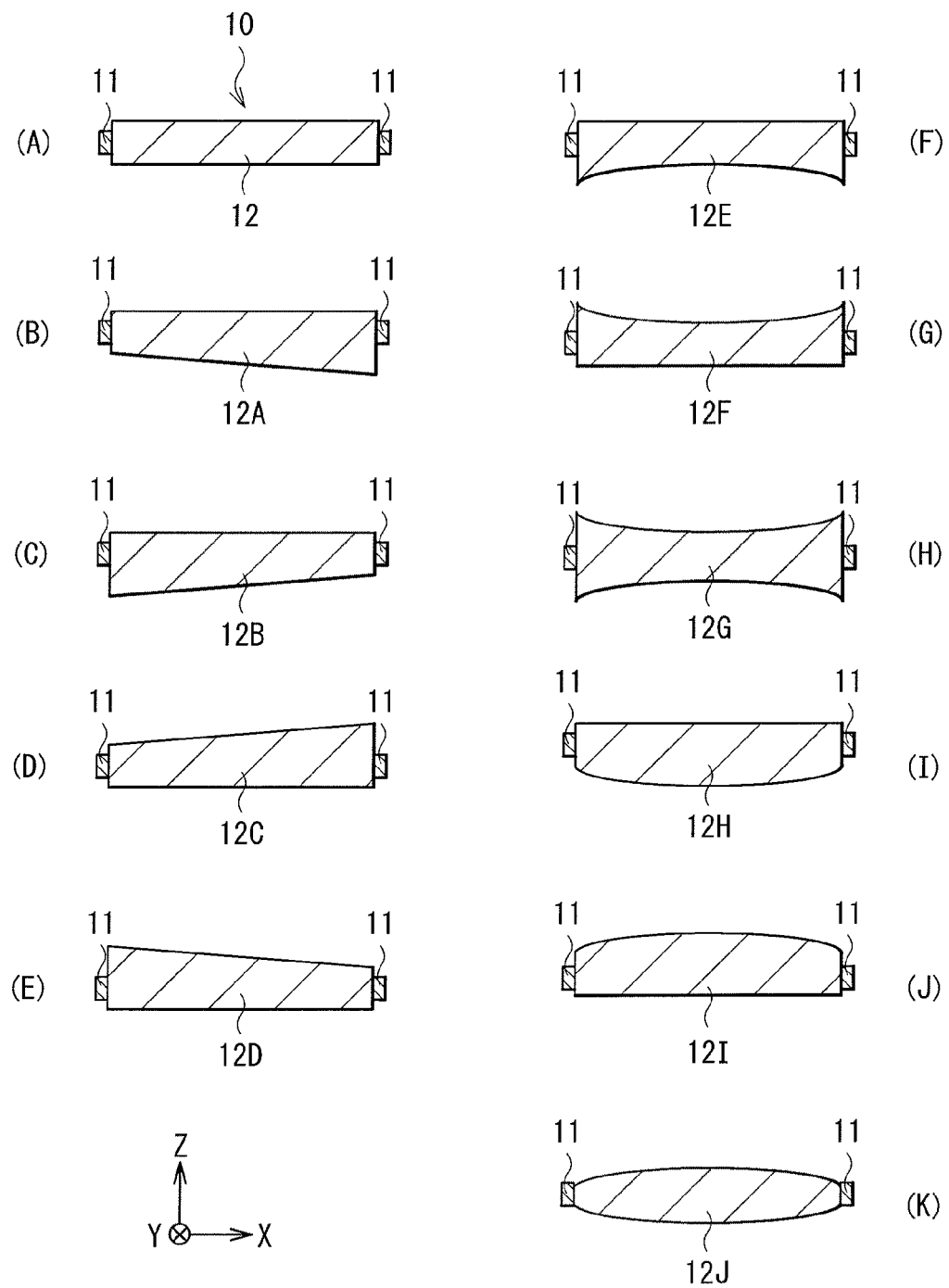
FIG. 84 is a cross-sectional view that illustrates a structure of a unit light-source section according to another r modification the present invention.

Furthermore, in the embodiments and the like describe above, as illustrated in FIG. 84(A), the case in which the light-guiding plate 12 is a flat plate in uniform thickness has been described, but like light-guiding plates 12A through 12J illustrated in, for example, FIG. 84(B) through (K), the thickness of the light-guiding plate may vary within the side where the light sources 11 are disposed (here, an X-axis direction). Specifically, like the light-guiding plates 12A through 12D illustrated in, for example, FIG. 84(B) through (E), the light-guiding plate may be shaped like a wedge in which the one side where the light sources 11 are disposed and the other side are different from each other in thickness. Moreover, like the light-guiding plates 12E through 12J illustrated in, for example, FIG. 84(F) through (K), the light-guiding plate may be a light-guiding plate in which a central part is thicker or thinner than end parts of the light-guiding plate. Still furthermore, when the thickness of the light-guiding plate is changed, the manner in which the thickness is changed may be a linear functional change (a case in which a cross section is linear), or a change by something other than the linear function (a case in which a cross section is curved).

However, in the case in which the further away from the light sources 11, the smaller the thickness of the light-guiding plate is, the light during the traveling is apt to be all reflected in the normal direction of the light-emission surface rather than in the in-plane direction of the light-emission surface (namely, a Z-axis direction rather than an X-axis direction in the figure), depending on inclinations of the upper and lower surfaces, and thus becomes readily goes outside the light-guiding plate. On the other hand, in the case in which the further away from the light sources 11, the larger the thickness of the light-guiding plate is, the light during the transmission is apt to be all reflected in the in-plane direction of the light-emission surface rather than in the normal direction of the light-emission surface (namely, the X-axis direction rather than the Z-axis direction in the figure), depending on the inclinations of the upper and lower surfaces, and thus goes outside the light-guiding plate less easily. Therefore, the light-guiding plate 12 illustrated in FIG. 84(A) is applicable to both of the first and second embodiments, but it is preferable that the light-guiding plates 12E, 12F and 12G illustrated in FIG. 84(F), (G) and (H) are applied to the first embodiment, while the light-guiding plates 12H, 121 and 12J illustrated in FIG. 84(I), (J) and (K) are applied to the second embodiment. Further, in order to indicate the equal light-emission intensities of the light sources on the left side and the right side in the figure, it is desirable to use these light-guiding plates 12 and 12E through 12J, but even when the light-guiding plates 12A through 12D other than these light-guiding plates are used, it is possible to indicate the equal light-emission intensities of the light sources on the left side and the right side in the figure, by performing pattern adjusting of the light-guiding plate.

Figure 85:
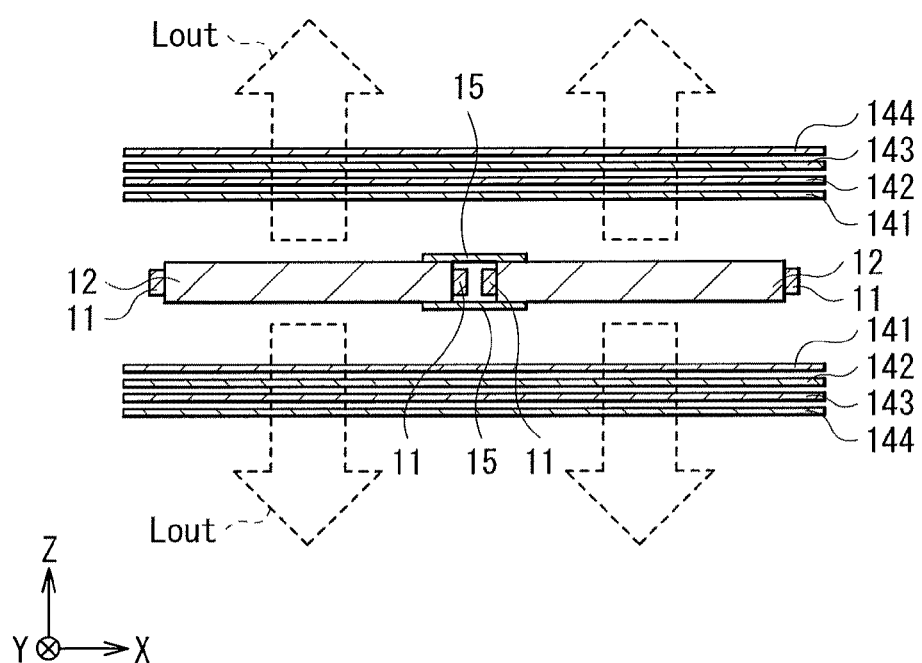
FIG. 85 is a cross-sectional view that illustrates a structure of a unit light-source section according to another modification of the present invention.

Moreover, as illustrated in, for example, FIG. 85, by disposing the optical sheets 141 through 144 on the upper and lower surface sides, a backlight that emits light to both of the top surface and the undersurface may be provided.

Still further, anything may be used as the light source as long as the light is emitted, and not all the light sources have to emit the light in the same wavelength range. For example, there may be used a light source that emits light of blue-color wavelength, a light source that emits light of green-color wavelength, and a light source that emits light of red-color wavelength. These light sources may be used as separate light sources, or may be used as a single packaged light source.

Still furthermore, for example, a light source that emits light of wavelength of blue and green colors mixed with each other, and a light source that emits light of red-color wavelength may be used. These light sources may be used as separate light sources, or may be used as a single packaged light source. Moreover, for example, a light source that emits light of wavelength of blue and red colors mixed with each other, and a light source that emits light of green-color wavelength may be used. These light sources may be used as separate light sources, or may be used as a single packaged light source. In addition, for example, two kinds of light source, namely, a light source that emits light of wavelength of green and red colors mixed with each other and a light source that emits light of blue-color wavelength may be used. These light sources may be used as separate light sources, or may be used as a single packaged light source.

Further, for example, a light source that emits blue light and a fluorescent substance that is excited by that light and emits yellow light may be packaged and used as a single light source. Furthermore, for example, a light source that emits blue light and a fluorescent substance that is excited by that light and emits green and red light may be packaged and used as a single light source.

Still further, for example, a light source that emits blue light, a light source that emits green light, and a fluorescent substance that is excited by that light and emits red light may be packaged and used as a single light source. Still furthermore, for example, a light source that emits blue light, a light source that emits red light, and a fluorescent substance that is excited by that light and emits green light may be packaged and used as a single light source.

Moreover, for example, a light source that emits blue light is used, a fluorescent substance that is excited by that light and emits yellow light is formed to be a sheet, and they are used together with the optical sheets and the like, so that white light may be emitted as backlight. In addition, for example, a light source that emits blue light is used, a fluorescent substance that is excited by that light and emits yellow light is formed to be a sheet, and they are used together with the optical sheets and the like, so that white light may be emitted as backlight.

Further, for example, a light source that emits blue light and a light source that emits green light are used, a fluorescent substance that is excited by that light and emits red light is formed to be a sheet, and they are used together with the optical sheets and the like, so that white light may be emitted as backlight. Still furthermore, for example, a light source that emits blue light and a light source that emits red light are used, a fluorescent substance that is excited by that light and emits green light is formed to be a sheet, and they are used together with the optical sheets and the like, so that white light may be emitted as backlight.

Moreover, the light from the light sources is not limited to visible light, and may be invisible light such as infrared rays and ultraviolet rays.

The invention claimed is:

1. A surface light source device comprising:
   a plurality of unit light-source sections that are configured to include a light guiding plate forming a light-emission surface and a light source disposed on a plurality of sides of the light guiding plate, the plurality of unit light-source sections being capable of mutually independent lighting,
   wherein in the unit light-source section, by light emissions of respective light sources on the respective sides, uneven light-emission intensity distributions that are mutually independent within the light-emission surface are formed.

2. The surface light source device as recited in claim 1, wherein a light source is disposed on each of a pair of opposed sides of the light guiding plate, and
   by light emission of the light source on one side of the pair of sides and light emission of the light source on the other side of the pair of sides, uneven light-emission intensity distributions that are mutually independent within the light-emission surface are formed.

3. The surface light source device as recited in claim 2, wherein a first uneven light-emission intensity distribution by the light emission of the light source on the one side and a second uneven light-emission intensity distribution by the light emission of the light source on the other side are superimposed, and thereby a uniform light-emission intensity distribution is able to be formed, within the light-emission surface.

4. The surface light source device as recited in claim 2, wherein a first uneven light-emission intensity distribution by the light emission of the light source on the one side and a second uneven light-emission intensity distribution by the light emission of the light source on the other side are superimposed, and thereby a third uneven light-emission intensity distribution is able to be formed, within the light-emission surface.

5. The surface light source device as recited in claim 1, wherein a light source is disposed on each side of two pairs of opposed sides of the light guiding plate, and
   by light emission of the light source on each side of the two pairs of sides, uneven light-emission intensity distributions that are mutually independent within the light-emission surface are formed.

6. The surface light source device as recited in claim 5, wherein a first through fourth uneven light-emission intensity distributions by the light emissions of the respective sides of the two pairs of sides are superimposed, and thereby a uniform light-emission intensity distribution is able to be formed, within the light-emission surface.

7. The surface light source device as recited in claim 5, wherein a first through fourth uneven light-emission intensity distributions by the light emissions of the respective sides on the two pairs of sides are superimposed, and thereby a fifth uneven light-emission intensity distribution is able to be formed, within the light-emission surface.

8. The surface light source device as recited in any one of claims 2 to 7, configured such that within the light-emission surface, from a side of an emitting light source to an opposite side, light-emission intensity by light emission of the light source gradually increases.

9. The surface light source device as recited in claim 8, wherein in a case in which a light-emission intensity distribution gradually changes between unit light-source sections adjacent to each other, between the unit light-source sections adjacent to each other, light-emission intensities of light sources disposed on opposed different sides are, mutually, values of approximately the same tendency as the changing light-emission intensity distribution.

10. The surface light source device as recited in claim 9, wherein the light-emission intensities of the light sources disposed on the opposed different sides are values equal to each other.

11. The surface light source device as recited in claim 8, wherein in a peripheral unit light-source section along a direction from the side of the emitting light source to the opposite side, a light-emission intensity of each light source is set so as to cancel out a peripheral uneven light-emission intensity distribution formed due to traveling of light from a unit light-source section having the emitting light source.

12. The surface light source device as recited in any one of claims 2 to 7, configured such that within the light-emission surface, from a side of an emitting light source to an opposite side, light-emission intensity by light emission of the light source gradually decreases.

13. The surface light source device as recited in claim 12, wherein in a case in which a light-emission intensity distribution gradually changes between unit light-source sections adjacent to each other, between the adjacent unit light-source sections, light-emission intensities of light sources disposed on adjacent sides are, mutually, values of approximately the same tendency as the changing light-emission intensity distribution.

14. The surface light source device as recited in claim 13, wherein the light-emission intensities of the light sources disposed on the adjacent sides are values equal to each other.

15. The surface light source device as recited in any one of claims 2 to 7, wherein in each light guiding plate, along a side where a plurality of light sources are disposed, light intensities of the respective light sources are able to be set to be mutually independent.

16. The surface light source device as recited in claim 15, wherein on the side where the plurality of light sources are disposed, some light sources among these plurality of light sources are mutually generalized.

17. The surface light source device as recited in claim 15, wherein in a case in which between unit light-source sections adjacent to each other, a light-emission intensity of each light source is set to gradually change along a direction of the side where the plurality of light sources are disposed, between the adjacent unit light-source sections, light-emission intensities of light sources adjacent in the direction of the side where the plurality of light sources are disposed are, mutually, values of approximately the same tendency as a distribution of the changing light-emission intensity.

18. The surface light source device as recited in claim 17, wherein the light-emission intensities of the light sources adjacent in the direction of the side where the plurality of light sources are disposed are values equal to each other.

19. A display device comprising:
   a surface light source device that performs surface light emission; and
   a display section that performs image display by modulating light from the surface light source device based on an image signal,
   wherein the surface light source device includes
   a plurality of unit light-source sections that are configured to include a light guiding plate forming a light-emission surface and a light source disposed on a plurality of sides of the light guiding plate, the plurality of unit light-source sections being capable of mutually independent lighting, and
   in the unit light-source section, by light emissions of respective light sources on the respective sides, uneven light-emission intensity distributions that are mutually independent within the light-emission surface are formed.

* * * * *